US010882603B2

(12) United States Patent
Huynh

(10) Patent No.: US 10,882,603 B2
(45) Date of Patent: Jan. 5, 2021

(54) DISTRIBUTED TRAILING EDGE WING FLAP SYSTEMS

(71) Applicant: The Boeing Company, Chicago, IL (US)

(72) Inventor: Neal V. Huynh, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 395 days.

(21) Appl. No.: 15/926,477

(22) Filed: Mar. 20, 2018

(65) Prior Publication Data

US 2019/0291850 A1    Sep. 26, 2019

(51) Int. Cl.
  *B64C 9/20*       (2006.01)
  *B64D 45/00*      (2006.01)
  (Continued)

(52) U.S. Cl.
  CPC .............. *B64C 9/20* (2013.01); *B64C 13/42* (2013.01); *B64C 13/503* (2013.01);
  (Continued)

(58) Field of Classification Search
  CPC .... B64C 9/16; B64C 9/18; B64C 9/20; B64C 13/40; B64C 13/42; B64D 2045/001
  See application file for complete search history.

(56) References Cited

U.S. PATENT DOCUMENTS 6,799,739 B1  10/2004  Jones
7,048,234 B2   5/2006  Recksiek et al.
(Continued)

FOREIGN PATENT DOCUMENTS

EP   1721825   11/2006
EP   1721826   11/2006
(Continued)

OTHER PUBLICATIONS

United States Patent and Trademark Office, "Non-Final Office Action," issued in connection with U.S. Appl. No. 15/947,595, dated Aug. 6, 2020, 5 pages.
(Continued)

*Primary Examiner* — Timothy D Collins
*Assistant Examiner* — Terri L Filosi
(74) *Attorney, Agent, or Firm* — Hanley, Flight & Zimmerman, LLC

(57) ABSTRACT

Distributed trailing edge wing flap systems are described. An example wing flap system for an aircraft includes a flap, an actuator, a first hydraulic module, and a second hydraulic module. The flap is movable between a deployed position and a retracted position relative to a fixed trailing edge of a wing of the aircraft. The actuator is to move the flap relative to the fixed trailing edge. The first hydraulic module is located at the actuator. The second hydraulic module is located remotely from the first hydraulic module and includes a local power unit. The actuator is hydraulically drivable via first pressurized hydraulic fluid to be supplied from a hydraulic system of the aircraft to the actuator via the second hydraulic module and further via the first hydraulic module. The actuator is also hydraulically drivable via second pressurized hydraulic fluid to be supplied from the local power unit to the actuator via the second hydraulic module and further via the first hydraulic module.

20 Claims, 27 Drawing Sheets

(51) Int. Cl.
    *B64C 13/42*    (2006.01)
    *B64C 13/50*    (2006.01)
(52) U.S. Cl.
    CPC .... *B64D 45/0005* (2013.01); *B64D 2045/001* (2013.01); *B64D 2221/00* (2013.01)

(56) References Cited

U.S. PATENT DOCUMENTS

| | | | | |
|---|---|---|---|---|
| 8,434,301 | B2* | 5/2013 | Fukui | B64C 13/505 60/405 |
| 10,538,310 | B2* | 1/2020 | Polcuch | F15B 11/22 |
| 2004/0075020 | A1* | 4/2004 | Trikha | B64C 13/505 244/99.4 |
| 2006/0043242 | A1 | 3/2006 | Benson | |
| 2006/0144996 | A1 | 7/2006 | Carl et al. | |
| 2010/0089053 | A1 | 4/2010 | Hanlon et al. | |
| 2010/0288886 | A1 | 11/2010 | Schievelbusch et al. | |
| 2011/0062282 | A1* | 3/2011 | Richter | B64C 13/505 244/99.4 |
| 2014/0175216 | A1 | 6/2014 | Ishihara | |
| 2015/0090843 | A1 | 4/2015 | Guering | |
| 2016/0009375 | A1* | 1/2016 | Young | B64C 13/0421 244/234 |
| 2018/0156293 | A1 | 6/2018 | Fox et al. | |
| 2018/0178902 | A1* | 6/2018 | Nfonguem | B64C 5/10 |
| 2019/0217944 | A1 | 7/2019 | Huynh | |
| 2019/0308719 | A1 | 10/2019 | Huynh | |
| 2020/0070959 | A1 | 3/2020 | Huynh | |
| 2020/0079497 | A1 | 3/2020 | Huynh | |

FOREIGN PATENT DOCUMENTS

| | | |
|---|---|---|
| EP | 2202146 | 6/2010 |
| EP | 2524865 | 11/2012 |
| EP | 2955104 | 12/2015 |
| EP | 3121116 | 1/2017 |
| EP | 3549857 | 10/2019 |

OTHER PUBLICATIONS

European Patent Office, "Extended European Search Report," issued in connection with European Patent Application No. 19166351.7 dated Aug. 5, 2019, 6 pages.

European Patent Office, "Extended European Search Report," issued in connection with European Patent Application No. 19193891.9, dated Feb. 12, 2020, 11 pages.

United States Patent and Trademark Office, "Non-Final Office Action," issued in connection with U.S. Appl. No. 16/126,671, dated Aug. 6, 2020, 7 pages.

United States Patent and Trademark Office, "Non-Final Office Action," issued in connection with U.S. Appl. No. 15/874,545, dated Aug. 18, 2020, 7 pages.

United States Patent and Trademark Office, "Non-Final Office Action," issued in connection with U.S. Appl. No. 16/122,519, dated Aug. 6, 2020, 6 pages.

* cited by examiner

*2400*

| ACTUATOR MODE LOGIC | | | | | |
|---|---|---|---|---|---|
| MODE | LINE 1 PRESS | BYPASS SOV | BLOCK SOV COIL 1 | BLOCK SOV COIL 2 | ACTUATOR MODE |
| 2402 → 1 | AVAIL | ON | ON | ON | ACTIVE |
| 2404 → 2 | AVAIL | ON | OFF | OFF | ACTIVE |
| 2406 → 3 | AVAIL | ON | ON | OFF | ACTIVE |
| 2408 → 4 | AVAIL | ON | OFF | ON | ACTIVE |
| 2410 → 5 | AVAIL | OFF | ON | ON | BYPASSED |
| 2412 → 6 | AVAIL | OFF | ON | OFF | BYPASSED |
| 2414 → 7 | AVAIL | OFF | OFF | ON | BYPASSED |
| 2416 → 8 | AVAIL | OFF | OFF | OFF | BLOCKED |
| 2418 → 9 | UNAVAIL | ON | ON | ON | BYPASSED |
| 2420 → 10 | UNAVAIL | ON | ON | OFF | BYPASSED |
| 2422 → 11 | UNAVAIL | ON | OFF | ON | BYPASSED |
| 2424 → 12 | UNAVAIL | ON | OFF | OFF | BLOCKED |
| 2426 → 13 | UNAVAIL | OFF | ON | ON | BYPASSED |
| 2428 → 14 | UNAVAIL | OFF | ON | OFF | BYPASSED |
| 2430 → 15 | UNAVAIL | OFF | OFF | ON | BYPASSED |
| 2432 → 16 | UNAVAIL | OFF | OFF | OFF | BLOCKED |

FIG. 24

DISTRIBUTED TRAILING EDGE WING FLAP SYSTEMS

FIELD OF THE DISCLOSURE

This disclosure relates generally to aircraft wing flaps and, more specifically, to distributed trailing edge wing flap systems.

BACKGROUND

Aircraft wings (e.g., the wings of a commercial aircraft) commonly include flaps (e.g., outboard flaps and/or inboard flaps) located at and/or along the respective fixed trailing edge of each aircraft wing. The flaps are movable relative to the fixed trailing edges of the aircraft wings between retracted and deployed positions. Deploying the flaps from the aircraft wings during flight (e.g., during landing) typically increases a lift characteristic associated with the aircraft wings, while retracting the flaps during flight (e.g., during cruise) typically reduces the lift characteristic.

SUMMARY

Distributed trailing edge wing flap systems are disclosed herein. In some examples, a wing flap system for an aircraft is disclosed. In some examples, a wing flap system for an aircraft is disclosed. In some disclosed examples, the wing flap system comprises a flap, an actuator, a first hydraulic module, and a second hydraulic module. In some disclosed examples, the flap is movable between a deployed position and a retracted position relative to a fixed trailing edge of a wing of the aircraft. In some disclosed examples, the actuator is to move the flap relative to the fixed trailing edge. In some disclosed examples, the first hydraulic module is located at the actuator. In some disclosed examples, the second hydraulic module is located remotely from the first hydraulic module. In some disclosed examples, the second hydraulic module includes a local power unit. In some disclosed examples, the actuator is hydraulically drivable via first pressurized hydraulic fluid to be supplied from a hydraulic system of the aircraft to the actuator via the second hydraulic module and further via the first hydraulic module. In some disclosed examples, the actuator is also hydraulically drivable via second pressurized hydraulic fluid to be supplied from the local power unit to the actuator via the second hydraulic module and further via the first hydraulic module.

In some examples, a wing flap system for an aircraft is disclosed. In some disclosed examples, the wing flap system comprises a flap movable between a deployed position and a retracted position relative to a fixed trailing edge of a wing of the aircraft. In some disclosed examples, the wing flap system further comprises first and second actuators to move the flap relative to the fixed trailing edge. In some disclosed examples, the wing flap system further comprises first and second hydraulic modules respectively located at corresponding ones of the first and second actuators. In some disclosed examples, the wing flap system further comprises a third hydraulic module located remotely from the first and second hydraulic modules. In some disclosed examples, the third hydraulic module includes a local power unit. In some disclosed examples, the first and second actuators are hydraulically drivable via first pressurized hydraulic fluid to be supplied from a hydraulic system of the aircraft to the first and second actuators via the third hydraulic module and further via corresponding ones of the first and second hydraulic modules. In some disclosed examples, the first and second actuators are also hydraulically drivable via second pressurized hydraulic fluid to be supplied from the local power unit to the first and second actuators via the third hydraulic module and further via corresponding ones of the first and second hydraulic modules.

BRIEF DESCRIPTION OF THE DRAWINGS

FIG. 24 is an example logic table corresponding to the sixteen example operational modes of the first example hydraulic module of FIGS. 5 and 8-23.

Figure 1:
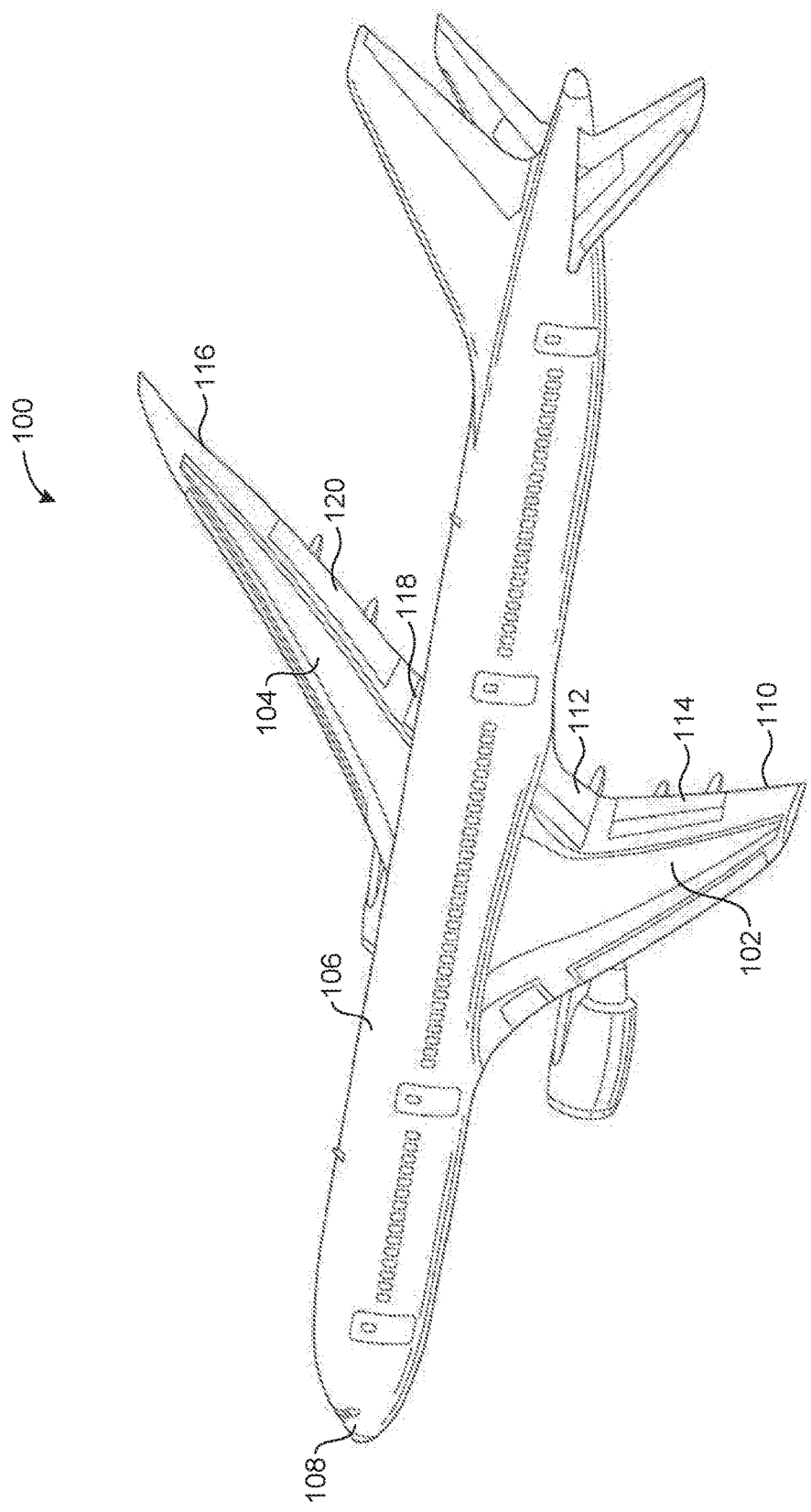
FIG. 1 illustrates an example aircraft in which an example distributed trailing edge wing flap system may be implemented in accordance with the teachings of this disclosure.

Certain examples are shown in the above-identified figures and described in detail below. In describing these examples, like or identical reference numbers are used to identify the same or similar elements. The figures are not necessarily to scale, and certain features and certain views of the figures may be shown exaggerated in scale or in schematic for clarity and/or conciseness.

DETAILED DESCRIPTION

Aircraft wings (e.g., the wings of a commercial aircraft) commonly include flaps (e.g., outboard flaps and/or inboard flaps) located at and/or along the respective fixed trailing edge of each aircraft wing. Conventional trailing edge wing flap systems may include actuators and/or ball screws arranged to move the flaps relative to the fixed trailing edges of the aircraft wings between retracted and deployed positions. In such conventional trailing edge wing flap systems, the actuators are connected via torque tubes to a power drive unit which is powered by multiple independent hydraulic or electrical systems of the aircraft. The actuators of such conventional trailing edge wing flap systems may be rendered inoperable in the event of a partial or complete failure of one or more of the hydraulic or electrical system(s), thereby leaving the aircraft without the ability to change and/or control the respective positions of the wing flaps (e.g., without the ability to maintain and/or to actuate a wing flap to the last commanded position of the wing flap).

In contrast to the conventional trailing edge wing flap systems described above, the example distributed trailing edge wing flap systems disclosed herein advantageously include at least one pair of actuators (e.g., one pair of actuators per wing flap) that may be hydraulically driven and/or powered by a hydraulic system of an aircraft, and may independently be hydraulically driven and/or powered by a local power unit (LPU) selectively connected to an electrical system of the aircraft. When connected to the electrical system of the aircraft, the LPU advantageously produces and/or supplies pressurized hydraulic fluid to the pair of actuators independent of any pressurized hydraulic fluid that may be supplied to the pair of actuators via the hydraulic system of the aircraft. The LPU may accordingly restore and/or maintain the ability of the aircraft to change and/or control a position of a wing flap with which the LPU is associated (e.g., restore and/or maintain the ability to actuate a wing flap to the last commanded position, or to a newly indicated position of the wing flap).

In some disclosed examples, each wing flap of a distributed trailing edge wing flap system includes at least two actuators that may be hydraulically driven and/or powered by a hydraulic system of an aircraft, and may independently be hydraulically driven and/or powered by a LPU selectively connected to an electrical system of the aircraft. In such examples, the LPUs advantageously restore and/or maintain the ability of the aircraft to change and/or control the respective positions of the respective wing flaps with which corresponding respective ones of the LPUs are associated (e.g., restore and/or maintain the ability to actuate respective ones of the wing flaps to corresponding respective last commanded positions of the wing flaps, or to newly indicated positions of the wing flaps). In such examples, the distributed trailing edge wing flap system advantageously implements respective ones of the LPUs to prevent and/or mediate the development of asymmetries among the respective positions of respective ones of the wing flaps.

In some examples, the disclosed distributed trailing edge wing flap systems may be implemented by and/or integrated into an aircraft having a fly-by-wire flight control system and a power architecture including two independent hydraulic systems and two independent electrical systems (e.g., a 21-2E power architecture). In some such examples, the electrical systems of the aircraft may be operable at low voltage power (e.g., 115 VAC or 28 VDC).

FIG. 1 illustrates an example aircraft 100 in which an example distributed trailing edge wing flap system may be implemented in accordance with the teachings of this disclosure. Example distributed trailing edge wing flap systems disclosed herein may be implemented in commercial aircraft (e.g., the aircraft 100 of FIG. 1) as well as other types of aircraft (e.g., military aircraft, unmanned aerial vehicles, etc.). The aircraft 100 of FIG. 1 includes an example first wing 102, an example second wing 104, an example fuselage 106, and an example cockpit area 108. The first wing 102 includes an example first fixed trailing edge 110, an example first inboard flap 112, and an example first outboard flap 114. The first inboard flap 112 and the first outboard flap 114 are respectively located at and/or along the first fixed trailing edge 110 of the first wing 102. The second wing 104 includes an example second fixed trailing edge 116, an example second inboard flap 118, and an example second outboard flap 120. The second inboard flap 118 and the second outboard flap 120 are respectively located at and/or along the second fixed trailing edge 116 of the second wing 104.

In the illustrated example of FIG. 1, the first inboard flap 112 and the first outboard flap 114 are shown in respective retracted positions relative to the first fixed trailing edge 110 of the first wing 102, and the second inboard flap 118 and the second outboard flap 120 are shown in respective retracted positions relative to the second fixed trailing edge 116 of the second wing 104. The first inboard flap 112 and the first outboard flap 114 are movable and/or actuatable between the respective retracted positions shown in FIG. 1 and respective deployed positions in which the first inboard flap 112 and the first outboard flap 114 are extended rearward and/or downward from the first fixed trailing edge 110 of the first wing 102. The second inboard flap 118 and the second outboard flap 120 are similarly movable and/or actuatable between the respective retracted positions shown in FIG. 1 and respective deployed positions in which the second inboard flap 118 and the second outboard flap 120 are extended rearward and/or downward from the second fixed trailing edge 116 of the second wing 104. In some examples, respective ones of the wing flaps (e.g., the first inboard flap 112, the first outboard flap 114, the second inboard flap 118, and/or the second outboard flap 120) may be movable and/or actuatable to a variety of deployed positions corresponding to desired and/or commanded detents of the flaps (e.g., flaps thirty (F30), flaps forty (F40), etc.).

Figure 2A:
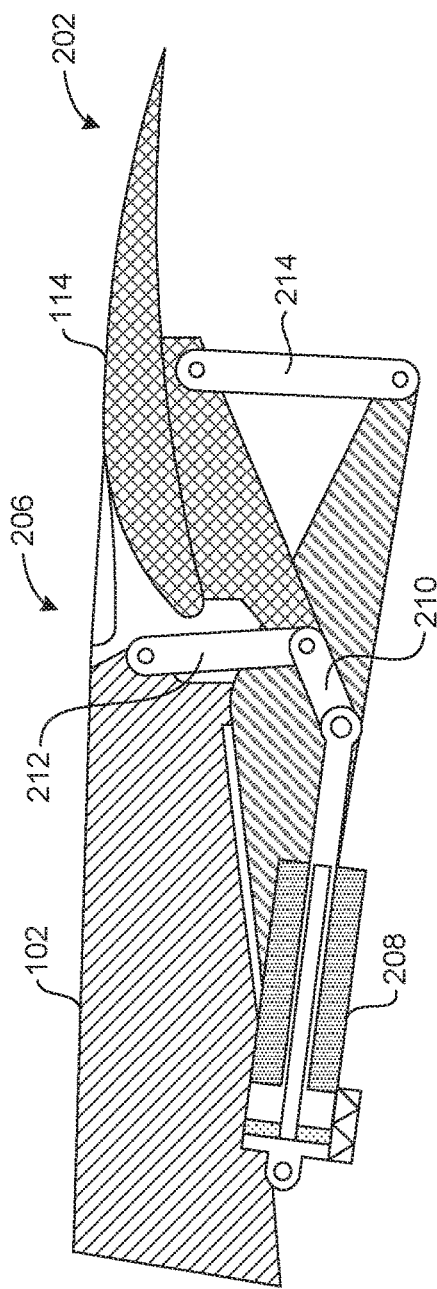
FIG. 2A is a cross-sectional view of the example first outboard flap of the example first wing of FIG. 1 in an example retracted position.
Figure 2B:
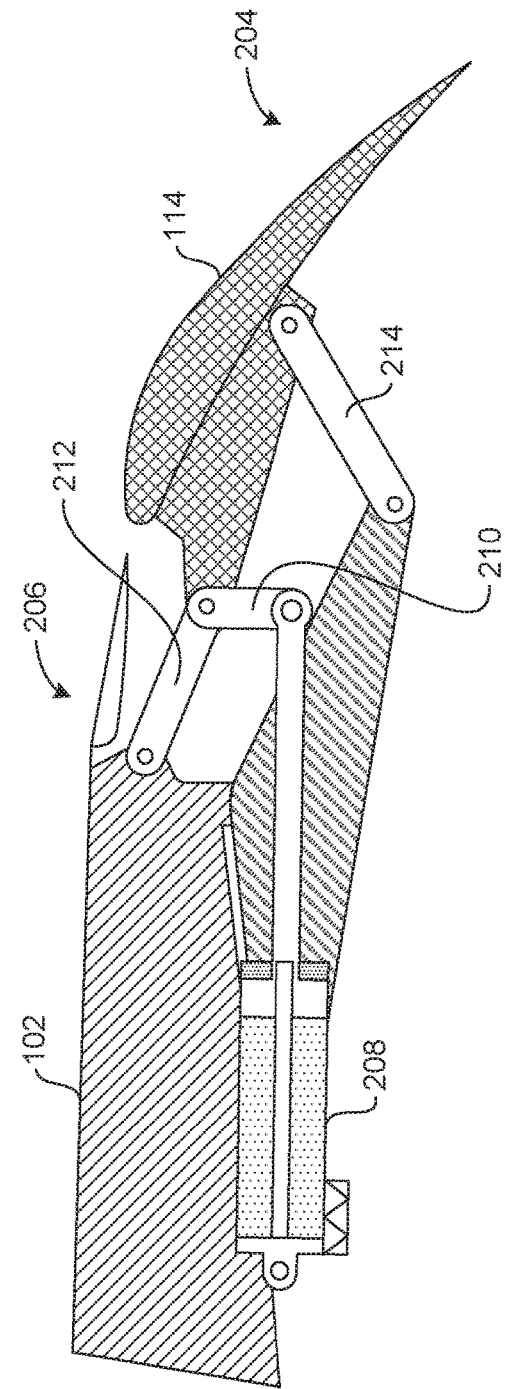
FIG. 2B is a cross-sectional view of the example first outboard flap of the example first wing of FIG. 1 in an example deployed position.

In some examples, respective ones of the wing flaps (e.g., the first inboard flap 112, the first outboard flap 114, the second inboard flap 118, and/or the second outboard flap 120) may be movable and/or actuatable between a retracted position and a deployed position via one or more actuator(s) (e.g., one or more hydraulic linear actuator(s), one or more hydraulic rotary actuator(s), etc.). FIG. 2A is a cross-sectional view of the example first outboard flap 114 of the example first wing 102 of FIG. 1 in an example retracted position 202. FIG. 2B is a cross-sectional view of the example first outboard flap 114 of the example first wing 102 of FIG. 1 in an example deployed position 204. In the illustrated example of FIGS. 2A and 2B, the first outboard flap 114 is coupled to the first wing 102 via an example linkage assembly 206. The first outboard flap 114 is movable and/or actuatable between the retracted position 202 of FIG. 2A and the deployed position 204 of FIG. 2B via an example actuator 208 coupled to the linkage assembly 206 and to the first wing 102. The linkage assembly 206 of FIGS. 2A and 2B includes an example first link 210, an example second link 212, and an example third link 214. In the illustrated example of FIGS. 2A and 2B, the first link 210 extends from the actuator 208 to the second link 212 and the first outboard flap 114. The second link 212 extends from the first link 210 and the first outboard flap 114 to the first wing 102. The third link 214 extends from the first wing 102 to the first outboard flap 114. In other examples, the configuration of the first link 210, the second link 212, and/or the third link 214 may differ from that shown in relation to the linkage assembly 206 of FIGS. 2A and 2B. In still other examples, the linkage assembly 206 of FIGS. 2A and 2B may include additional (e.g., a fourth, a fifth, a sixth, etc.) links beyond the first, second and third links 210, 212, 214 described above. Furthermore, while only a single linkage assembly and a single actuator are shown in the example of FIGS. 2A and 2B, additional (e.g., a second, a third, a fourth, etc.) linkage assemblies and corresponding additional actuators may also be implemented relative to the first outboard flap 114 and the first wing 102 to control and/or facilitate movement of the first outboard flap 114 between the retracted position 202 of FIG. 2A and the deployed position 204 of FIG. 2B.

In the illustrated example of FIGS. 1, 2A and 2B, each actuator (e.g., the actuator 208) may be powered, controlled, and/or operated via a corresponding hydraulic module operatively coupled to the actuator and located within a corresponding one of the wings (e.g., the first wing 102 or the second wing 104) of the aircraft 100. For example, the actuator 208 of FIGS. 2A and 2B coupled to the linkage assembly 206 and to the first wing 102 may be powered, controlled, and/or operated via a hydraulic module operatively coupled to the actuator 208 and located within the first wing 102. Each hydraulic module may be powered, controlled, and/or operated via a corresponding remote electronics unit (REU) operatively coupled to the hydraulic module and located within a corresponding one of the wings (e.g., the first wing 102 or the second wing 104) of the aircraft 100. Each REU may be powered, controlled, and/or operated via one or more flight control electronics unit(s) (FCEU) operatively coupled to the REU and located within the fuselage 106 of the aircraft 100. The one or more FCEU(s) may be controlled and/or operated based on one or more input(s) received from a flap lever and/or a pilot control inceptor operatively coupled to the FCEU(s) and located in the cockpit area 108 of the aircraft 100.

Figure 3:
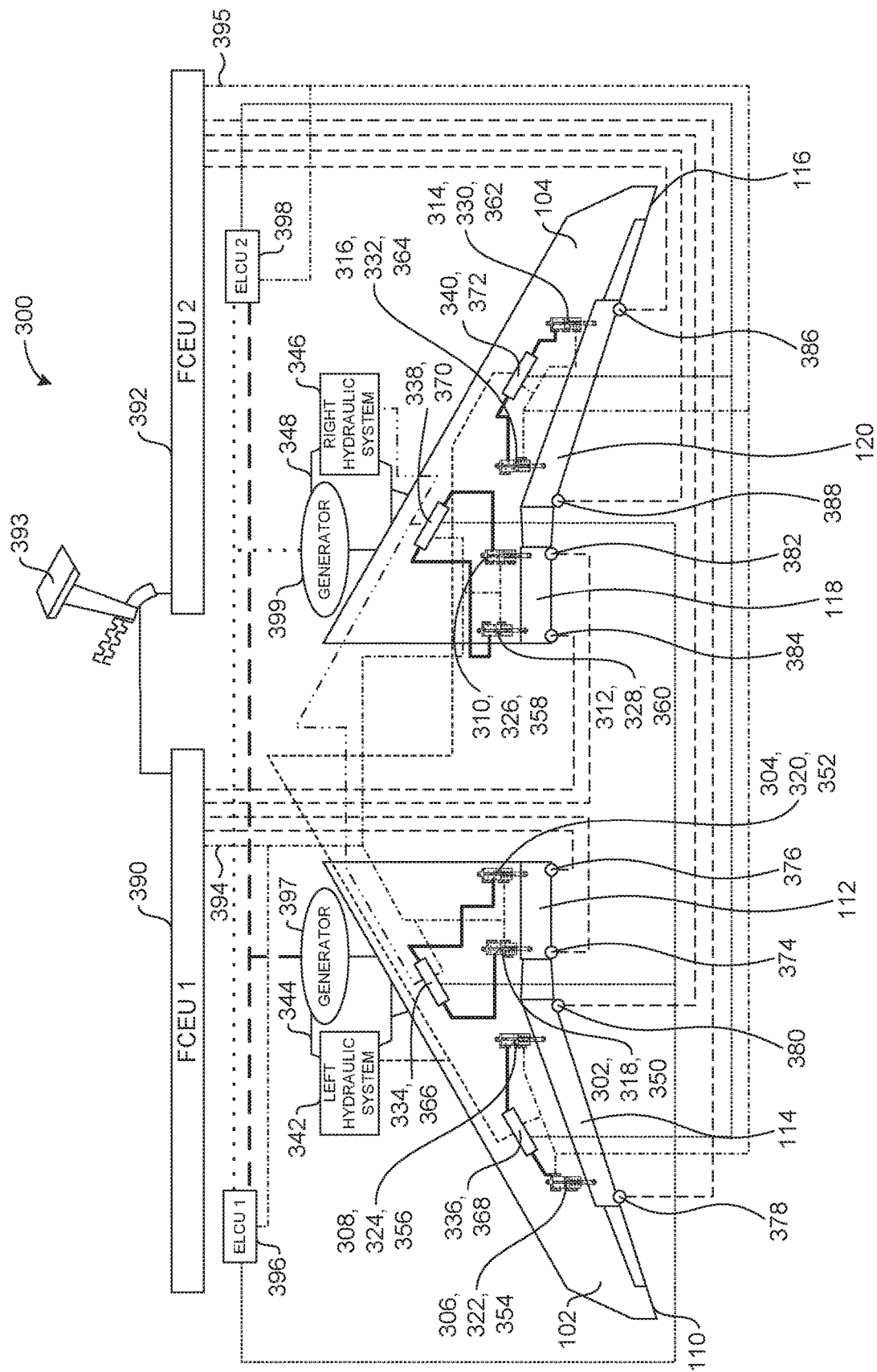
FIG. 3 is a schematic of an example distributed trailing edge wing flap system constructed in accordance with the teachings of this disclosure.

FIG. 3 is a schematic of an example distributed trailing edge wing flap system 300 constructed in accordance with the teachings of this disclosure. The distributed trailing edge wing flap system 300 of FIG. 3 may be implemented in the example aircraft 100 of FIG. 1 described above. In the illustrated example of FIG. 3, the distributed trailing edge wing flap system includes the first wing 102, the second wing 104, the first fixed trailing edge 110, the first inboard flap 112, the first outboard flap 114, the second fixed trailing edge 116, the second inboard flap 118, and the second outboard flap 120 of FIG. 1 described above.

The distributed trailing edge wing flap system 300 of FIG. 3 also includes an example first actuator 302, an example second actuator 304, an example third actuator 306, an example fourth actuator 308, an example fifth actuator 310, an example sixth actuator 312, an example seventh actuator 314, and an example eighth actuator 316. In the illustrated example of FIG. 3, the first actuator 302 and the second actuator 304 are respectively coupled to the first inboard flap 112 and to the first wing 102. The third actuator 306 and the fourth actuator 308 are respectively coupled to the first outboard flap 114 and to the first wing 102. The fifth actuator 310 and the sixth actuator 312 are respectively coupled to the second inboard flap 118 and to the second wing 104. The seventh actuator 314 and the eighth actuator 316 are respectively coupled to the second outboard flap 120 and to the second wing 104.

The first, second, third, fourth, fifth, sixth, seventh and eighth actuators 302, 304, 306, 308, 310, 312, 314, 316 respectively move and/or actuate correspondingly coupled ones of the first inboard flap 112, the first outboard flap 114, the second inboard flap 118, and the second outboard flap 120 between respective retracted positions and respective deployed positions. For example, in the illustrated example of FIG. 3, the first actuator 302 and the second actuator 304 move and/or actuate the first inboard flap 112 between a retracted position (as shown in FIG. 3) and a deployed position relative the first fixed trailing edge 110 of the first wing 102. The third actuator 306 and the fourth actuator 308 move and/or actuate the first outboard flap 114 between a retracted position (as shown in FIG. 3) and a deployed position relative the first fixed trailing edge 110 of the first wing 102. The fifth actuator 310 and the sixth actuator 312 move and/or actuate the second inboard flap 118 between a retracted position (as shown in FIG. 3) and a deployed position relative the second fixed trailing edge 116 of the second wing 104. The seventh actuator 314 and the eighth actuator 316 move and/or actuate the second outboard flap 120 between a retracted position (as shown in FIG. 3) and a deployed position relative the second fixed trailing edge 116 of the second wing 104.

Although not visible in FIG. 3, respective ones of the first, second, third, fourth, fifth, sixth, seventh and eighth actuators 302, 304, 306, 308, 310, 312, 314, 316 include an actuator position feedback sensor to sense, measure and/or detect a position of the actuator. In some examples, the position of the actuator sensed, measured and/or detected via the actuator position feedback sensor may correspond to and/or indicate a position (e.g., a retracted position, a deployed position, etc.) of the corresponding wing flap to which the actuator is coupled. An actuator position feedback sensor that may be included in and/or implemented by respective ones of the first, second, third, fourth, fifth, sixth, seventh and eighth actuators 302, 304, 306, 308, 310, 312, 314, 316 of FIG. 3 is further described below in connection with FIG. 4.

The distributed trailing edge wing flap system 300 of FIG. 3 also includes an example first hydraulic module 318, an example second hydraulic module 320, an example third hydraulic module 322, an example fourth hydraulic module 324, an example fifth hydraulic module 326, an example sixth hydraulic module 328, an example seventh hydraulic module 330, an example eighth hydraulic module 332, an example ninth hydraulic module 334, an example tenth hydraulic module 336, an example eleventh hydraulic module 338, and an example twelfth hydraulic module 340. In some examples, the first, second, third, fourth, ninth and tenth hydraulic modules 318, 320, 322, 324, 334, 336 are located within the first wing 102, and the fifth, sixth, seventh, eighth, eleventh and twelfth hydraulic modules 326, 328, 330, 332, 338, 340 are located within the second wing 104.

In the illustrated example of FIG. 3, the first hydraulic module 318 is located at and is operatively coupled to (e.g., in fluid communication with) the first actuator 302, the second hydraulic module 320 is located at and is operatively coupled to the second actuator 304, the third hydraulic module 322 is located at and is operatively coupled to the third actuator 306, the fourth hydraulic module 324 is located at and is operatively coupled to the fourth actuator 308, the fifth hydraulic module 326 is located at and is operatively coupled to the fifth actuator 310, the sixth hydraulic module 328 is located at and is operatively coupled to the sixth actuator 312, the seventh hydraulic module 330 is located at and is operatively coupled to the seventh actuator 314, and the eighth hydraulic module 332 is located at and is operatively coupled to the eighth actuator 316.

As further shown in the illustrated example of FIG. 3, the ninth hydraulic module 334 is located remotely from and is operatively coupled to the first hydraulic module 318 and the second hydraulic module 320. The tenth hydraulic module 336 is located remotely from and is operatively coupled to the third hydraulic module 322 and the fourth hydraulic module 324. The eleventh hydraulic module 338 is located remotely from and is operatively coupled to the fifth hydraulic module 326 and the sixth hydraulic module 328. The twelfth hydraulic module 340 is located remotely from and is operatively coupled to the seventh hydraulic module 330 and the eighth hydraulic module 332. In some examples, respective ones of the first, second, third, fourth, fifth, sixth, seventh and eighth hydraulic modules 318, 320, 322, 324, 326, 328, 330, 332 may be implemented according to a first configuration (e.g., as further described below in connection with FIGS. 8-23), and respective ones of the ninth, tenth, eleventh and twelfth hydraulic modules 334, 336, 338, 340 may be implemented according to a second configuration (e.g., as further described below in connection with FIGS. 6 and 7).

The distributed trailing edge wing flap system 300 of FIG. 3 also includes an example first hydraulic system 342 powered by an example first engine 344, and an example second hydraulic system 346 powered by an example second engine 348. In the illustrated example of FIG. 3, the first engine 344 is coupled to the first wing 102, and the second engine 348 is coupled to the second wing 104. The first engine 344 powers the first hydraulic system 342 to supply pressurized hydraulic fluid to respective ones of the third and fourth hydraulic modules 322, 324 via the tenth hydraulic module 336, and to respective ones of the seventh and eighth hydraulic modules 330, 332 via the twelfth hydraulic module 340. The second engine 348 powers the second hydraulic system 346 to supply pressurized hydraulic fluid to respective ones of the first and second hydraulic modules 318, 320 via the ninth hydraulic module 334, and to respective ones of the fifth and sixth hydraulic modules 326, 328 via the eleventh hydraulic module 338.

Pressurized hydraulic fluid supplied via the first hydraulic system 342 of FIG. 3 to respective ones of the third and fourth hydraulic modules 322, 324 via the tenth hydraulic module 336 may be delivered to corresponding respective ones of the third and fourth actuators 306, 308 to move and/or actuate the third and fourth actuators 306, 308. Pressurized hydraulic fluid contained within respective ones of the third and fourth actuators 306, 308 may be returned to the first hydraulic system 342 via corresponding respective ones of the third and fourth hydraulic modules 322, 324 and further via the tenth hydraulic module 336. Pressurized hydraulic fluid supplied via the first hydraulic system 342 of FIG. 3 to respective ones of the seventh and eighth hydraulic modules 330, 332 via the twelfth hydraulic module 340 may be delivered to corresponding respective ones of the seventh and eighth actuators 314, 316 to move and/or actuate the seventh and eighth actuators 314, 316. Pressurized hydraulic fluid contained within respective ones of the seventh and eighth actuators 314, 316 may be returned to the first hydraulic system 342 via corresponding respective ones of the seventh and eighth hydraulic modules 330, 332 and further via the twelfth hydraulic module 340.

Pressurized hydraulic fluid supplied via the second hydraulic system 346 of FIG. 3 to respective ones of the first and second hydraulic modules 318, 320 via the ninth hydraulic module 334 may be delivered to corresponding respective ones of the first and second actuators 302, 304 to move and/or actuate the first and second actuators 302, 304. Pressurized hydraulic fluid contained within respective ones of the first and second actuators 302, 304 may be returned to the second hydraulic system 346 via corresponding respective ones of the first and second hydraulic modules 318, 320 and further via the ninth hydraulic module 334. Pressurized hydraulic fluid supplied via the second hydraulic system 346 of FIG. 3 to respective ones of the fifth and sixth hydraulic modules 326, 328 via the eleventh hydraulic module 338 may be delivered to corresponding respective ones of the fifth and sixth actuators 310, 312 to move and/or actuate the fifth and sixth actuators 310, 312. Pressurized hydraulic fluid contained within respective ones of the fifth and sixth actuators 310, 312 may be returned to the second hydraulic system 346 via corresponding respective ones of the fifth and sixth hydraulic modules 326, 328 and further via the eleventh hydraulic module 338.

The distributed trailing edge wing flap system 300 of FIG. 3 also includes an example first REU 350, an example second REU 352, an example third REU 354, an example fourth REU 356, an example fifth REU 358, an example sixth REU 360, an example seventh REU 362, an example eighth REU 364, an example ninth REU 366, an example tenth REU 368, an example eleventh REU 370, and an example twelfth REU 372. In some examples, the first, second, third, fourth, ninth and tenth REUs 350, 352, 354, 356, 366, 368 are located within the first wing 102, and the fifth, sixth, seventh, eighth, eleventh and twelfth REUs 358, 360, 362, 364, 370, 372 are located within the second wing 104.

In the illustrated example of FIG. 3, the first REU 350 is located at and is operatively coupled to (e.g., in electrical communication with) the first hydraulic module 318, the second REU 352 is located at and is operatively coupled to the second hydraulic module 320, the third REU 354 is located at and is operatively coupled to the third hydraulic module 322, the fourth REU 356 is located at and is operatively coupled to the fourth hydraulic module 324, the fifth REU 358 is located at and is operatively coupled to the fifth hydraulic module 326, the sixth REU 360 is located at and is operatively coupled to the sixth hydraulic module 328, the seventh REU 362 is located at and is operatively coupled to the seventh hydraulic module 330, the eighth REU 364 is located at and is operatively coupled to the eighth hydraulic module 332, the ninth REU 366 is located at and is operatively coupled to the ninth hydraulic module 334, the tenth REU 368 is located at and is operatively coupled to the tenth hydraulic module 336, the eleventh REU 370 is located at and is operatively coupled to the eleventh hydraulic module 338, and the twelfth REU 372 is located at and is operatively coupled to the twelfth hydraulic module 340. Respective ones of the first, second, third, fourth, fifth, sixth, seventh, eighth, ninth, tenth, eleventh and twelfth REUs 350, 352, 354, 356, 358, 360, 362, 364, 366, 368, 370, 372 control corresponding respective ones of the first, second, third, fourth, fifth, sixth, seventh, eighth, ninth, tenth, eleventh and twelfth hydraulic modules 318, 320, 322, 324, 326, 328, 330, 332, 334, 336, 338, 340, as further described below in connection with FIGS. 4-23.

In some examples, the first REU 350 is further operatively coupled to (e.g., in electrical communication with) the actuator position feedback sensor of the first actuator 302, the second REU 352 is further operatively coupled to the actuator position feedback sensor of the second actuator 304, the third REU 354 is further operatively coupled to the actuator position feedback sensor of the third actuator 306, the fourth REU 356 is further operatively coupled to the actuator position feedback sensor of the fourth actuator 308, the fifth REU 358 is further operatively coupled to the actuator position feedback sensor of the fifth actuator 310, the sixth REU 360 is further operatively coupled to the actuator position feedback sensor of the sixth actuator 312, the seventh REU 362 is further operatively coupled to the actuator position feedback sensor of the seventh actuator 314, and the eighth REU 364 is further operatively coupled to the actuator position feedback sensor of the eighth actuator 316. In such examples, respective ones of the first, second, third fourth, fifth, sixth, seventh and eighth REUs 350, 352, 354, 356, 358, 360, 362, 364 may control corresponding respective ones of the first, second, third, fourth, fifth, sixth, seventh and eighth hydraulic modules 318, 320, 322, 324, 326, 328, 330, 332 based on actuator position feedback data obtained by respective ones of the first, second, third fourth, fifth, sixth, seventh and eighth REUs 350, 352, 354, 356, 358, 360, 362, 364 from corresponding respective ones of the first, second, third, fourth, fifth, sixth, seventh and eighth actuator position feedback sensors of corresponding respective ones of the first, second, third, fourth, fifth, sixth, seventh and eighth actuators 302, 304, 306, 308, 310, 312, 314, 316, as further described below in connection with FIGS. 4-23.

The distributed trailing edge wing flap system 300 of FIG. 3 also includes an example first flap position sensor 374, an example second flap position sensor 376, an example third flap position sensor 378, an example fourth flap position sensor 380, an example fifth flap position sensor 382, an example sixth flap position sensor 384, an example seventh flap position sensor 386, and an example eighth flap position sensor 388. In the illustrated example of FIG. 3, the first flap position sensor 374 and the second flap position sensor 376 are respectively coupled to the first inboard flap 112 of the first wing 102. The third flap position sensor 378 and the fourth flap position sensor 380 are respectively coupled to the first outboard flap 114 of the first wing 102. The fifth flap position sensor 382 and the sixth flap position sensor 384 are respectively coupled to the second inboard flap 118 of the second wing 104. The seventh flap position sensor 386 and the eighth flap position sensor 388 are respectively coupled to the second outboard flap 120 of the second wing 104. Respective ones of the first, second, third, fourth, fifth, sixth, seventh and eighth flap position sensors 374, 376, 378, 380, 382, 384, 386, 388 sense, measure and/or detect a position of a correspondingly coupled one of the first inboard flap 112, the first outboard flap 114, the second inboard flap 118, and the second outboard flap 120. For example, the first flap position sensor 374 and the second flap position sensor 376 may respectively sense, measure and/or detect a position of the first inboard flap 112 of the first wing 102 relative to the first fixed trailing edge 110 of the first wing 102.

The distributed trailing edge wing flap system 300 of FIG. 3 also includes an example first FCEU 390, an example second FCEU 392, and an example flap lever 393. In some examples, the first FCEU 390 and the second FCEU 392 of FIG. 3 may be located within a fuselage of an aircraft (e.g., the fuselage 106 of the aircraft 100 of FIG. 1), and the flap lever 393 of FIG. 3 may be located in a cockpit area of the aircraft (e.g., the cockpit area 108 of the aircraft 100 of FIG. 1). The first FCEU 390 and the second FCEU 392 of FIG. 3 are respectively controlled and/or operated based on one or more input(s) received from the flap lever 393 of FIG. 3. In some examples, the position of the flap lever 393 may correspond to and/or otherwise be associated with a desired and/or commanded position and/or detent (e.g., flaps retracted, flaps thirty (F30), flaps forty (F40), etc.) of the first inboard flap 112, the first outboard flap 114, the second inboard flap 118, and/or the second outboard flap 120.

In the illustrated example of FIG. 3, the first FCEU 390 is operatively coupled to (e.g., in electrical communication with) respective ones of the first, second, fifth, sixth, ninth and eleventh REUs 350, 352, 358, 360, 366, 370 via an example first databus 394. The first FCEU 390 may transmit and/or receive data (e.g., REU control data, hydraulic module control data, actuator position feedback sensor data, etc.) to and/from respective ones of the first, second, fifth, sixth, ninth and eleventh REUs 350, 352, 358, 360, 366, 370 via the first databus 394. The first FCEU 390 is also operatively coupled to (e.g., in electrical communication with) respective ones of the first, second, fifth and sixth flap position sensors 374, 376, 382, 384. The first FCEU 390 may receive data (e.g., flap position sensor data) from respective ones of the first, second, fifth and sixth flap position sensors 374, 376, 382, 384.

The second FCEU 392 is operatively coupled to (e.g., in electrical communication with) respective ones of the third, fourth, seventh, eighth, tenth and twelfth REUs 354, 356, 362, 364, 368, 372 via an example second databus 395. The second FCEU 392 may transmit and/or receive data (e.g., REU control data, hydraulic module control data, actuator position feedback sensor data, etc.) to and/from respective ones of the third, fourth, seventh, eighth, tenth and twelfth REUs 354, 356, 362, 364, 368, 372 via the second databus 395. The second FCEU 392 is also operatively coupled to (e.g., in electrical communication with) respective ones of the third, fourth, seventh and eighth flap position sensors 378, 380, 386, 388. The second FCEU 392 may receive data (e.g., flap position sensor data) from respective ones of the third, fourth, seventh and eighth flap position sensors 378, 380, 386, 388.

The distributed trailing edge wing flap system 300 of FIG. 3 also includes an example first electrical load control unit (ELCU) 396, an example first generator 397 (e.g., a first electrical system), an example second ELCU 398, and an example second generator 399 (e.g., a second electrical system). The first generator 397 is powered by the first engine 344, and the second generator 399 is powered by the second engine 348. The first generator 397 provides electrical power to the first ELCU 396 and to the second ELCU 398. The second generator 399 also provides electrical power to the first ELCU 396 and to the second ELCU 398. The first ELCU 396 is operatively coupled (e.g. in electrical communication with) the first FCEU 390 via the first databus 394 such that the first FCEU 390 may transmit and/or receive data (e.g., ELCU control data) to and/from the first ELCU 396 via the first databus 394. The second ELCU 398 is operatively coupled (e.g., in electrical communication with) the second FCEU 392 via the second databus 395 such that the second FCEU 392 may transmit and/or receive data (e.g., ELCU control data) to and/from the second ELCU 398 via the second databus 395.

In the illustrated example of FIG. 3, the first and second ELCUs 396, 398 respectively operate as remotely controlled circuit breakers. For example, the first ELCU 396 selectively provides (e.g., selectively connects) electrical power generated by either the first generator 397 (e.g., the first electrical system) or the second generator 399 (e.g., the second electrical system) to respective ones of the ninth and eleventh hydraulic modules 334, 338. The first ELCU 396 may alternatively prevent electrical power generated by the first and second generators 397, 399 from being provided to respective ones of the ninth and eleventh hydraulic modules 334, 338. As another example, the second ELCU 398 selectively provides (e.g., selectively connects) electrical power generated by either the first generator 397 (e.g., the first electrical system) or the second generator 399 (e.g., the second electrical system) to respective ones of the tenth and twelfth hydraulic modules 336, 340. The second ELCU 398 may alternatively prevent electrical power generated by the first and second generators 397, 399 from being provided to respective ones of the tenth and twelfth hydraulic modules 336, 340. As briefly discussed above and further described herein, the ninth, tenth, eleventh and twelfth hydraulic modules 334, 336, 338, 340 of FIG. 3 may be implemented as HM2 hydraulic modules.

The first ELCU 396 may be instructed to provide electrical power from the first generator 397 or the second generator 399 based on a control signal and/or a command transmitted from the first FCEU 390 to the first ELCU 396 via the first databus 394. In some examples, the first FCEU 390 may transmit the control signal and/or the command to the first ELCU 396 following and/or in response to a failure of the first hydraulic system 342 and/or a failure of the second hydraulic system 346 of FIG. 3. The electrical power provided from the first ELCU 396 to the ninth and eleventh hydraulic modules 334, 338 (e.g., either from the first generator 397 or the second generator 399) causes the ninth and eleventh hydraulic modules 334, 338 to provide auxiliary pressurized hydraulic fluid (e.g., from a fluid compensator) maintained in the ninth and eleventh hydraulic modules 334, 338 to corresponding ones of the first actuator 302, the second actuator 304, the fifth actuator 310, and the sixth actuator 312 to move and/or actuate corresponding ones of the first inboard flap 112 and the second inboard flap 118 to a predetermined position (e.g., flaps thirty (F30), flaps forty (F40), etc.).

The second ELCU 398 may be instructed to provide electrical power from the first generator 397 or the second generator 399 based on a control signal and/or a command transmitted from the second FCEU 392 to the second ELCU 398 via the second databus 395. In some examples, the second FCEU 392 may transmit the control signal and/or the command to the second ELCU 398 following and/or in response to a failure of the first hydraulic system 342 and/or a failure of the second hydraulic system 346 of FIG. 3. The electrical power provided from the second ELCU 398 to the tenth and twelfth hydraulic modules 336, 340 (e.g., either from the first generator 397 or the second generator 399) causes the tenth and twelfth hydraulic modules 336, 340 to provide auxiliary pressurized hydraulic fluid (e.g., from a fluid compensator) maintained in the tenth and twelfth hydraulic modules 336, 340 to corresponding ones of the third actuator 306, the fourth actuator 308, the seventh actuator 314, and the eighth actuator 316 to move and/or actuate corresponding ones of the first outboard flap 114 and the second outboard flap 120 to a predetermined position (e.g., flaps thirty (F30), flaps forty (F40), etc.).

Figure 4:
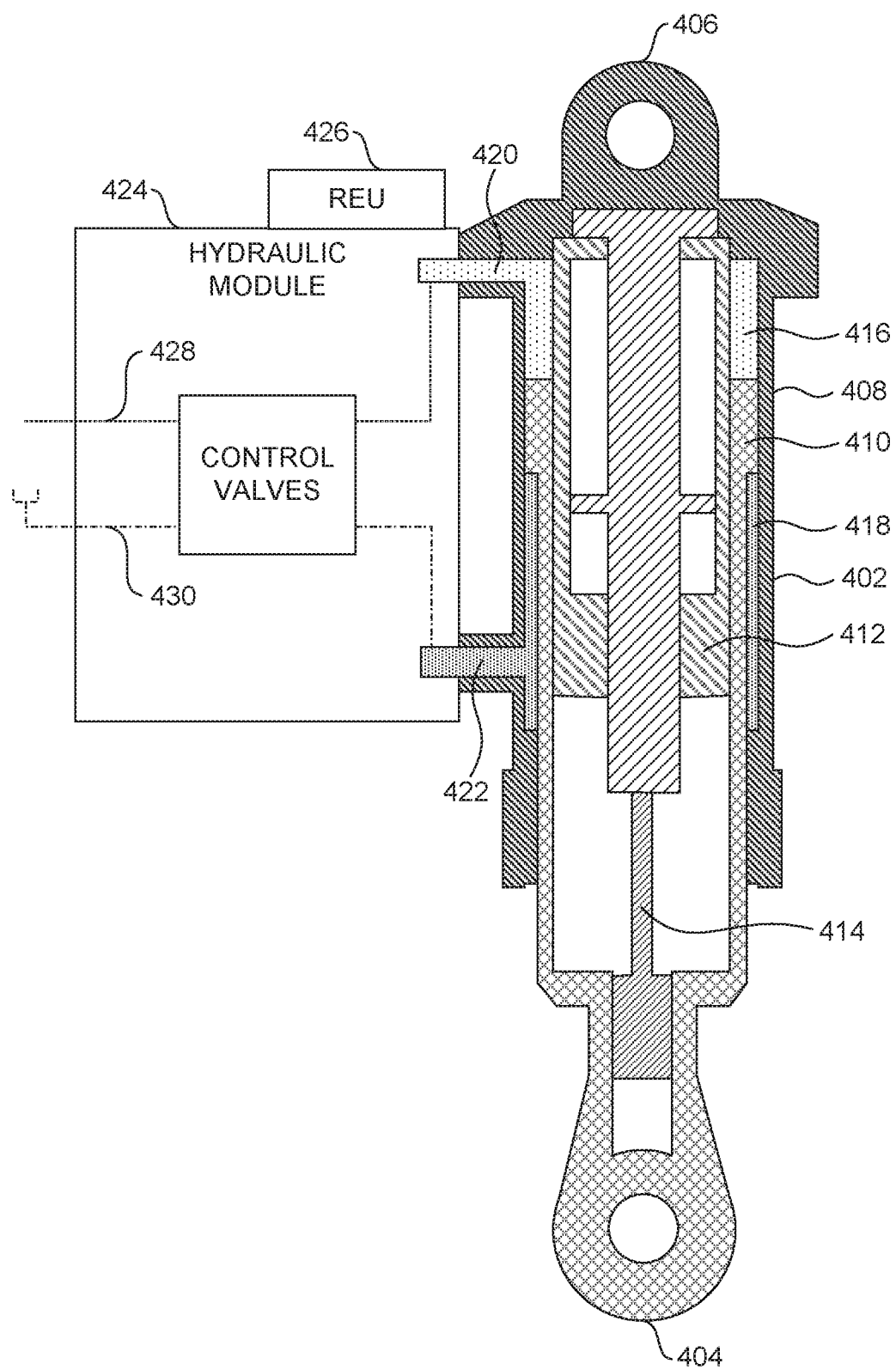
FIG. 4 is a schematic of an example actuator that may be implemented in the example distributed trailing edge wing flap system of FIG. 3.

FIG. 4 is a schematic of an example actuator 402 that may be implemented in the example distributed trailing edge wing flap system 300 of FIG. 3. For example, any of the first, second, third, fourth, fifth, sixth, seventh and/or eighth actuators 302, 304, 306, 308, 310, 312, 314, 316 of FIG. 3 may be implemented by the actuator 402 of FIG. 4. In the illustrated example of FIG. 4, the actuator 402 includes an example first end 404, an example second end 406 located opposite the first end 404, an example cylinder 408, an example piston 410, an example balance tube 412, an example linear variable differential transducer (LVDT) 414, an example first fluid volume 416, an example second fluid volume 418, an example first port 420, and an example second port 422. An example hydraulic module 424 is located at and is operatively coupled to the actuator 402. An example REU 426 is located at and is operatively coupled to the hydraulic module 424 and/or the actuator 402.

In the illustrated example of FIG. 4, the first end 404 of the actuator 402 may be coupled to a linkage assembly (e.g., the linkage assembly 206 of FIGS. 2A and 2B) of a wing flap (e.g., the first inboard flap 112, the first outboard flap 114, the second inboard flap 118, or the second outboard flap 120 of FIGS. 1 and 3), and the second end 406 of the actuator 402 may be coupled to a corresponding wing (e.g., the first wing 102 of the second wing 104 of FIGS. 1 and 3). The cylinder 408 and the piston 410 have respective fixed lengths. The piston 410 is positioned, disposed, and/or received within the cylinder 408 and is movable and/or slidable relative to the cylinder 408 between a retracted position and an extended position. In some examples, the actuator 402 of FIG. 4 has a first length when the piston 410 is in the retracted position relative to the cylinder 408, and a second length greater than the first length when the piston 410 is in the extended position relative to the cylinder 408.

The piston 410 of FIG. 4 is located and/or positioned within the cylinder 408 between the first fluid volume 416 and the second fluid volume 418. In the illustrated example of FIG. 4, the piston 410 has an annular shape such that the piston 410 surrounds, circumscribes, and/or rides on the balance tube 412. The LVDT 414 of FIG. 4 is located within the balance tube 412 and/or the piston 410. The LVDT 414 senses, measures and/or detects a position (e.g., a retracted position, an extended position, etc.) of the piston 410 of FIG. 4. Any of the first, second, third, fourth, fifth, sixth, seventh and/or eighth actuator position feedback sensors described above in connection with FIG. 3 may be implemented by the LVDT 414 of FIG. 4. The LVDT 414 of FIG. 4 is operatively coupled to (e.g., in electrical communication with) the REU 426 of FIG. 4 such that the REU 426 may receive and/or obtain actuator position feedback data sensed, measured and/or detected via the LVDT 414.

The first fluid volume 416 of FIG. 4 includes and/or is a first volume of pressurized hydraulic fluid. In the illustrated example of FIG. 4, the first fluid volume 416 is in fluid communication with the first port 420 of the actuator 402, and is bounded by the cylinder 408, the piston 410, and the balance tube 412. The second fluid volume 418 of FIG. 4 includes and/or is a second volume of pressurized hydraulic fluid that is isolated from the first volume of pressurized hydraulic fluid. In the illustrated example of FIG. 4, the second fluid volume 418 is in fluid communication with the second port 422 of the actuator 402, and is bounded by the cylinder 408 and the piston 410. The first fluid volume 416 and the second fluid volume 418 of FIG. 4 are slightly unbalanced as a result of the piston 410 riding on the balance tube 412. In some examples, one or more seal(s) may be coupled to and/or disposed on the piston 410. In such examples, the seal(s) of the piston 410 may provide one or more interface(s) between the piston 410 and the cylinder 408, and/or between the piston 410 and the balance tube 412, to isolate the first fluid volume 416 from the second fluid volume 418.

Increasing the first fluid volume 416 of FIG. 4 (e.g., increasing the volume of the pressurized hydraulic fluid of the first fluid volume 416) causes the piston 410 of FIG. 4 to move and/or slide relative to the cylinder 408 of FIG. 4 away from a retracted position and toward an extended position. A wing flap coupled via a linkage assembly to the first end 404 of the actuator 402 may move away from a retracted position and toward a deployed position in response to the piston 410 moving away from the retracted position and toward the extended position. In the illustrated example of FIG. 4, the first fluid volume 416 has a minimum volume when the piston 410 is in the retracted position, and has a maximum volume when the piston 410 is in the extended position.

Increasing the second fluid volume 418 of FIG. 4 (e.g., increasing the volume of the pressurized hydraulic fluid of the second fluid volume 418) causes the piston 410 of FIG. 4 to move and/or slide relative to the cylinder 408 of FIG. 4 away from an extended position and toward a retracted position. A wing flap coupled via a linkage assembly to the first end 404 of the actuator 402 may move away from a deployed position and toward a retracted position in response to the piston 410 moving away from the extended position and toward the retracted position. In the illustrated example of FIG. 4, the second fluid volume 418 has a minimum volume when the piston 410 is in the extended position, and has a maximum volume when the piston 410 is in the retracted position.

The hydraulic module 424 of FIG. 4 is operatively coupled to (e.g., in fluid communication with) the actuator 402 of FIG. 4 and is also operatively coupled to (e.g., in electrical communication with) the REU 426 of FIG. 4. In the illustrated example of FIG. 4, the hydraulic module 424 includes and/or is in fluid communication with an example supply line 428 and an example return line 430. In some examples, the supply line 428 and the return line 430 are associated with a hydraulic system of an aircraft (e.g., the first hydraulic system 342 or the second hydraulic system 346 of FIG. 3).

The hydraulic module 424 of FIG. 4 may selectively place the supply line 428 in fluid communication with either the first port 420 or the second port 422 of the actuator 402 to selectively provide pressurized hydraulic fluid to the first fluid volume 416 or the second fluid volume 418 of the actuator 402. The hydraulic module 424 of FIG. 4 may also selectively place the return line 430 in fluid communication with either the first port 420 or the second port 422 of the actuator 402 to selectively receive pressurized hydraulic fluid from the first fluid volume 416 or the second fluid volume 418 of the actuator 402. Any of the first, second, third, fourth, fifth, sixth, seventh and/or eighth hydraulic modules 318, 320, 32, 324, 326, 328, 330, 332 of FIG. 3 may be implemented by the hydraulic module 424 of FIG. 4. In some examples, the hydraulic module 424 of FIG. 4 may be implemented as described below in connection with FIGS. 8-23.

The REU 426 of FIG. 4 includes one or more processor(s) to control and/or manage loop closure, failure detection, and/or actuation control commands associated with the hydraulic module 424. In some examples, the REU 426 of FIG. 4 may be located adjacent the actuator 402 of FIG. 4. In other examples, the REU 426 of FIG. 4 may be integrated into the actuator 402 of FIG. 4. Any of the first, second, third, fourth, fifth, sixth, seventh and/or eighth REUs 350, 352, 354, 356, 358, 360, 362, 364 of FIG. 3 may be implemented by the REU 426 of FIG. 4.

Figure 5:
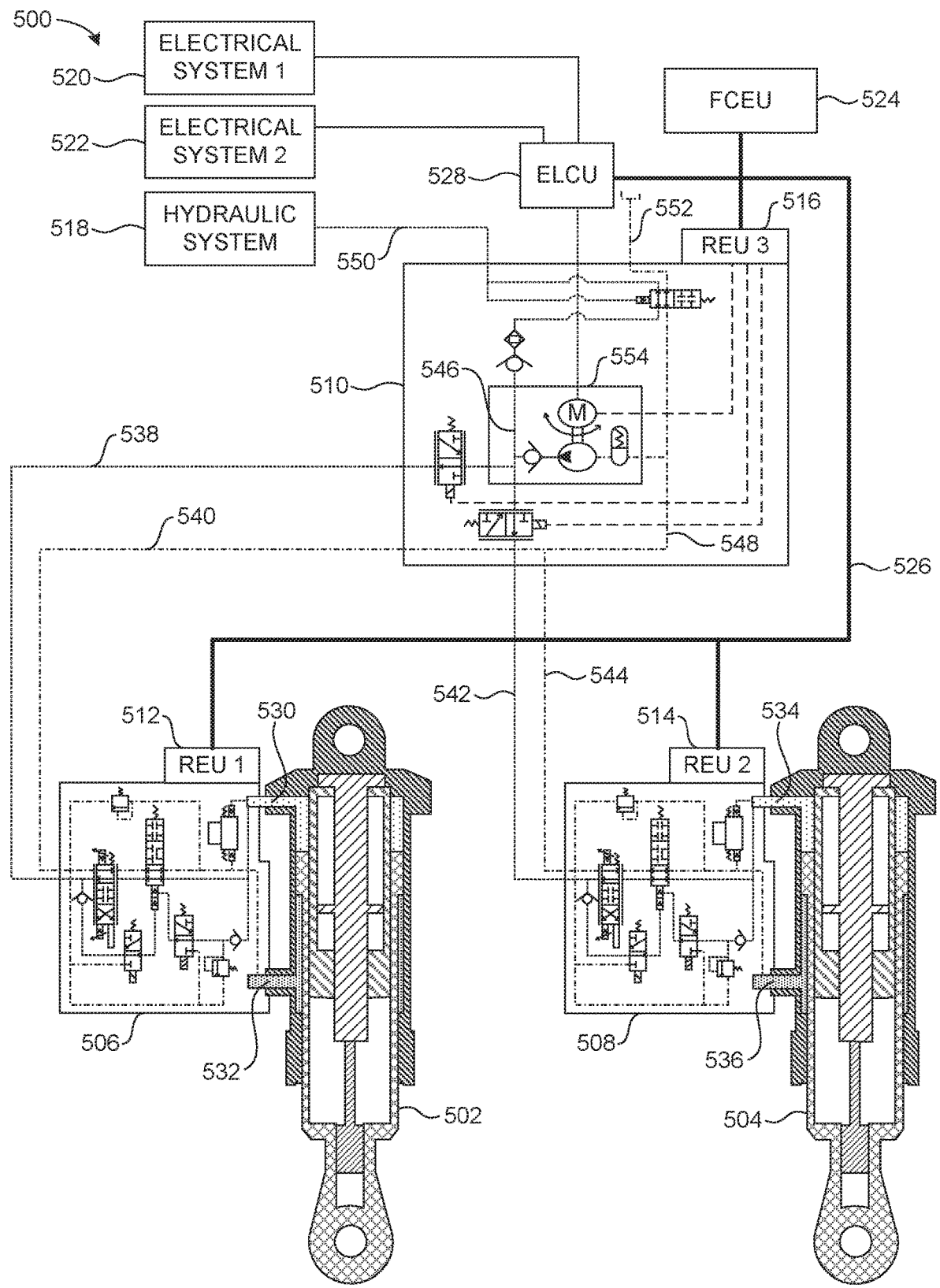
FIG. 5 is a schematic of an example subsystem of the example distributed trailing edge wing flap system of FIG. 3.

FIG. 5 is a schematic of an example subsystem 500 of the example distributed trailing edge wing flap system 300 of FIG. 3. The subsystem 500 of FIG. 5 includes a first example actuator 502, a second example actuator 504, a first example hydraulic module 506, a second example hydraulic module 508, a third example hydraulic module 510, a first example REU 512, a second example REU 514, a third example REU 516, an example hydraulic system 518, a first example electrical system 520, a second example electrical system 522, an example FCEU 524, an example databus 526, and an example ELCU 528. The subsystem 500 of FIG. 5 is representative of the structures and operative couplings associated with any one of the first inboard flap 112, the first outboard flap 114, the second inboard flap 118, or the second outboard flap 120 of FIG. 3 described above.

For example, the first actuator 502, the second actuator 504, the first hydraulic module 506, the second hydraulic module 508, the third hydraulic module 510, the first REU 512, the second REU 514, the third REU 516, the hydraulic system 518, the first electrical system 520, the second electrical system 522, the FCEU 524, the databus 526, and the ELCU 528 of FIG. 5 may correspond, respectively, to the first actuator 302, the second actuator 304, the first hydraulic module 318, the second hydraulic module 320, the ninth hydraulic module 334, the first REU 350, the second REU 352, the ninth REU 366, the second hydraulic system 346, the first generator 397 (e.g., the first electrical system), the second generator 399 (e.g., the second electrical system), the first FCEU 390, the first databus 394, and the first ELCU 396 of FIG. 3 associated with the first inboard flap 112 of FIG. 3. As another example, the first actuator 502, the second actuator 504, the first hydraulic module 506, the second hydraulic module 508, the third hydraulic module 510, the first REU 512, the second REU 514, the third REU 516, the hydraulic system 518, the first electrical system 520, the second electrical system 522, the FCEU 524, the databus 526, and the ELCU 528 of FIG. 5 may correspond, respectively, to the third actuator 306, the fourth actuator 308, the third hydraulic module 322, the fourth hydraulic module 324, the tenth hydraulic module 336, the third REU 354, the fourth REU 356, the tenth REU 368, the first hydraulic system 342, the first generator 397 (e.g., the first electrical system), the second generator 399 (e.g., the second electrical system), the second FCEU 392, the second databus 395, and the second ELCU 398 of FIG. 3 associated with the first outboard flap 114 of FIG. 3.

In the illustrated example of FIG. 5, the first hydraulic module 506 is located at and is operatively coupled to (e.g., in fluid communication with) the first actuator 502. The second hydraulic module 508 is located at and is operatively coupled to (e.g., in fluid communication with) the second actuator 504. The third hydraulic module 510 is located remotely from, and is operatively coupled to (e.g., in fluid communication with), both the first hydraulic module 506 and the second hydraulic module 508. More specifically, the first hydraulic module 506 is operatively coupled to the first actuator 502 via a first example port 530 and a second example port 532 of the first actuator 502 (e.g., corresponding to the first and second ports 420, 422 of FIG. 4 described above). The second hydraulic module 508 is operatively coupled to the second actuator 504 via a first example port 534 and a second example port 536 of the second actuator 504 (e.g., corresponding to the first and second ports 420, 422 of FIG. 4 described above). The third hydraulic module 510 is operatively coupled to the first hydraulic module 506 via a first example supply line branch 538 and a first example return line branch 540. The third hydraulic module 510 is operatively coupled to the second hydraulic module 508 via a second example supply line branch 542 and a second example return line branch 544.

The first supply line branch 538 of FIG. 5 joins the second supply line branch 542 of FIG. 5 upstream (e.g., at and/or within the third hydraulic module 510) of the first and second hydraulic modules 506, 508 to form an example joined portion 546 of the first and second supply line branches 538, 542. The first return line branch 540 of FIG. 5 joins the second return line branch 544 of FIG. 5 upstream (e.g., at and/or within the third hydraulic module 510) of the first and second hydraulic modules 506, 508 to form an example joined portion 548 of the first and second return line branches 540, 544. The joined portion 546 of the first and second supply line branches 538, 542 receives pressurized hydraulic fluid from an example hydraulic system supply line 550, and the joined portion 548 of the first and second return line branches 540, 544 returns pressurized hydraulic fluid to an example hydraulic system return line 552. In the illustrated example of FIG. 5, the hydraulic system supply line 550 and the hydraulic system return line 552 are respectively a supply line and a return line of the hydraulic system 518 of FIG. 5.

The third hydraulic module 510 of FIG. 5 includes a plurality of control valves. In some examples, one or more of the control valves may be hydraulically actuated (e.g., via pressurized hydraulic fluid supplied via the hydraulic system supply line 550). In some examples, one or more of the control valves may be electrically actuated (e.g., via the third REU 516). The control valves of the third hydraulic module 510 control and/or manage the routing and/or distribution of pressurized hydraulic fluid from the third hydraulic module 510 to the first hydraulic module 506 (e.g., via the first supply line branch 538), and/or from the third hydraulic module 510 to the second hydraulic module 508 (e.g., via the second supply line branch 542). The control valves of the third hydraulic module 510 of FIG. 5 are further described below in connection with FIGS. 6 and 7.

The third hydraulic module 510 of FIG. 5 also includes an example LPU 554. In response to a failure of the hydraulic system supply line 550 and/or the hydraulic system 518, the joined portion 546 of the first and second supply line branches 538, 542 receives auxiliary pressurized hydraulic fluid from the LPU 554. The auxiliary pressurized hydraulic fluid supplied by the LPU 554 may be routed and/or distributed from the third hydraulic module 510 to the first hydraulic module 506 (e.g., via the first supply line branch 538), and/or from the third hydraulic module 510 to the second hydraulic module 508 (e.g., via the second supply line branch 542). The LPU 554 of the third hydraulic module 510 of FIG. 5 is further described below in connection with FIGS. 6 and 7.

The first hydraulic module 506 of FIG. 5 includes a plurality of control valves. In some examples, one or more of the control valves may be hydraulically actuated (e.g., via pressurized hydraulic fluid supplied via the first supply line branch 538). In some examples, one or more of the control valves may be electrically actuated (e.g., via the first REU 512). The control valves of the first hydraulic module 506 control and/or manage the routing and/or distribution of pressurized hydraulic fluid from the first supply line branch 538 to the ports of the first actuator 502 (e.g., the first and second ports 420, 422 of FIG. 4 described above), and from the ports of the first actuator 502 to the first return line branch 540. The control valves of the first hydraulic module 506 of FIG. 5 are further described below in connection with FIGS. 8-23.

The second hydraulic module 508 of FIG. 5 includes a plurality of control valves. In some examples, one or more of the control valves may be hydraulically actuated (e.g., via pressurized hydraulic fluid supplied via the second supply line branch 542). In some examples, one or more of the control valves may be electrically actuated (e.g., via the second REU 514). The control valves of the second hydraulic module 508 control and/or manage the routing and/or distribution of pressurized hydraulic fluid from the second supply line branch 542 to the ports of the second actuator 504 (e.g., the first and second ports 420, 422 of FIG. 4 described above), and from the ports of the second actuator 504 to the second return line branch 544. In some examples, the second hydraulic module 508 of FIG. 5 may be constructed and/or implemented in a manner that is substantially the same as that of the first hydraulic module 506 of FIG. 5, as further described below in connection with FIGS. 8-23.

In the illustrated example of FIG. 5, the first REU 512 is located at and is operatively coupled to (e.g., in electrical communication with) the first hydraulic module 506 and/or the first actuator 502. The second REU 514 is located at and is operatively coupled to (e.g., in electrical communication with) the second hydraulic module 508 and/or the second actuator 504. The third REU 516 is located at and is operatively coupled to (e.g. in electrical communication with) the third hydraulic module 510, which, as described above, is located remotely from both the first hydraulic module 506 and the second hydraulic module 508. The first REU 512, the second REU 514, and the third REU 516 are operatively coupled to (e.g., in electrical communication with) the FCEU 524 via the databus 526. The FCEU 524 is located remotely from each of the first REU 512, the second REU 514, and the third REU 516. The FCEU 524 of FIG. 5 controls the ELCU 528 to selectively connect the first electrical system 520 or the second electrical system 522 of FIG. 5 to the LPU 554 of the third hydraulic module 510 of FIG. 5.

Figure 6:
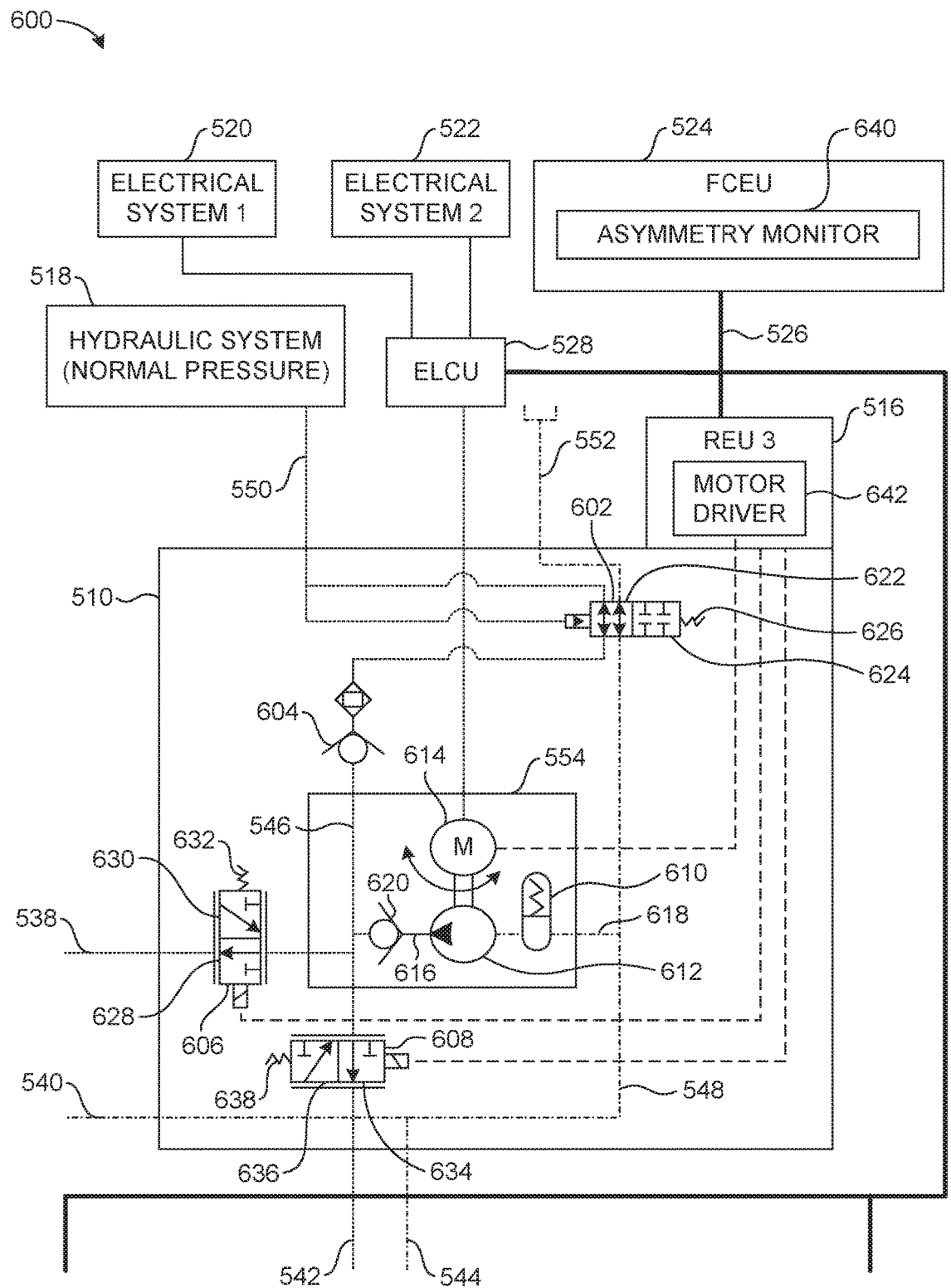
FIG. 6 is a schematic of the third example hydraulic module of FIG. 5 in a first example operational mode.

FIG. 6 is a schematic of the third example hydraulic module 510 of FIG. 5 in a first example operational mode 600. In the illustrated example of FIG. 6, the ELCU 528 of FIG. 5 is not activated such that the LPU 554 of the third hydraulic module 510 is not connected to the first electrical system 520 or the second electrical system 522 of FIG. 5. The LPU 554 does not generate and/or supply auxiliary pressurized hydraulic fluid when the third hydraulic module 510 is in the first operational mode 600 shown in FIG. 6. The first operational mode 600 of FIG. 6 corresponds to a normal mode of operation of the third hydraulic module 510 of FIG. 5, in which the hydraulic system 518 of FIG. 5 is operating according to normal and/or intended conditions.

Figure 7:
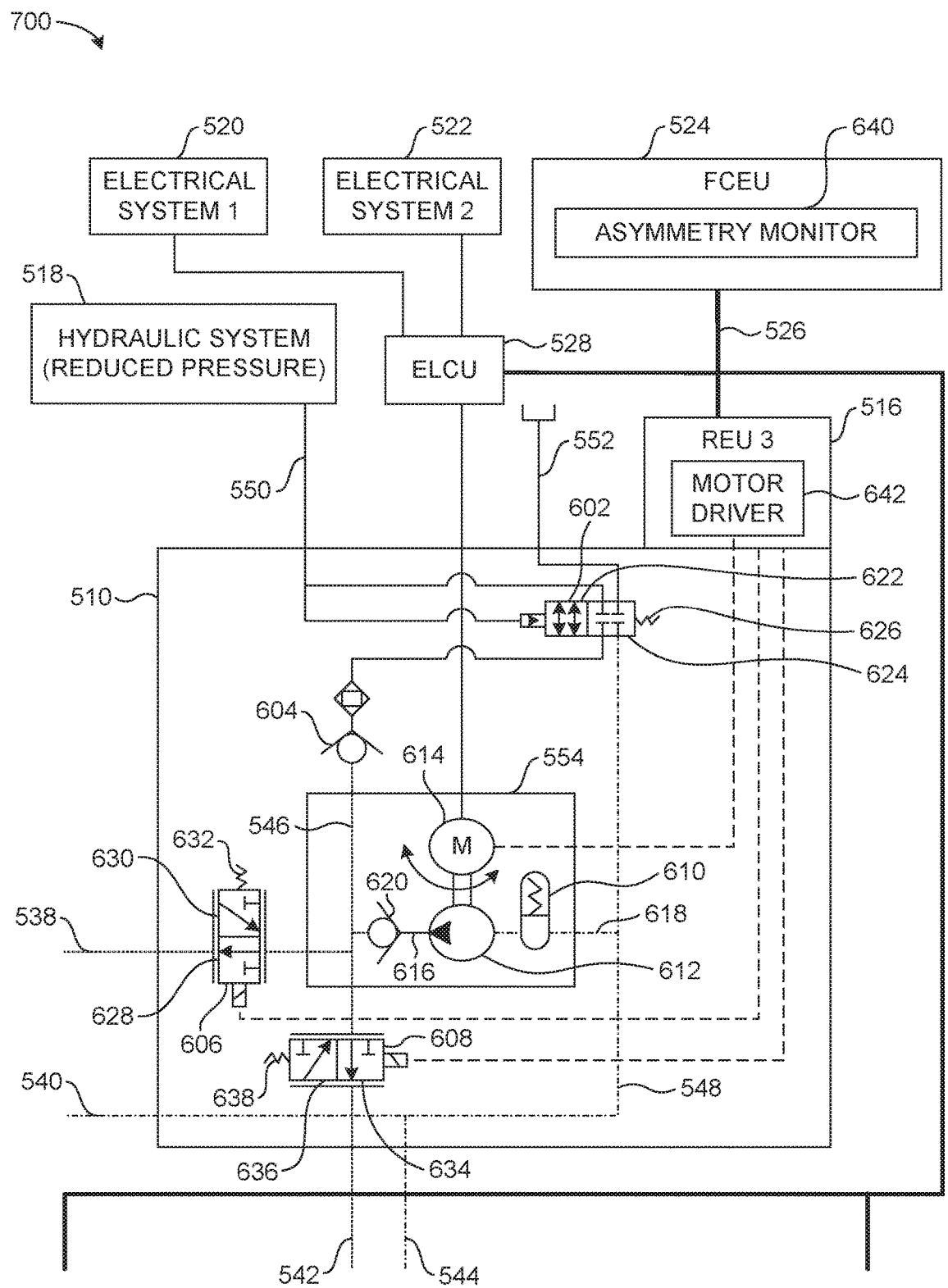
FIG. 7 is a schematic of the third example hydraulic module of FIG. 5 in a second example operational mode.

FIG. 7 is a schematic of the third example hydraulic module 510 of FIG. 5 in a second example operational mode 700. In the illustrated example of FIG. 7, the ELCU 528 of FIG. 5 is activated such that the LPU 554 of the third hydraulic module 510 is connected to either the first electrical system 520 or the second electrical system 522 of FIG. 5. The LPU 554 generates and/or supplies auxiliary pressurized hydraulic fluid when the third hydraulic module 510 is in the second operational mode 700 shown in FIG. 7. The second operational mode 700 of FIG. 7 corresponds to a failure mode of operation of the third hydraulic module 510 of FIG. 5, in which the hydraulic system 518 of FIG. 5 is not operating according to normal and/or intended conditions (e.g., due to a partial or complete loss of pressure associated with the hydraulic system 518).

The third hydraulic module 510 of FIGS. 6 and 7 includes the LPU 554 of FIG. 5, and further includes, and/or is operatively coupled to, portions of the first supply line branch 538, the first return line branch 540, the second supply line branch 542, the second return line branch 544, the joined portion 546 of the first and second supply line branches 538, 542, the joined portion 548 of the first and second return line branches 540, 544, the hydraulic system supply line 550, and the hydraulic system return line 552 of FIG. 5. The third hydraulic module 510 of FIGS. 6 and 7 further includes an example shuttle valve 602, a first example check valve 604, a first example solenoid valve (SOV1) 606, and a second example solenoid valve (SOV2) 608. The LPU 554 of the third hydraulic module 510 of FIGS. 6 and 7 includes an example compensator 610, an example hydraulic pump 612, an example electric motor 614, an example auxiliary supply line 616, an example auxiliary return line 618, and a second example check valve 620.

The shuttle valve 602 of FIGS. 6 and 7 is located upstream from the LPU 554 and the first check valve 604, and downstream from the hydraulic system 518. The shuttle valve 602 is a two-position valve having control ports that are movable and/or actuatable between an example first control port position 622 (e.g., a normal flow position) and an example second control port position 624 (e.g., a blocked flow position). The shuttle valve 602 includes and/or is coupled to a first example bias spring 626. The first bias spring 626 biases the shuttle valve 602 into and/or toward the second control port position 624 of the shuttle valve 602.

The shuttle valve 602 of FIGS. 6 and 7 is operatively coupled to (e.g., in fluid communication with) the hydraulic system 518. The hydraulic system 518 selectively positions the shuttle valve 602 in one of the first or second control port positions 622, 624 of the shuttle valve 602. For example, the hydraulic system 518 may supply pressurized hydraulic fluid to the shuttle valve 602 to move the shuttle valve 602 from the second control port position 624 into the first control port position 622 over the bias generated by the first bias spring 626. If the hydraulic system 518 fails, pressurized hydraulic fluid is no longer supplied to the shuttle valve 602 via the hydraulic system 518, and the first bias spring 626 accordingly biases the shuttle valve 602 back into the second control port position 624 of the shuttle valve 602.

When the shuttle valve 602 is positioned in the first control port position 622, pressurized hydraulic fluid supplied via the hydraulic system supply line 550 passes through the shuttle valve 602, through the first check valve 604, and into the joined portion of the first and second supply line branches 538, 542. Pressurized hydraulic fluid returning from the joined portion 548 of the first and second return line branches 540, 544 passes through the shuttle valve 602 to the hydraulic system return line 552. When the shuttle valve 602 is instead positioned in the second control port position 624, any pressurized hydraulic fluid that may be supplied via the hydraulic system supply line 550 is blocked from passing through the shuttle valve 602. Pressurized hydraulic fluid returning from the joined portion 548 of the first and second return line branches 540, 544 is blocked from passing through the shuttle valve 602 to the hydraulic system return line 552, and is instead forced to pass into the compensator 610 via the auxiliary return line 618.

The first check valve 604 of FIGS. 6 and 7 is operatively positioned downstream of the shuttle valve 602 and upstream of the joined portion 546 of the first and second supply line branches 538, 542. Pressurized hydraulic fluid that has passed from the hydraulic system supply line 550, through the shuttle valve 602, through the first check valve 604, and into the joined portion 546 of the first and second supply line branches 538, 542 is blocked by the first check valve 604 from returning in an opposite direction through the first check valve 604 to the hydraulic system supply line 550. Pressurized hydraulic fluid that has passed from the hydraulic system supply line 550, through the shuttle valve 602, through the first check valve 604, and into the joined portion 546 of the first and second supply line branches 538, 542 is also blocked by the second check valve 620 from passing through the auxiliary supply line 616 to the hydraulic pump 612 of the LPU 554.

The SOV1 606 of FIGS. 6 and 7 is operatively positioned on the first supply line branch 538 downstream of the joined portion 546 of the first and second supply line branches 538, 542. The SOV1 606 is a two-position valve having control ports that are movable and/or actuatable between an example first control port position 628 (e.g., a normal flow position) and an example second control port position 630 (e.g., a blocked flow position). The SOV1 606 includes and/or is coupled to a second example bias spring 632. The second bias spring 632 biases the SOV1 606 into and/or toward the second control port position 630 of the SOV1 606.

The SOV1 606 of FIGS. 6 and 7 is operatively coupled to (e.g., in electrical communication with) the third REU 516 of FIG. 5. The third REU 516 selectively positions the SOV1 606 in one of the first or second control port positions 628, 630 of the SOV1 606. For example, the third REU 516 may energize and/or electrically command the SOV1 606 to move from the second control port position 630 into the first control port position 628 over the bias generated by the second bias spring 632. In some examples, the third REU 516 may de-energize the SOV1 606 in response to detecting and/or determining a failure of a portion of the first supply line branch 538 located downstream of the SOV1 606, as may occur in the case of a leak and/or a tear formed in the downstream portion of the first supply line branch 538.

When the SOV1 606 is positioned in the first control port position 628, pressurized hydraulic fluid passes from the joined portion 546 of the first and second supply line branches 538, 542, through the SOV1 606, and through the first supply line branch 538 toward the first hydraulic module 506 of FIG. 5. When the SOV1 606 is instead positioned in the second control port position 630, any pressurized hydraulic fluid that may be passing from the joined portion 546 of the first and second supply line branches 538, 542 is blocked from passing through the SOV1 606.

The SOV2 608 of FIGS. 6 and 7 is operatively positioned on the second supply line branch 542 downstream of the joined portion 546 of the first and second supply line branches 538, 542. The SOV2 608 is a two-position valve having control ports that are movable and/or actuatable between an example first control port position 634 (e.g., a normal flow position) and an example second control port position 636 (e.g., a blocked flow position). The SOV2 608 includes and/or is coupled to a third example bias spring 638. The third bias spring 638 biases the SOV2 608 into and/or toward the second control port position 636 of the SOV2 608.

The SOV2 608 of FIGS. 6 and 7 is operatively coupled to (e.g., in electrical communication with) the third REU 516 of FIG. 5. The third REU 516 selectively positions the SOV2 608 in one of the first or second control port positions 634, 636 of the SOV2 608. For example, the third REU 516 may energize and/or electrically command the SOV2 608 to move from the second control port position 636 into the first control port position 634 over the bias generated by the third bias spring 638. In some examples, the third REU 516 may de-energize the SOV2 608 in response to detecting and/or determining a failure of a portion of the second supply line branch 542 located downstream of the SOV2 608, as may occur in the case of a leak and/or a tear formed in the downstream portion of the second supply line branch 542.

When the SOV2 608 is positioned in the first control port position 634, pressurized hydraulic fluid passes from the joined portion 546 of the first and second supply line branches 538, 542, through the SOV2 608, and through the second supply line branch 542 toward the second hydraulic module 508 of FIG. 5. When the SOV2 608 is instead positioned in the second control port position 636, any pressurized hydraulic fluid that may be passing from the joined portion 546 of the first and second supply line branches 538, 542 is blocked from passing through the SOV2 608.

The compensator 610 of FIGS. 6 and 7 stores and/or contains a volume of auxiliary pressurized hydraulic fluid. In some examples, the volume of auxiliary pressurized hydraulic fluid stored and/or contained within the compensator 610 is sufficient to move and/or actuate a piston of an actuator (e.g., the piston 410 of the actuator 402 of FIG. 4) from a retracted position to an extended position, or vice-versa, when supplied to a fluid volume of the actuator (e.g., the first fluid volume 416 or the second fluid volume 418 of the actuator 402 of FIG. 4). The hydraulic pump 612 of FIGS. 6 and 7 is in fluid communication with the compensator 610 and is operatively coupled to the electric motor 614 of the LPU 554 of FIGS. 6 and 7. The hydraulic pump 612 is also in fluid communication with the auxiliary supply line 616 and the auxiliary return line 618 of the LPU 554 of FIGS. 6 and 7. The hydraulic pump 612 is driven and/or powered by the electric motor 614. When the electric motor 614 and/or, more generally, the LPU 554 is powered on (e.g., the second operational mode 700 of FIG. 7, as further described below), the electric motor 614 drives the hydraulic pump 612 to pump auxiliary pressurized hydraulic fluid from the compensator 610 into the auxiliary supply line 616.

In the illustrated examples of FIGS. 6 and 7, the auxiliary supply line 616 passes through the second check valve 620. A portion of the auxiliary supply line 616 located downstream from the second check valve 620 is in fluid communication with the joined portion 546 of the first and second supply line branches 538, 542 located downstream from the first check valve 604. Auxiliary pressurized hydraulic fluid that has passed through the second check valve 620 from the hydraulic pump 612 via the auxiliary supply line 616 is blocked by the second check valve 620 from returning to the hydraulic pump 612 via the auxiliary supply line 616, and is also blocked by the first check valve 604 from passing to the hydraulic system supply line 550.

The electric motor 614 of FIGS. 6 and 7 may be powered via the ELCU 528 via either the first electrical system 520 or the second electrical system 522. The first electrical system 520 and/or the second electrical system 522 is/are independent of the hydraulic system 518, and accordingly remain(s) operable even when the hydraulic system 518 fails. Electrical current and/or power from the first electrical system 520 or the second electrical system 522 selectively passes through the ELCU 528 to the electric motor 614. The ELCU 528 is controlled via an example asymmetry monitor 640 located within the FCEU 524. In the illustrated example of FIGS. 6 and 7, the asymmetry monitor 640 detects wing flap asymmetry by comparing flap position data obtained from flap position sensors (e.g., the flap position sensors 374, 376, 378, 380, 382, 384, 386, 388 of FIG. 3) of the wing flaps with flap position data commanded by the FCEU 524. When the asymmetry monitor 640 detects an asymmetry exceeding a threshold (e.g., a predetermined threshold), the FCEU 524 transmits a control signal and/or a command to the ELCU 528 instructing the ELCU 528 to connect the first electrical system 520 or the second electrical system 522 to the electric motor 614 of the LPU 554. The FCEU 524 of FIGS. 6 and 7 is also operatively coupled to (e.g., in electrical communication with) an example motor driver 642 located within the third REU 516 of FIGS. 6 and 7. The motor driver 642 is operatively coupled to the electric motor 614 of FIGS. 6 and 7 and controls the speed at which the electric motor 614 drives the hydraulic pump 612.

In some examples, the FCEU 524 determines whether a new position for the wing flap has been indicated. For example, the FCEU 524 of FIG. 5 may determine a newly commanded position of the wing flap (e.g., the first inboard flap 112 of FIG. 3) coupled to the first actuator 502 and the second actuator 504 of FIG. 5. If the FCEU 524 determines that a new position for the wing flap has been indicated, the FCEU 524 activates the LPU 554 via the ELCU 528, and commands both the first actuator 502 and the second actuator 504 to move the wing flap to the newly indicated position. For example, the FCEU 524 may send commands to the first REU 512 and the second REU 514 to cause control valves of corresponding ones of the first hydraulic module 506 and the second hydraulic module 508 to move to control port positions that enable movement of the wing flap via the first actuator 502 and the second actuator 504 to the newly indicated position.

As mentioned above, FIG. 6 illustrates the third hydraulic module 510 of FIG. 5 in the first operational mode 600. As shown in FIG. 6, the shuttle valve 602 is positioned in the first control port position 622 of the shuttle valve 602, the SOV1 606 is positioned in the first control port position 628 of the SOV1 606, and the SOV2 608 is positioned in the first control port position 634 of the SOV2 608. The shuttle valve 602 is hydraulically actuated into the first control port position 622 of the shuttle valve 602 via a pilot pressure received at the shuttle valve 602 from the hydraulic system 518 and/or the hydraulic system supply line 550. The SOV1 606 is energized and/or electrically commanded into the first control port position 628 of the SOV1 606 via the third REU 516. The SOV2 608 is energized and/or electrically commanded into the first control port position 634 of the SOV2 608 via the third REU 516.

The first operational mode 600 of the third hydraulic module 510 of FIG. 6 is a mode in which the electric motor 614 and/or, more generally, the LPU 554 is powered off. For example, as shown in FIG. 6, the ELCU 528 has not connected either of the first and second electrical systems 520, 522 to the electric motor 614 of the LPU 554. As a result of being disconnected from the first and second electrical systems 520, 522, the electric motor 614 is unable to power the hydraulic pump 612 of the LPU 554. The hydraulic pump 612 is therefore unable to pump auxiliary pressurized hydraulic fluid from the compensator 610 into the auxiliary supply line 616.

In the illustrated example of FIG. 6, pressurized hydraulic fluid from the hydraulic system supply line 550 passes through the shuttle valve 602, through the first check valve 604, through the joined portion 546 of the first and second supply line branches 538, 542, into respective ones of the first and second supply line branches 538, 542, through respective corresponding ones of the SOV1 606 and SOV2 608, and toward corresponding respective ones of the first and second hydraulic modules 506, 508. In other examples, the SOV1 606 may be de-energized via the third REU 516 in the first operational mode 600 such that the SOV1 606 is in the second control port position 630 (e.g., a blocked flow position) of the SOV1 606. In such examples, pressurized hydraulic fluid from the hydraulic system supply line 550 may pass through the shuttle valve 602, through the first check valve 604, through the joined portion 546 of the first and second supply line branches 538, 542, into the second supply line branch 542, through the SOV2 608, and toward the second hydraulic module 508, but not through the SOV1 606 toward the first hydraulic module 506. In still other examples, the SOV2 608 may be de-energized via the third REU 516 in the first operational mode 600 such that the SOV2 608 is in the second control port position 636 (e.g., a blocked flow position) of the SOV2 608. In such examples, pressurized hydraulic fluid from the hydraulic system supply line 550 may pass through the shuttle valve 602, through the first check valve 604, through the joined portion 546 of the first and second supply line branches 538, 542, into the first supply line branch 538, through the SOV1 606, and toward the first hydraulic module 506, but not through the SOV2 608 toward the second hydraulic module 508.

As mentioned above, FIG. 7 illustrates the third hydraulic module 510 of FIG. 5 in the second operational mode 700. As shown in FIG. 7, the shuttle valve 602 is positioned in the second control port position 624 of the shuttle valve 602, the SOV1 606 is positioned in the first control port position 628 of the SOV1 606, and the SOV2 608 is positioned in the first control port position 634 of the SOV2 608. The shuttle valve 602 is biased into the second control port position 624 of the shuttle valve 602 via the first bias spring 626 as a result of a loss of pressure from the hydraulic system 518 and/or the hydraulic system supply line 550. The SOV1 606 is energized and/or electrically commanded into the first control port position 628 of the SOV1 606 via the third REU 516. The SOV2 608 is energized and/or electrically commanded into the first control port position 634 of the SOV2 608 via the third REU 516.

The second operational mode 700 of FIG. 7 is a mode in which the electric motor 614 and/or, more generally, the LPU 554 is powered on. For example, as shown in FIG. 7, the ELCU 528 has connected either the first electrical system 520 or the second electrical system 522 to the electric motor 614 of the LPU 554. As a result of being connected to one of the first and second electrical systems 520, 522, the electric motor 614 powers and/or drives the hydraulic pump 612 of the LPU 554. In response to being powered and/or driven by the electric motor 614, the hydraulic pump 612 pumps auxiliary pressurized hydraulic fluid from the compensator 610 into the auxiliary supply line 616.

In the illustrated example of FIG. 7, auxiliary pressurized hydraulic fluid from the auxiliary supply line 616 passes through the second check valve 620, through the joined portion 546 of the first and second supply line branches 538, 542, into respective ones of the first and second supply line branches 538, 542, through respective corresponding ones of the SOV1 606 and SOV2 608, and toward corresponding respective ones of the first and second hydraulic modules 506, 508. In other examples, the SOV1 606 may be de-energized via the third REU 516 in the second operational mode 700 such that the SOV1 606 is in the second control port position 630 (e.g., a blocked flow position) of the SOV1 606. In such examples, auxiliary pressurized hydraulic fluid from the auxiliary supply line 616 may pass through the second check valve 620, through the joined portion 546 of the first and second supply line branches 538, 542, into the second supply line branch 542, through the SOV2 608, and toward the second hydraulic module 508, but not through the SOV1 606 toward the first hydraulic module 506. In still other examples, the SOV2 608 may be de-energized via the third REU 516 in the second operational mode 700 such that the SOV2 608 is in the second control port position 636 (e.g., a blocked flow position) of the SOV2 608. In such examples, auxiliary pressurized hydraulic fluid from the auxiliary supply line 616 may pass through the second check valve 620, through the joined portion 546 of the first and second supply line branches 538, 542, into the first supply line branch 538, through the SOV1 606, and toward the first hydraulic module 506, but not through the SOV2 608 toward the second hydraulic module 508.

Figure 8:
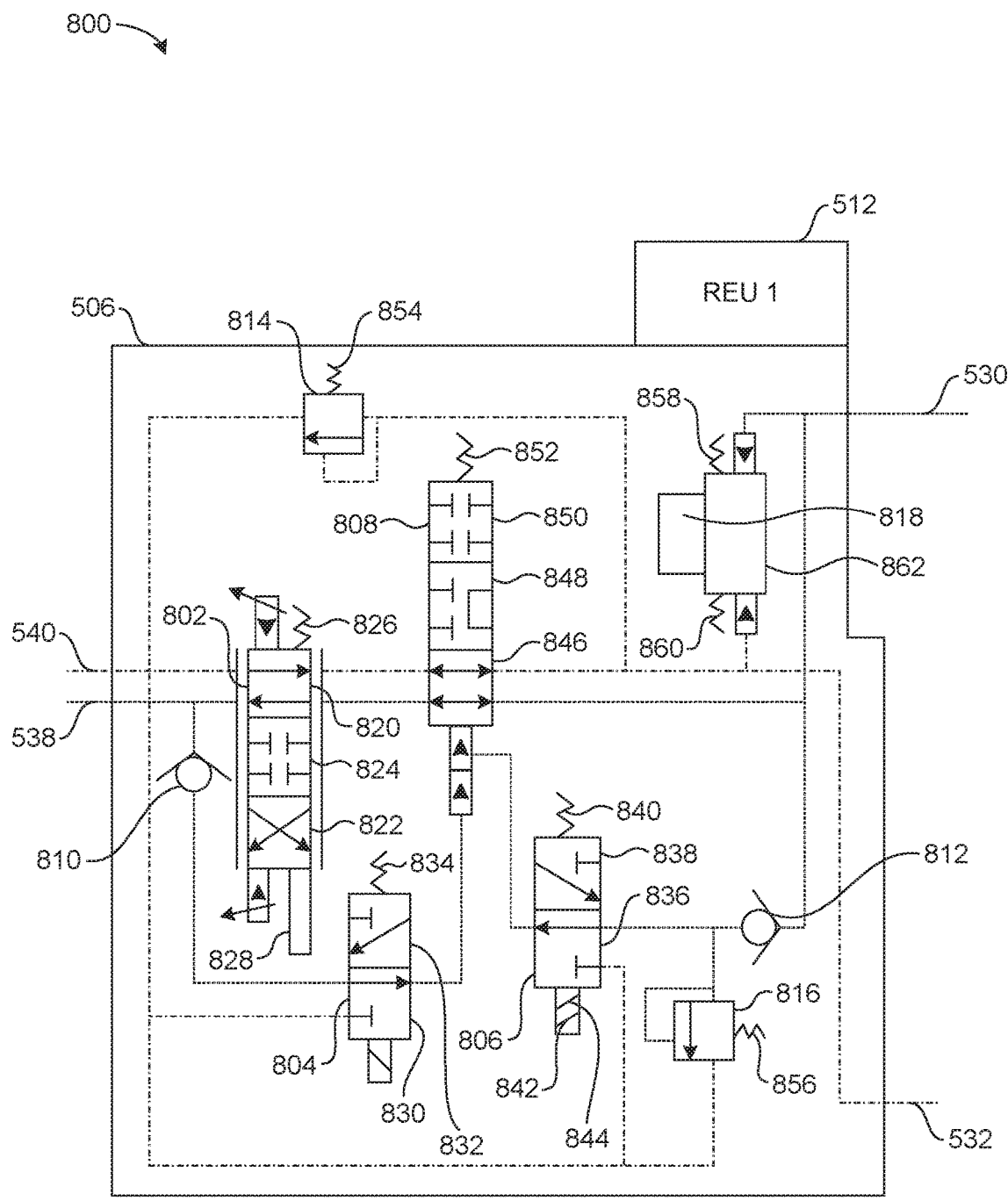
FIG. 8 is a schematic of the first example hydraulic module of FIG. 5 in a first example operational mode.
Figure 9:
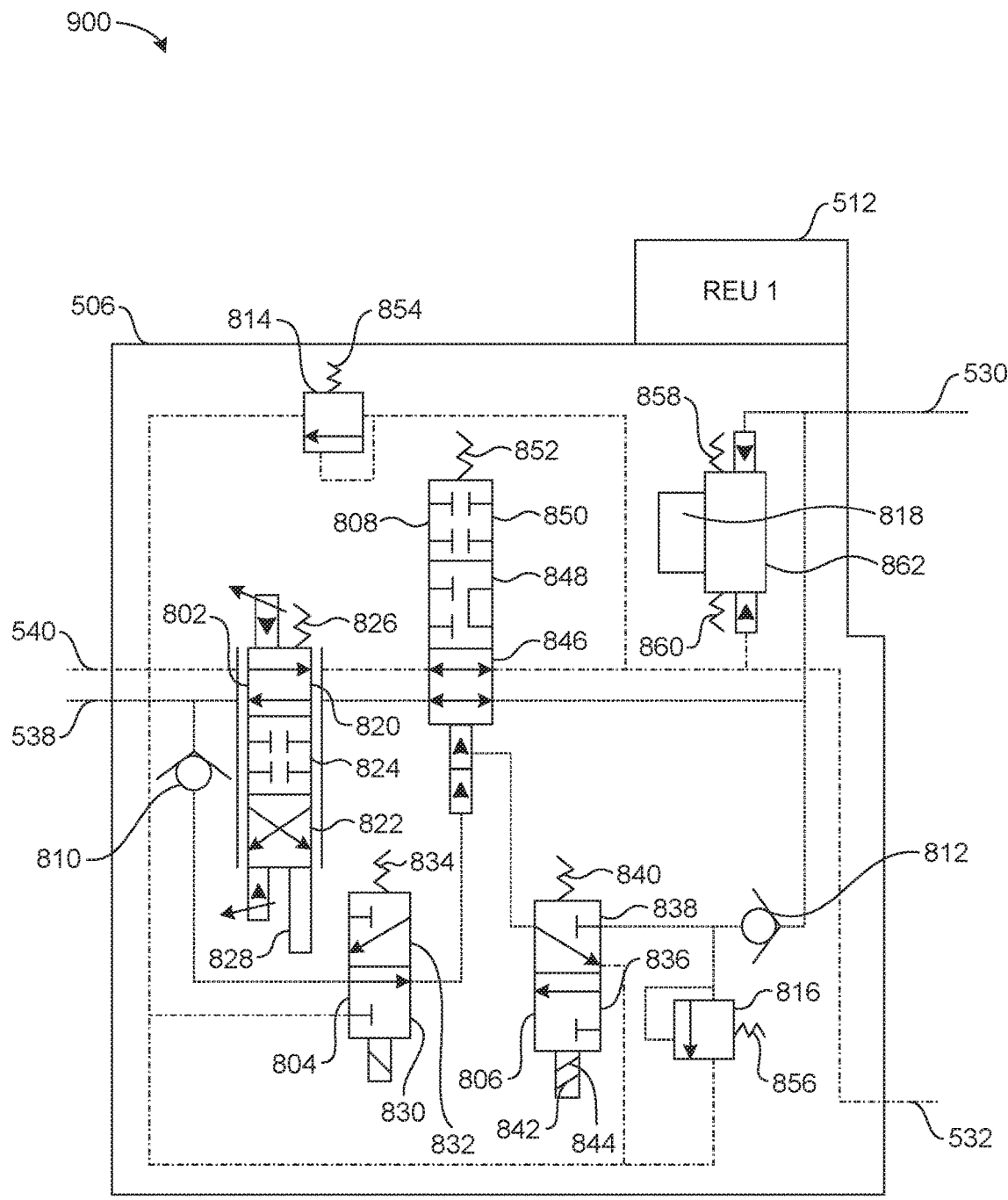
FIG. 9 is a schematic of the first example hydraulic module of FIG. 5 in a second example operational mode.
Figure 10:
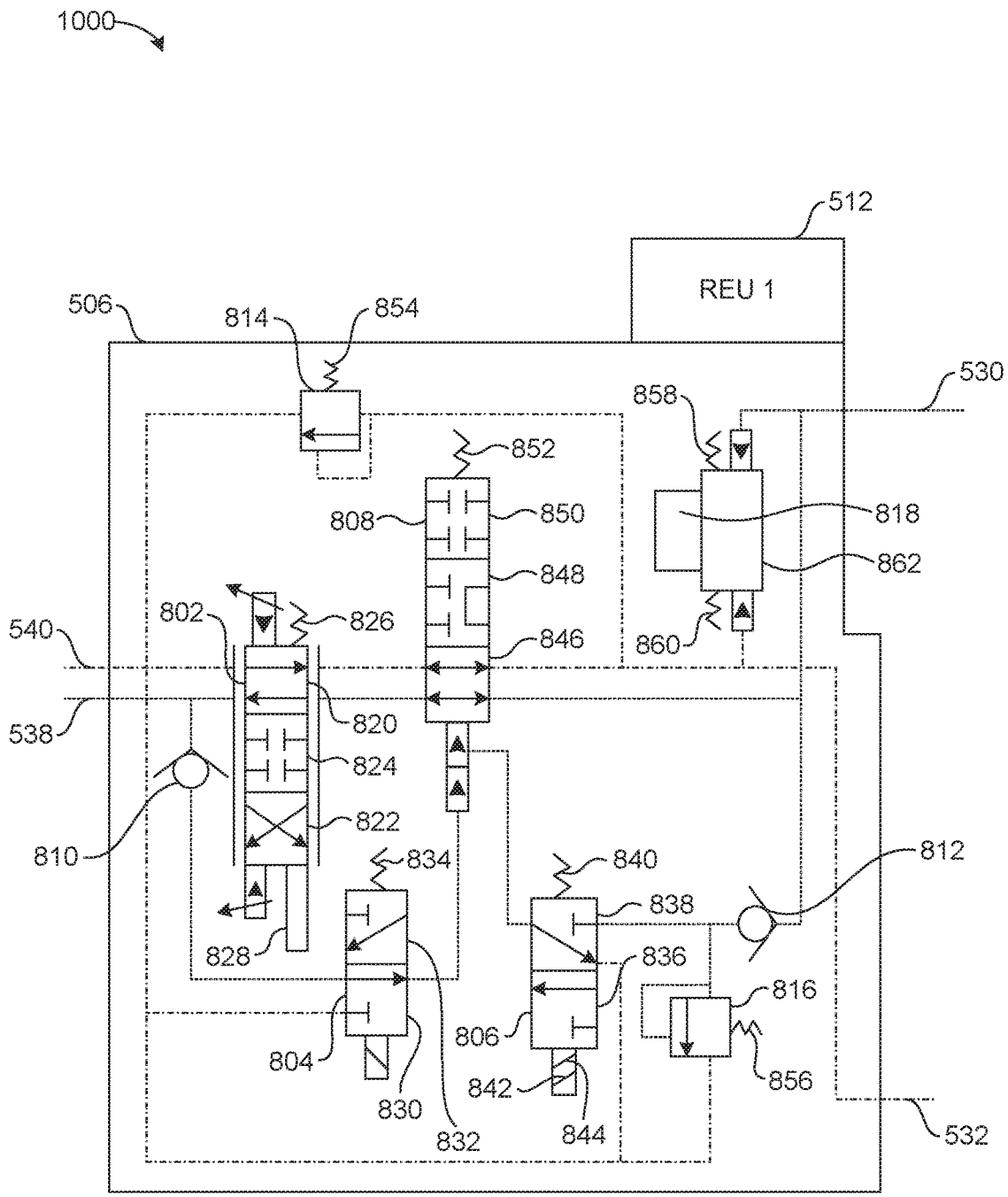
FIG. 10 is a schematic of the first example hydraulic module of FIG. 5 in a third example operational mode.
Figure 11:
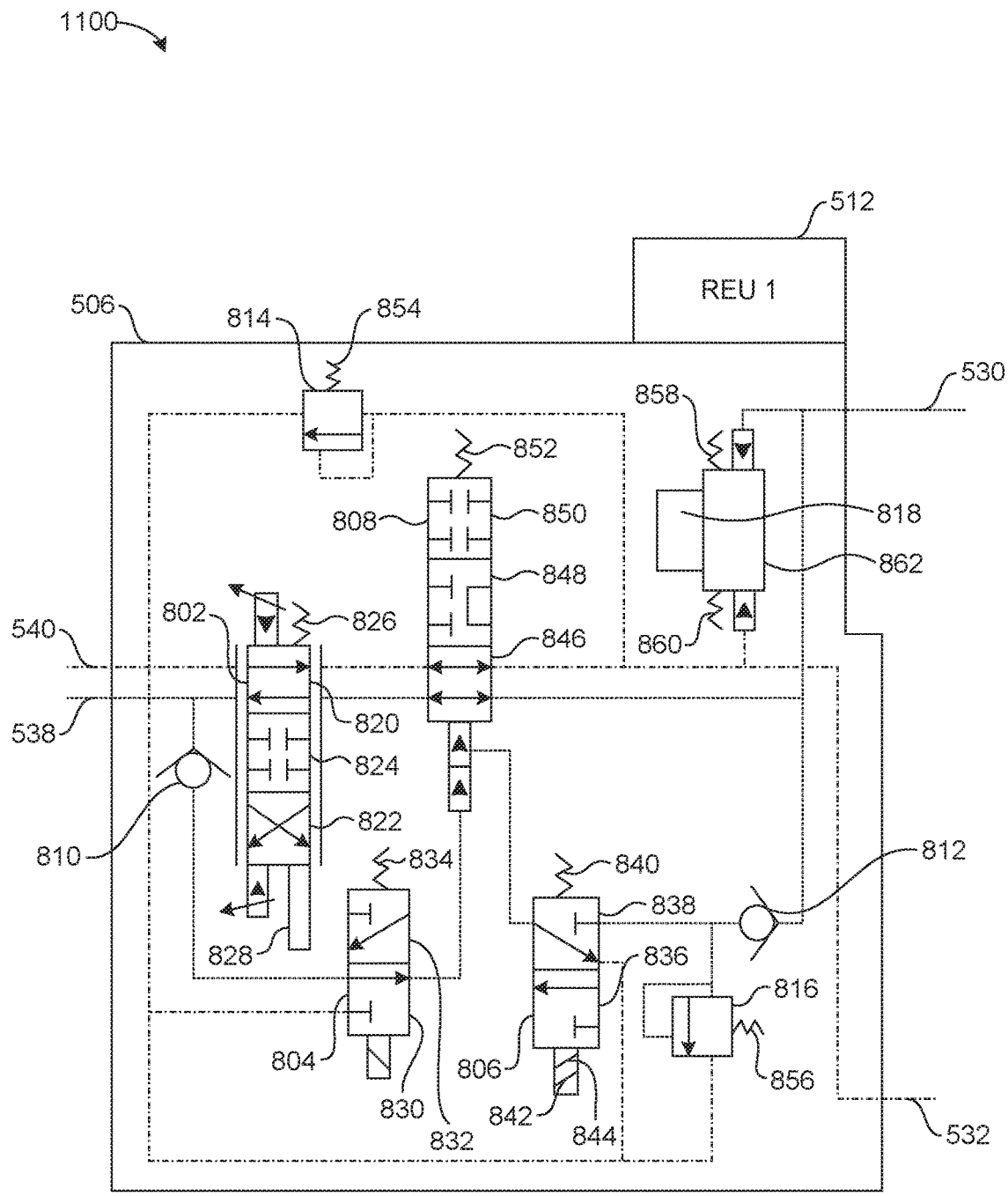
FIG. 11 is a schematic of the first example hydraulic module of FIG. 5 in a fourth example operational mode.
Figure 12:
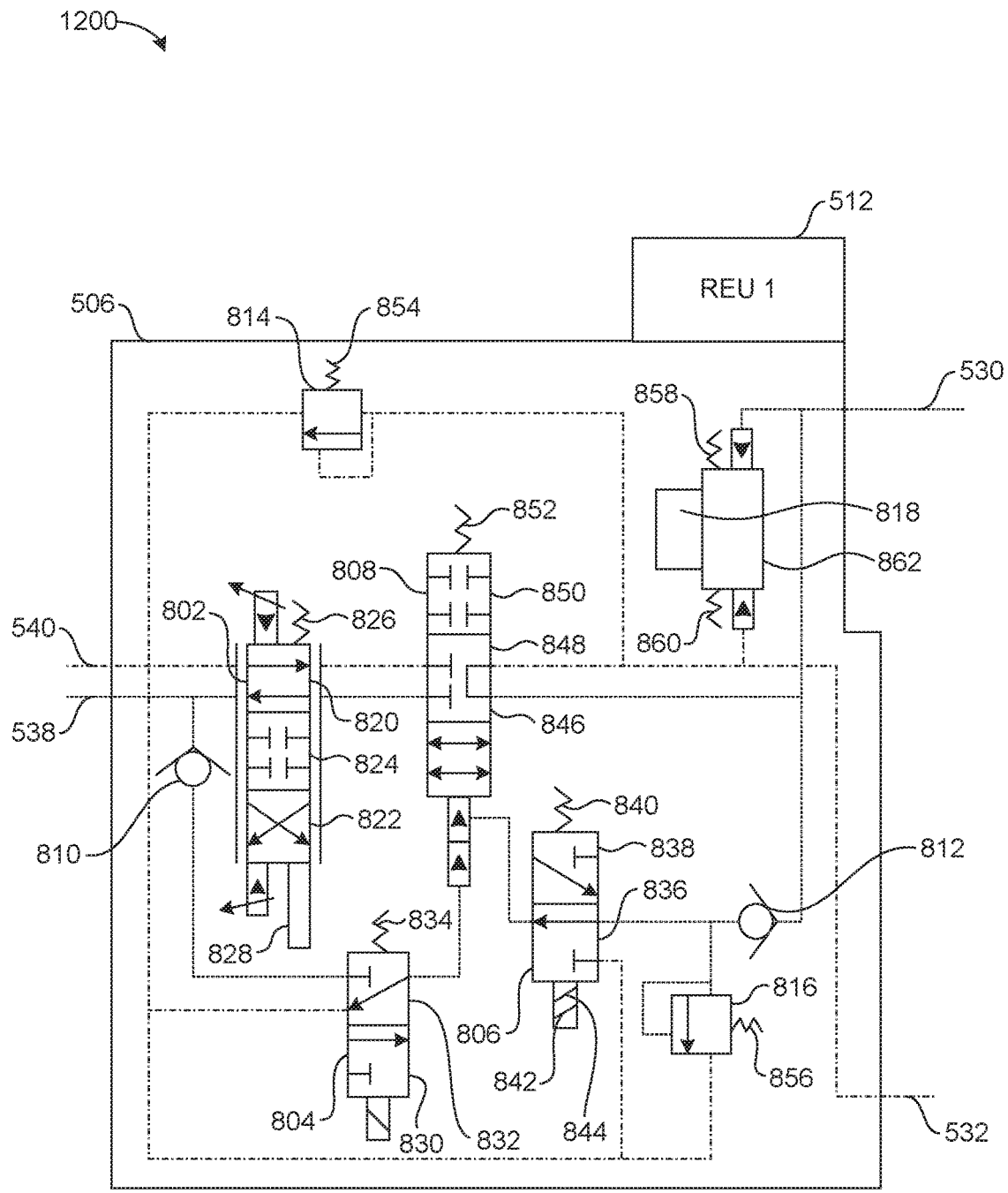
FIG. 12 is a schematic of the first example hydraulic module of FIG. 5 in a fifth example operational mode.
Figure 13:
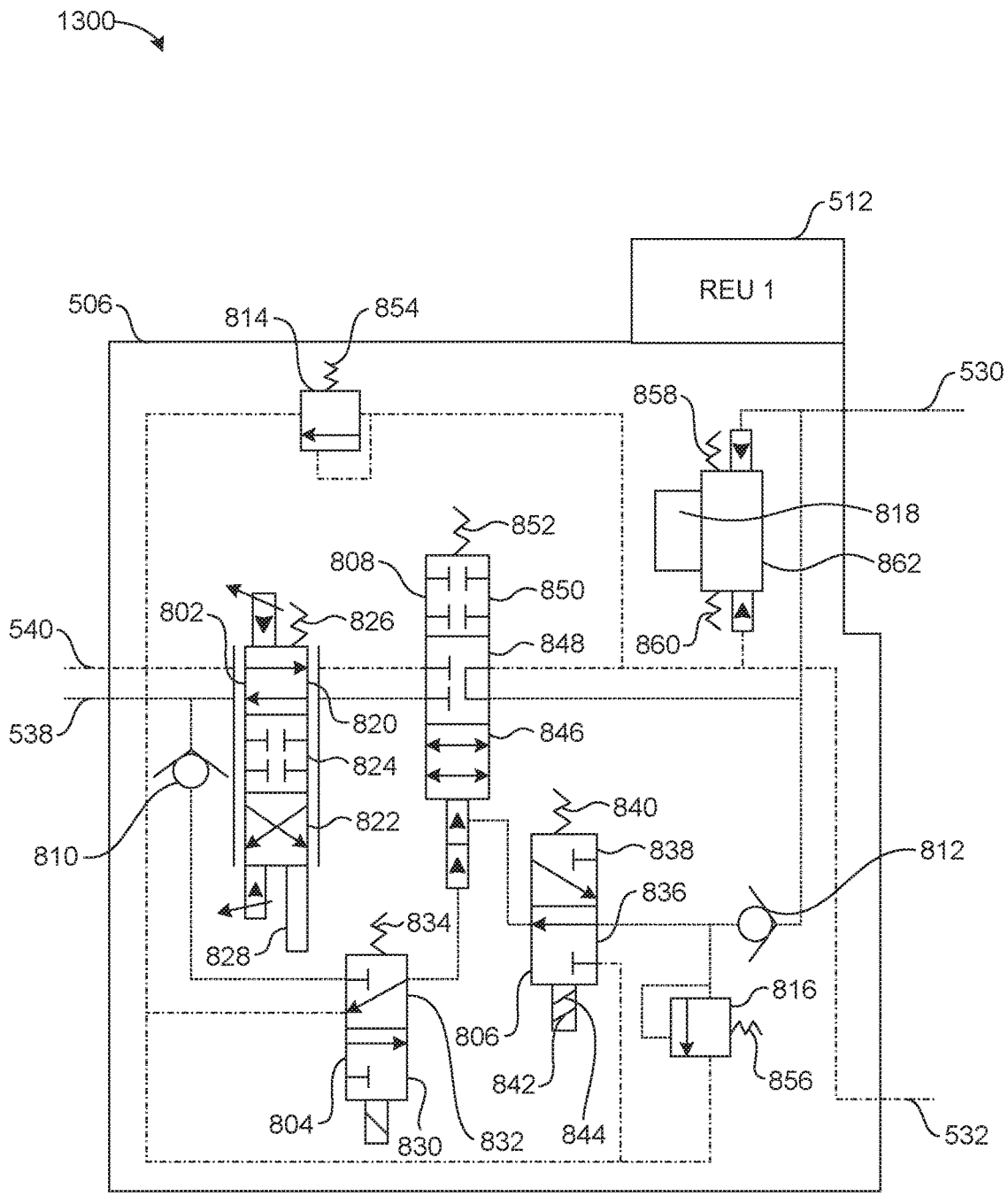
FIG. 13 is a schematic of the first example hydraulic module of FIG. 5 in a sixth example operational mode.
Figure 14:
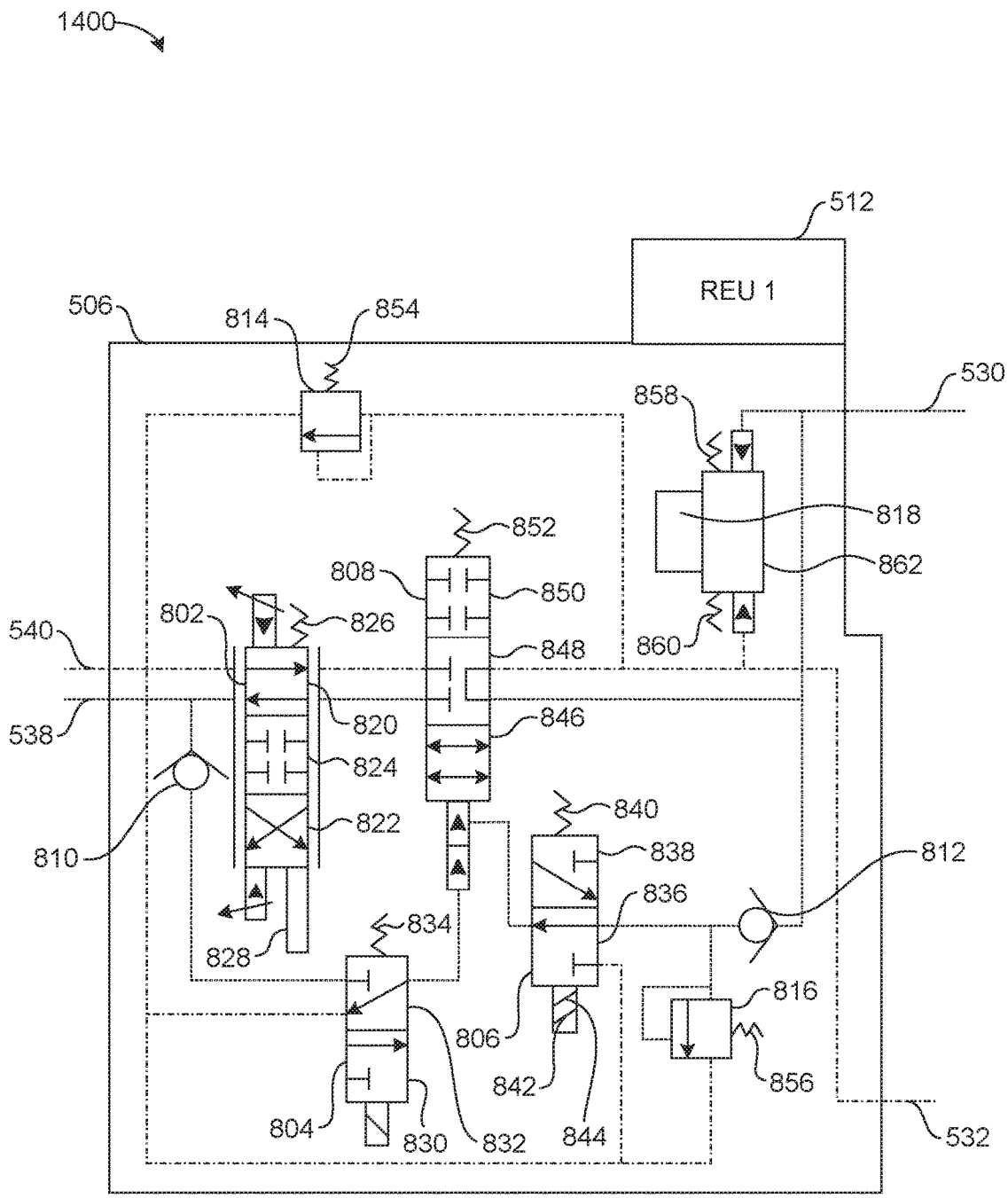
FIG. 14 is a schematic of the first example hydraulic module of FIG. 5 in a seventh example operational mode.
Figure 15:
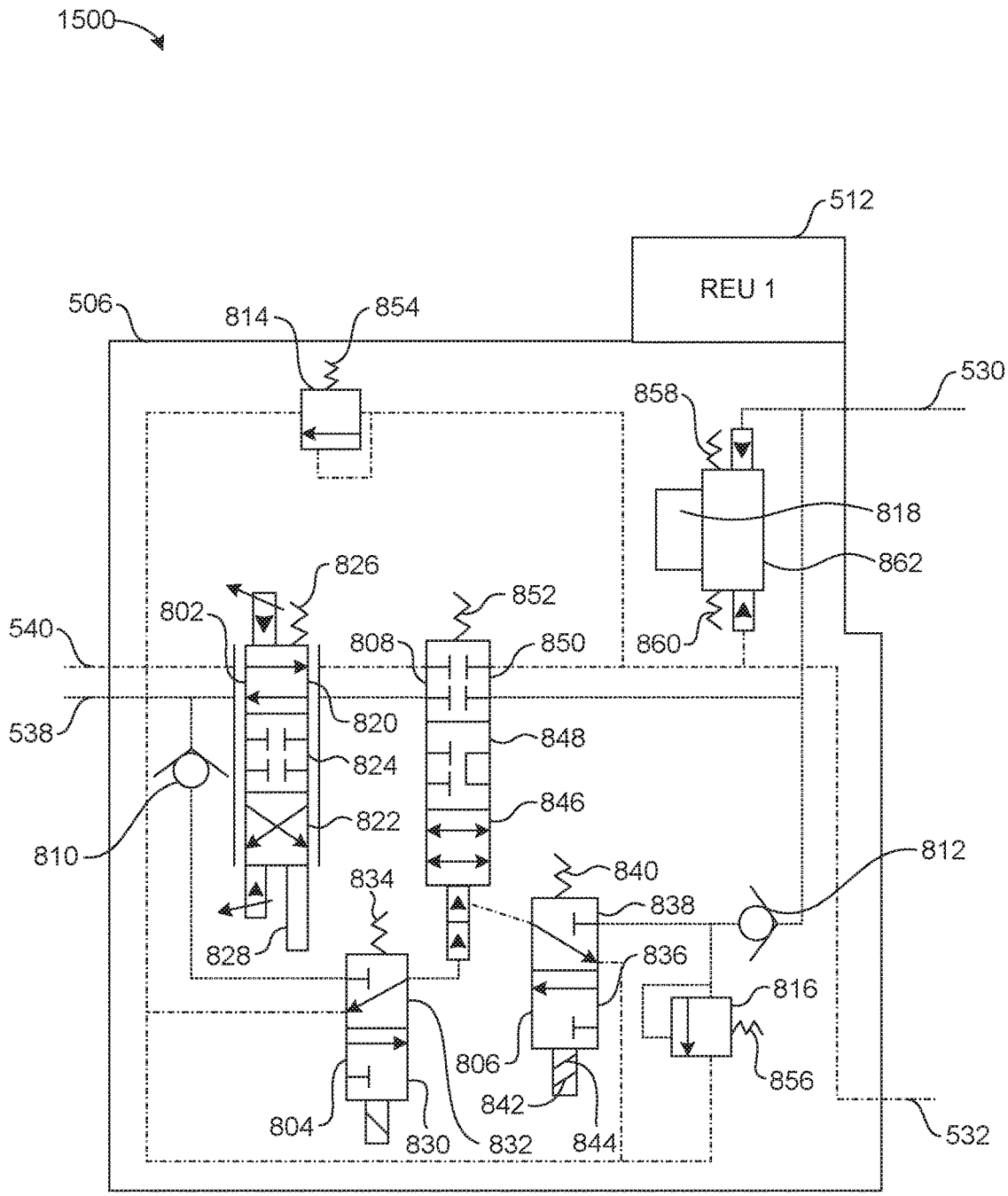
FIG. 15 is a schematic of the first example hydraulic module of FIG. 5 in an eighth example operational mode.
Figure 16:
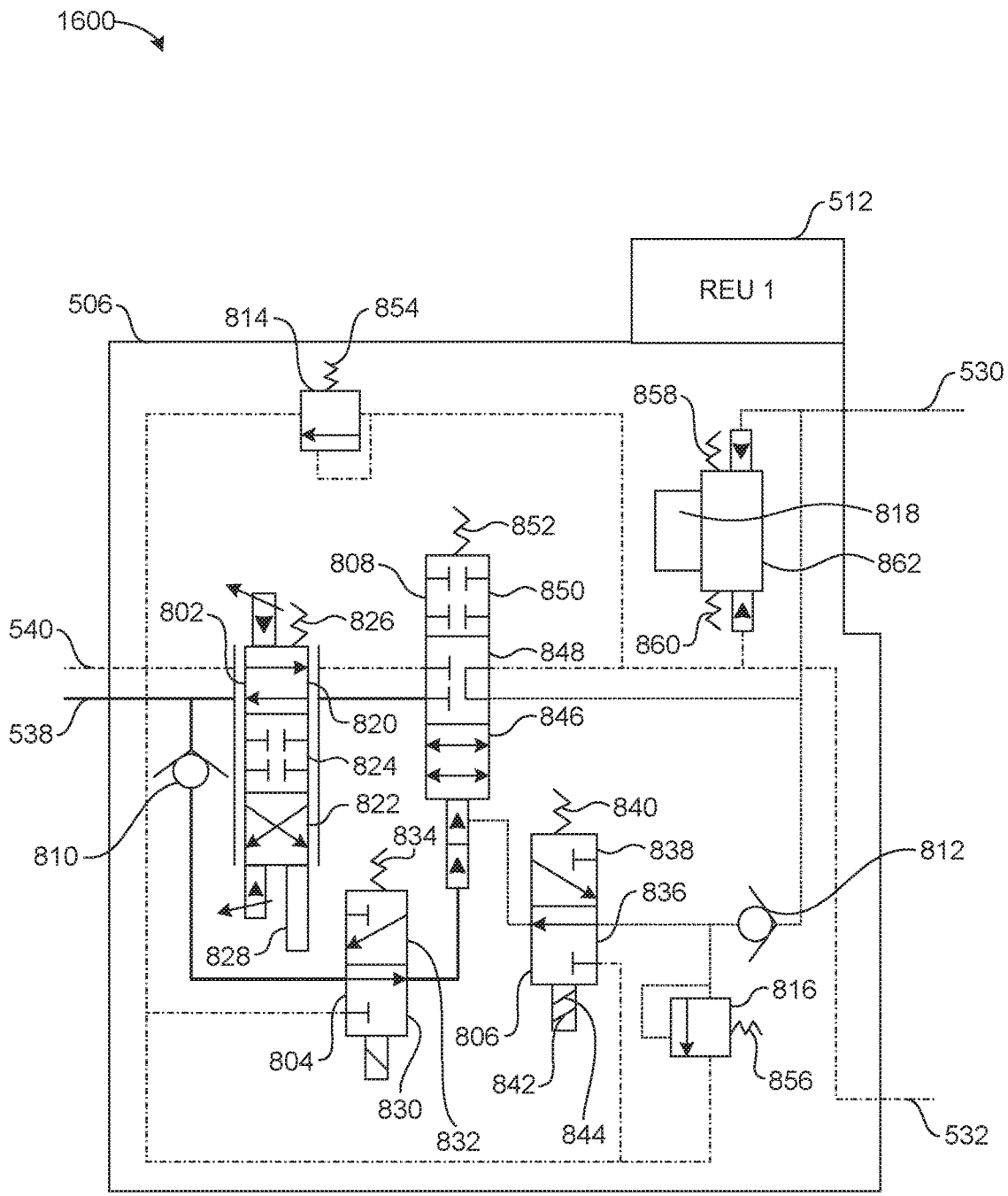
FIG. 16 is a schematic of the first example hydraulic module of FIG. 5 in a ninth example operational mode.
Figure 17:
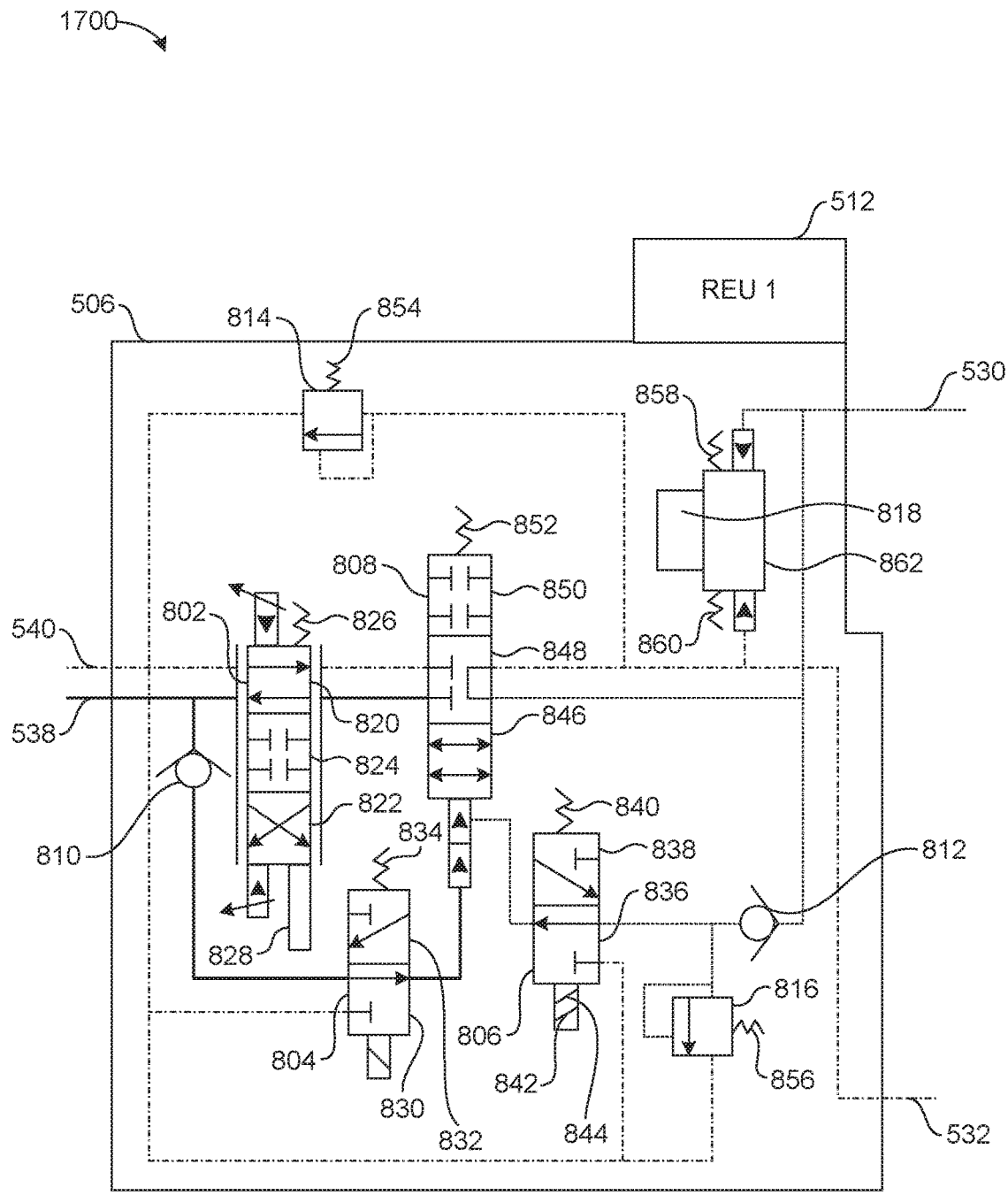
FIG. 17 is a schematic of the first example hydraulic module of FIG. 5 in a tenth example operational mode.
Figure 18:
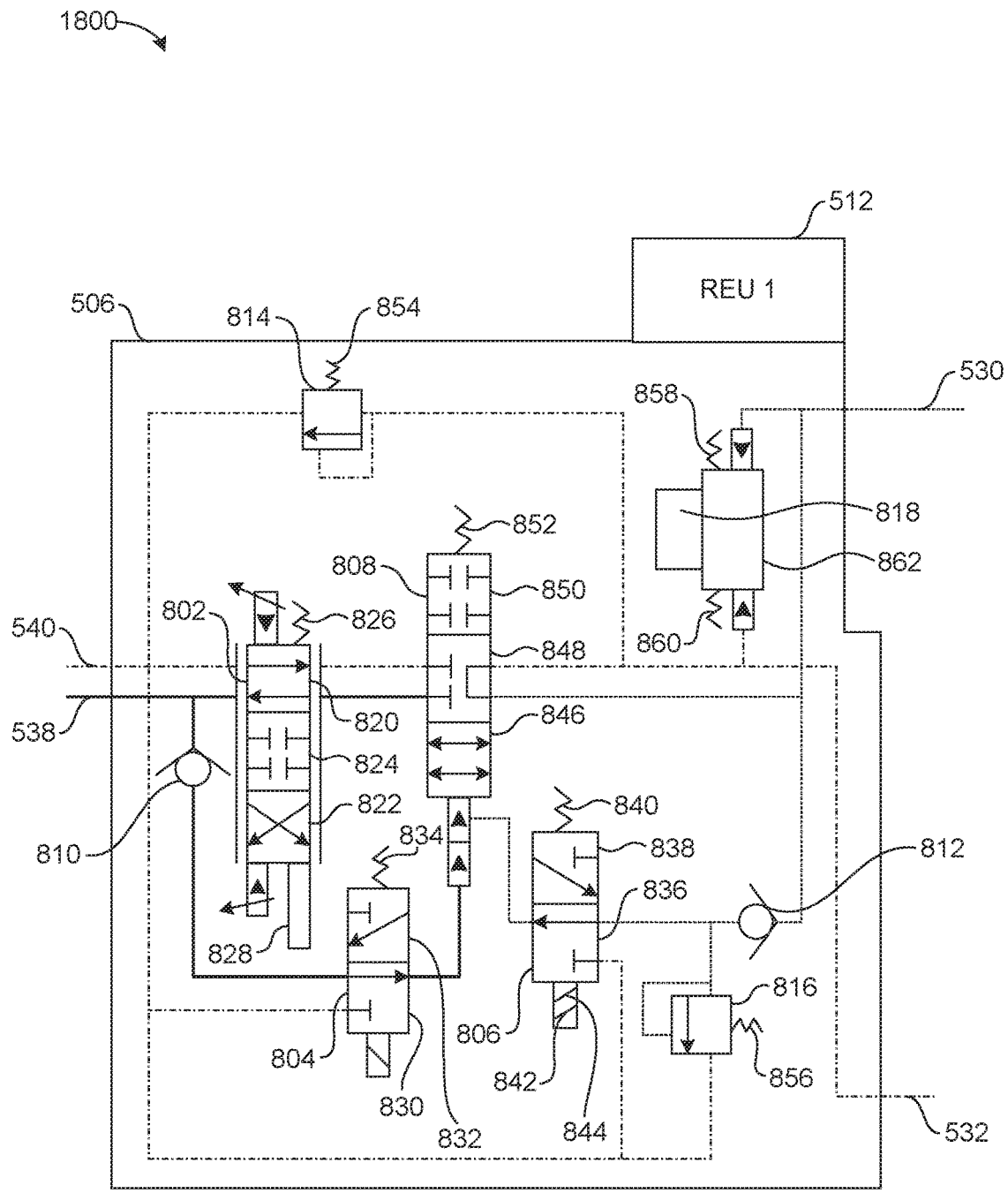
FIG. 18 is a schematic of the first example hydraulic module of FIG. 5 in an eleventh example operational mode.
Figure 19:
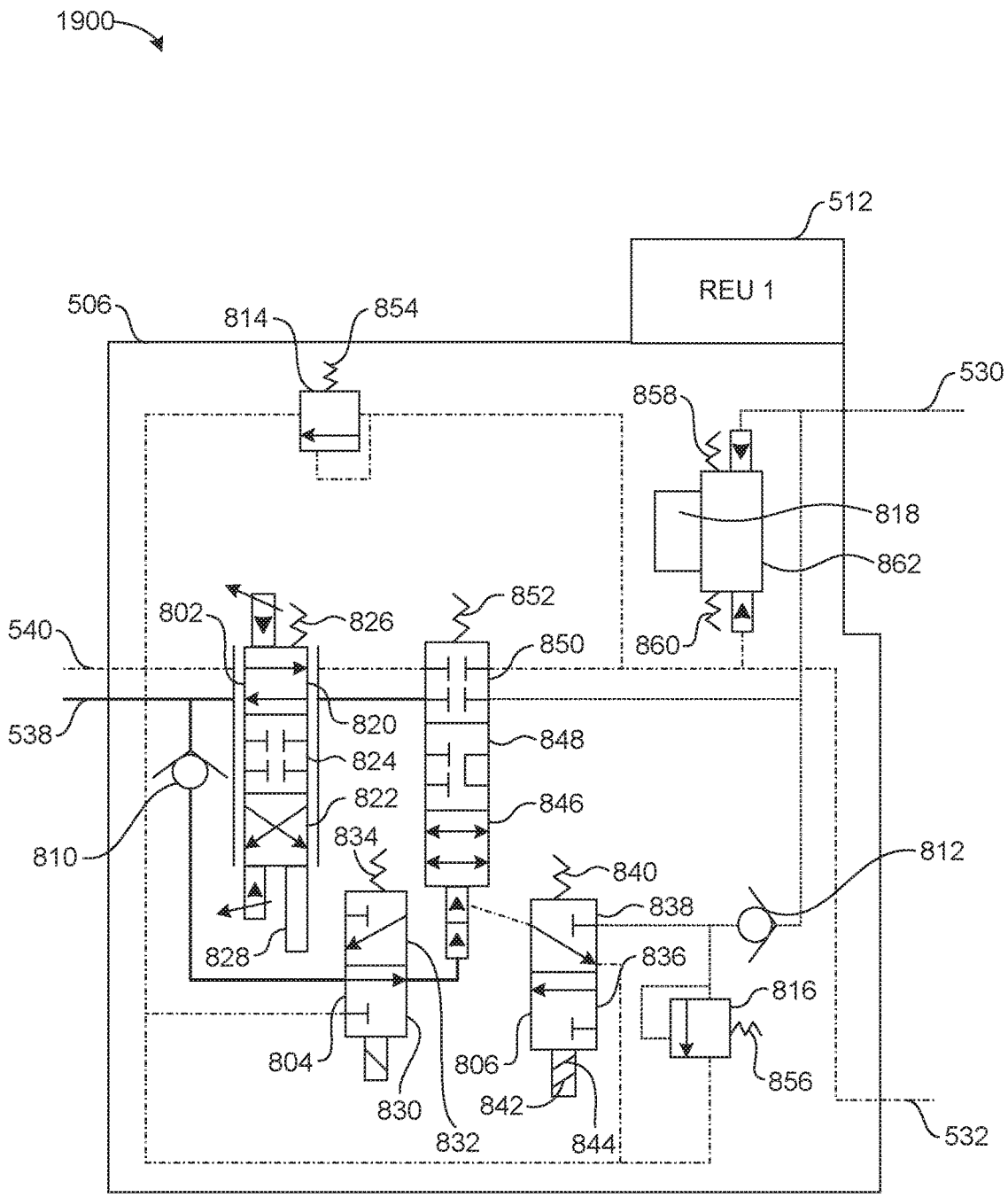
FIG. 19 is a schematic of the first example hydraulic module of FIG. 5 in a twelfth example operational mode.
Figure 20:
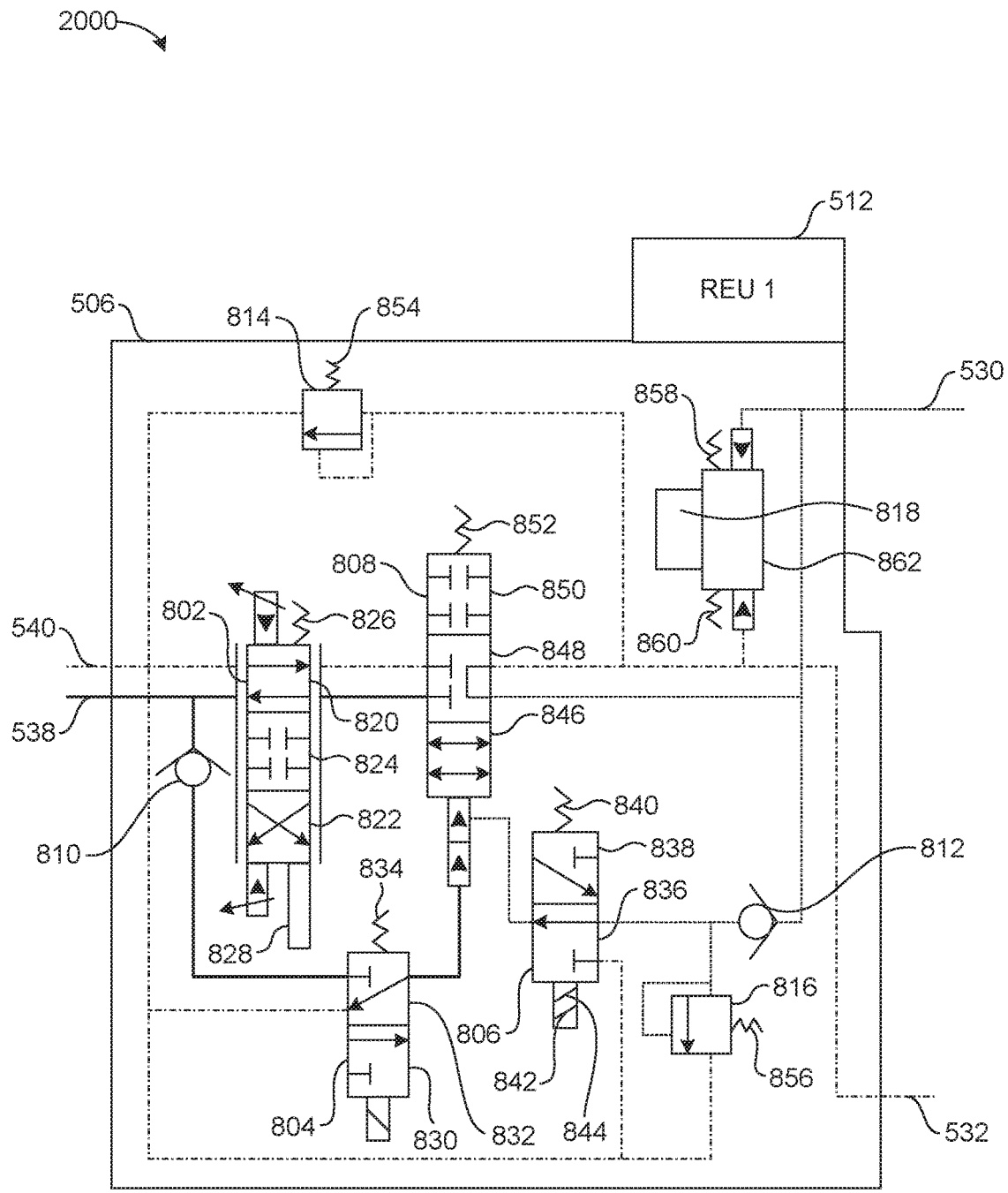
FIG. 20 is a schematic of the first example hydraulic module of FIG. 5 in a thirteenth example operational mode.
Figure 21:
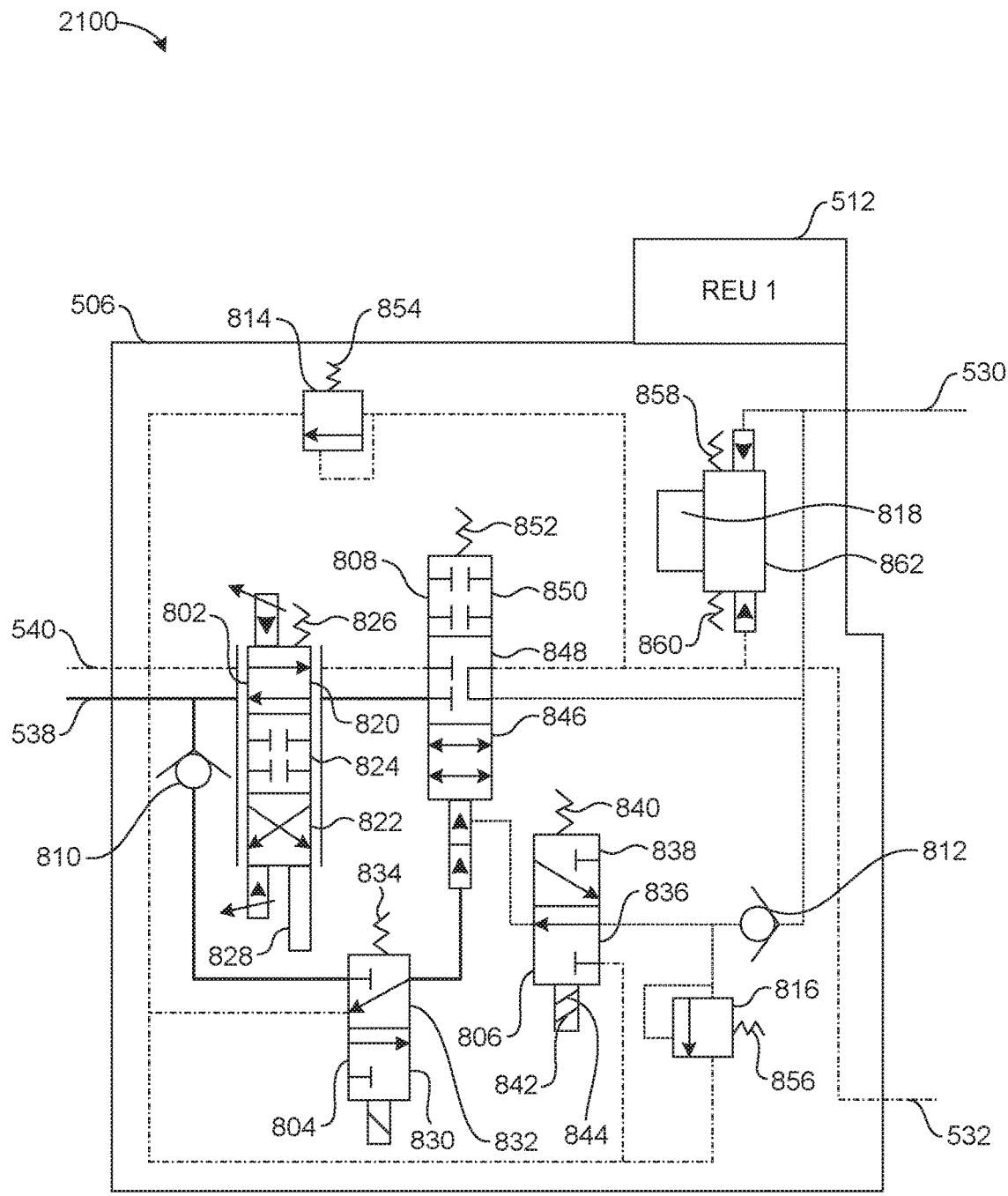
FIG. 21 is a schematic of the first example hydraulic module of FIG. 5 in a fourteenth example operational mode.
Figure 22:
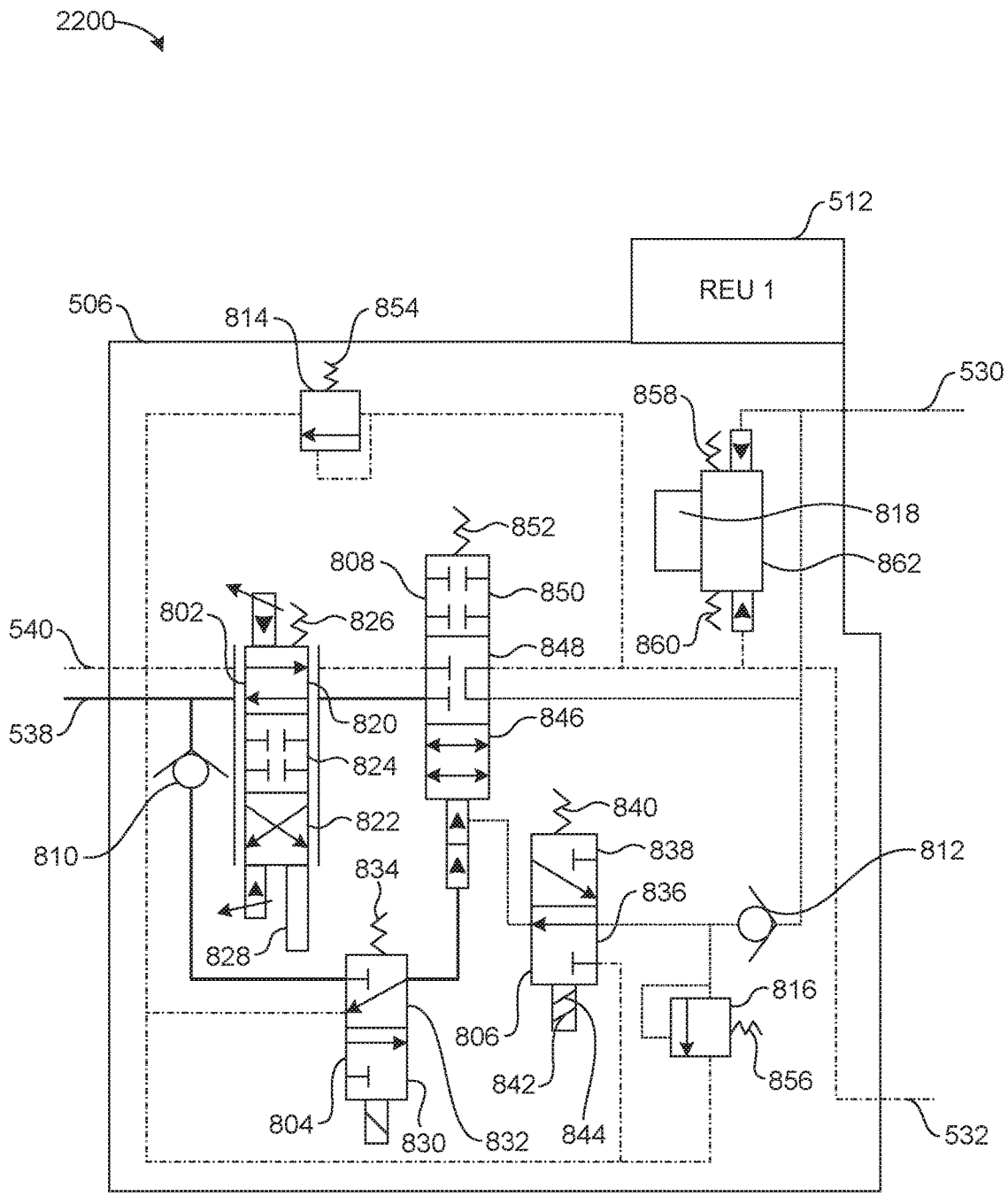
FIG. 22 is a schematic of the first example hydraulic module of FIG. 5 in a fifteenth example operational mode.
Figure 23:
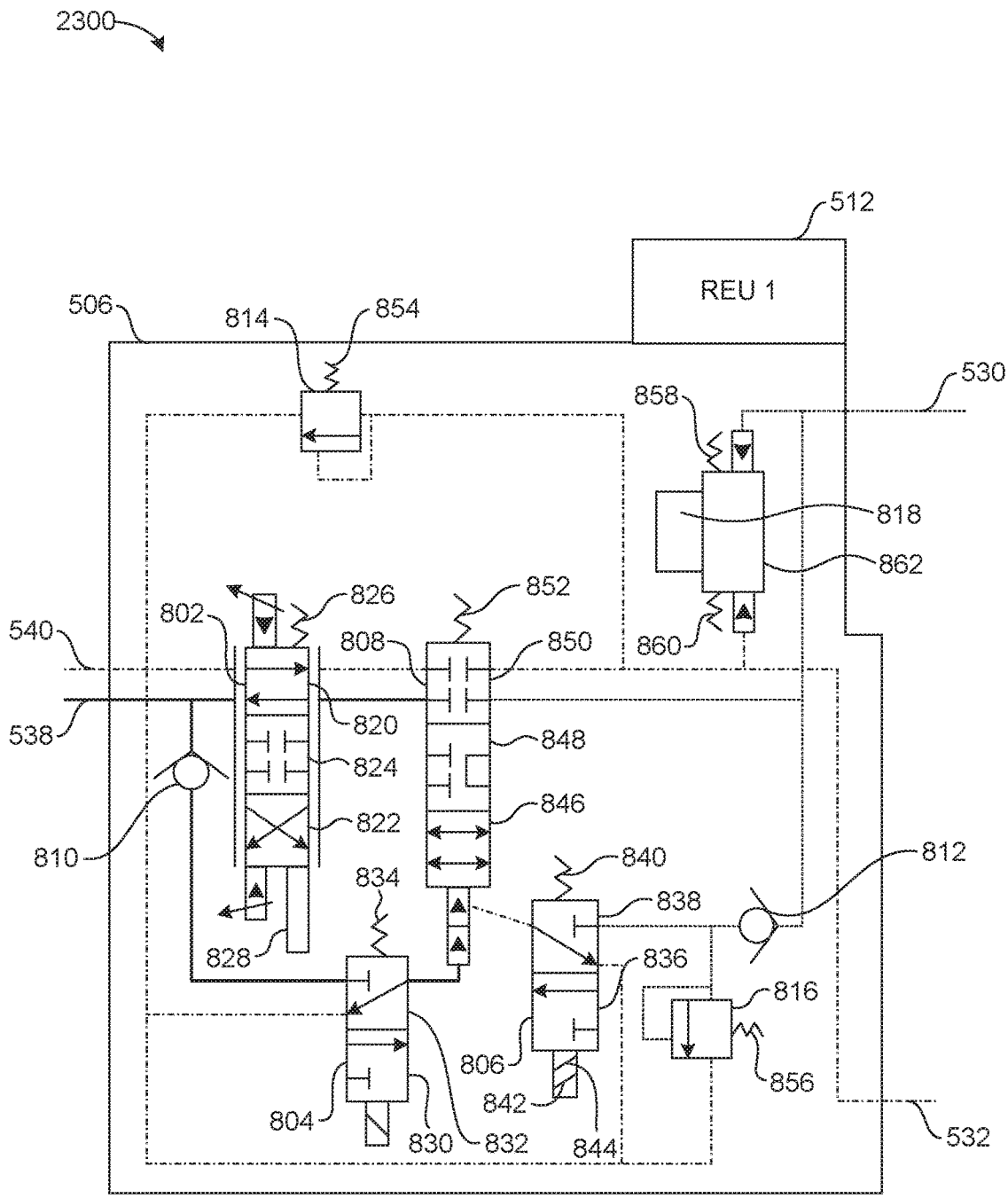
FIG. 23 is a schematic of the first example hydraulic module of FIG. 5 in a sixteenth example operational mode.

FIG. 8 is a schematic of the first example hydraulic module 506 of FIG. 5 in a first example operational mode 800. FIG. 9 is a schematic of the first example hydraulic module 506 of FIG. 5 in a second example operational mode 900. FIG. 10 is a schematic of the first example hydraulic module 506 of FIG. 5 in a third example operational mode 1000. FIG. 11 is a schematic of the first example hydraulic module 506 of FIG. 5 in a fourth example operational mode 1100. FIG. 12 is a schematic of the first example hydraulic module 506 of FIG. 5 in a fifth example operational mode 1200. FIG. 13 is a schematic of the first example hydraulic module 506 of FIG. 5 in a sixth example operational mode 1300. FIG. 14 is a schematic of the first example hydraulic module 506 of FIG. 5 in a seventh example operational mode 1400. FIG. 15 is a schematic of the first example hydraulic module 506 of FIG. 5 in an eighth example operational mode 1500. FIG. 16 is a schematic of the first example hydraulic module 506 of FIG. 5 in a ninth example operational mode 1600. FIG. 17 is a schematic of the first example hydraulic module 506 of FIG. 5 in a tenth example operational mode 1700. FIG. 18 is a schematic of the first example hydraulic module 506 of FIG. 5 in an eleventh example operational mode 1800. FIG. 19 is a schematic of the first example hydraulic module 506 of FIG. 5 in a twelfth example operational mode 1900. FIG. 20 is a schematic of the first example hydraulic module 506 of FIG. 5 in a thirteenth example operational mode 2000. FIG. 21 is a schematic of the first example hydraulic module 506 of FIG. 5 in a fourteenth example operational mode 2100. FIG. 22 is a schematic of the first example hydraulic module 506 of FIG. 5 in a fifteenth example operational mode 2200. FIG. 23 is a schematic of the first example hydraulic module 506 of FIG. 5 in a sixteenth example operational mode 2300.

The first hydraulic module 506 of FIGS. 8-23 is operatively coupled to (e.g., in fluid communication with) the first supply line branch 538 and the first return line branch 540 of FIG. 5. The first hydraulic module 506 of FIGS. 8-23 is also operatively coupled to (e.g., in fluid communication with) the first actuator 502 of FIG. 5 via a first port and a second port (e.g., the first and second ports 420, 422 of the actuator 402 of FIG. 4). In the illustrated examples of FIGS. 8-23, the first hydraulic module 506 includes an example electrohydraulic servo valve (EHSV) 802, a first example solenoid valve (SOV1) 804, a second example solenoid valve (SOV2) 806, an example mode selector valve (MSV) 808, a first example check valve 810, a second example check valve 812, a first example relief valve 814, a second example relief valve 816, and an example force sensor 818.

The EHSV 802 of FIGS. 8-23 is a four-way flow-control valve which produces flow as a function of input current. The EHSV 802 has three control ports that are movable and/or actuatable between an example first control port position 820 (e.g., a flap deployment flow position), an example second control port position 822 (e.g., a flap retraction flow position), and an example third control port position 824 (e.g., a null region). The EHSV 802 includes and/or is coupled to an example first bias spring 826 and an example LVDT 828. The first bias spring 826 biases the EHSV 802 into and/or toward the first control port position 820 of the EHSV 802. The LVDT 828 senses, measures and/or detects a position of the EHSV 802. In the illustrated examples of FIGS. 8-23, the EHSV 802 is operatively coupled to (e.g., in electrical communication with) the first REU 512. The first REU 512 selectively positions the EHSV 802 in one of the first, second, or third control port positions 820, 822, 824 of the EHSV 802. For example, the first REU 512 may energize the EHSV 802 to move from the first control port position 820 into the second control port position 822 over the bias generated by the first bias spring 826. In some examples, the first REU 512 transmits a control signal to the EHSV 802 to control the position of the EHSV 802. The first REU 512 also receives an electrical signal from an LVDT of the first actuator 502 (e.g., the LVDT 414 of the actuator 402) associated with the first REU 512 and the first hydraulic module 506.

The SOV1 804 of FIGS. 8-23 is a two-position valve having control ports that are movable and/or actuatable between an example first control port position 830 (e.g., a normal flow position) and an example second control port position 832 (e.g., a diverted flow position). The SOV1 804 includes and/or is coupled to an example second bias spring 834. The second bias spring 834 biases the SOV1 804 into and/or toward the second control port position 832 of the SOV1 804. In the illustrated examples of FIGS. 8-23, the SOV1 804 is operatively coupled to (e.g., in electrical communication with) the first REU 512. The first REU 512 selectively positions the SOV1 804 in one of the first or second control port positions 830, 832 of the SOV1 804. For example, the first REU 512 may energize and/or electrically command the SOV1 804 to move from the second control port position 832 into the first control port position 830 over the bias generated by the second bias spring 834. In some examples, the first REU 512 may de-energize the SOV1 804 in response to detecting and/or determining that a difference between an electrical signal from the LVDT 828 of the EHSV 802 and a calculated position of the EHSV 802 exceeds a threshold (e.g., a predetermined threshold), as may occur in the case of a run-away and/or improperly functioning actuator.

The SOV2 806 of FIGS. 8-23 is a two-position valve having control ports that are movable and/or actuatable between an example first control port position 836 (e.g., a normal flow position) and an example second control port position 838 (e.g., a diverted flow position). The SOV2 806 includes and/or is coupled to an example third bias spring 840. The third bias spring 840 biases the SOV2 806 into and/or toward the second control port position 838 of the SOV2 806. In the illustrated examples of FIGS. 8-23, the SOV2 806 is operatively coupled to (e.g., in electrical communication with) the first REU 512. The first REU 512 selectively positions the SOV2 806 in one of the first or second control port positions 836, 838 of the SOV2 806. For example, the first REU 512 may energize and/or electrically command the SOV2 806 to move from the second control port position 838 into the first control port position 836 over the bias generated by the third bias spring 840. In the illustrated examples of FIGS. 8-23, the SOV2 includes first and second example coils 842, 844 that may be independently and/or selectively energized via the first REU 512 to cause the SOV2 806 to move from the second control port position 838 into the first control port position 836. In some examples, the first REU 512 may de-energize the one or both of the first and second coils 842, 844 of the SOV2 806 in response to detecting and/or determining that a difference between an electrical signal from the LVDT 828 of the EHSV 802 and a calculated position of the EHSV 802 exceeds a threshold (e.g., a predetermined threshold), as may occur in the case of a run-away and/or improperly functioning actuator.

The MSV 808 of FIGS. 8-23 is a four-position valve having control ports that are movable and/or actuatable between an example first control port position 846 (e.g., an active flow position), an example second control port position 848 (e.g., a bypassed flow position), and an example third control port position 850 (e.g., a blocked flow position). The MSV 808 includes and/or is coupled to an example fourth bias spring 852. The fourth bias spring 852 biases the MSV 808 into and/or toward the third control port position 850 of the MSV 808. In the illustrated examples of FIGS. 8-23, the MSV 808 is operatively coupled to (e.g., in fluid communication with) the SOV1 804 and the SOV2 806 of FIGS. 8-23. The SOV1 804 and/or the SOV2 806 selectively position(s) the MSV 808 in one of the first, second, or third control port positions 846, 848, 850 of the MSV 808. For example, the SOV1 804 and/or the SOV2 806 may supply pressurized hydraulic fluid to the MSV 808 to move the MSV 808 from the third control port position 850 into the second control port position 848 or the first control port position 846 over the bias generated by the fourth bias spring 852.

When the MSV 808 of FIGS. 8-23 is positioned in the second control port position 848 (e.g., the bypassed flow position), pressurized hydraulic fluid contained within a first fluid volume of the first actuator 502 (e.g., the first fluid volume 416 of the actuator 402 of FIG. 4) freely passes from the first fluid volume through the first port 530 of the first actuator 502, through the MSV 808 of the first hydraulic module 506, through the second port 532 of the first actuator 502, and into a second fluid volume of the first actuator 502 (e.g., the second fluid volume 418 of the actuator 402 of FIG. 4). Pressurized hydraulic fluid contained within the second fluid volume of the first actuator 502 also freely passes from the second fluid volume through the second port 532 of the first actuator 502, through the MSV 808 of the first hydraulic module 506, through the first port 530 of the first actuator 502, and into the first fluid volume of the first actuator 502. The unrestricted exchange and/or bypass of pressurized hydraulic fluid between the first fluid volume and the second fluid volume of the first actuator 502 enables a piston of the first actuator 502 (e.g., the piston 410 of the actuator 402 of FIG. 4) to be freely movable. The position of the piston and/or the position of a wing flap to which the piston is coupled is/are accordingly freely movable when the MSV 808 of the first hydraulic module 506 is in the second control port position 848 (e.g., the bypassed flow position).

When the MSV 808 of FIGS. 8-23 is positioned in the third control port position 850 (e.g., the blocked flow position), pressurized hydraulic fluid contained within a first fluid volume of the first actuator 502 (e.g., the first fluid volume 416 of the actuator 402 of FIG. 4) is blocked from passing via the first port 530 of the first actuator 502 back through the MSV 808 of the first hydraulic module 506. Pressurized hydraulic fluid contained within a second fluid volume of the first actuator 502 (e.g., the second fluid volume 418 of the actuator 402 of FIG. 4) is blocked from passing via the second port 532 of the first actuator 502 back through the MSV 808 of the first hydraulic module 506. The flow of pressurized hydraulic fluid to and/or from the first fluid volume and/or the second fluid volume of the first actuator 502 is accordingly interrupted. The interruption of flow prevents a piston of the first actuator 502 (e.g., the piston 410 of the actuator 402 of FIG. 4) from moving. The position of the piston and/or the position of a wing flap to which the piston is coupled is/are accordingly locked and/or fixed when the MSV 808 of the first hydraulic module 506 is in the third control port position 850 (e.g., the blocked flow position). The interruption accordingly maintains the last flap commanded position when a failure occurs, whether the failure be hydraulic or electrical.

The first check valve 810 of FIGS. 8-23 blocks pressurized hydraulic fluid that has passed in a first direction through the first check valve 810 from returning through the check valve in a second direction opposite the first direction. The second check valve 812 of FIGS. 8-23 blocks pressurized hydraulic fluid that has passed in a first direction through the second check valve 812 from returning through the check valve in a second direction opposite the first direction.

The first and second relief valves 814, 816 of FIGS. 8-23 respectively control and/or limit the pressure of the pressurized hydraulic fluid within the first hydraulic module 506. The first relief valve 814 of FIGS. 8-23 includes and/or is coupled to an example fifth bias spring 854 that biases the first relief valve 814 into a closed position. The first relief valve 814 may be hydraulically actuated (e.g., over the bias generated by the fifth bias spring 854) from the closed position into an open position in response to a buildup of pressure associated with the pressurized hydraulic fluid within the first hydraulic module 506. The second relief valve 816 of FIGS. 8-23 includes and/or is coupled to an example sixth bias spring 856 that biases the second relief valve 816 into a closed position. The second relief valve 816 may be hydraulically actuated (e.g., over the bias generated by the sixth bias spring 856) from the closed position into an open position in response to a buildup of pressure associated with the pressurized hydraulic fluid within the first hydraulic module 506.

The force sensor 818 of FIGS. 8-23 senses, measures and/or detects a force and/or pressure associated with the pressurized hydraulic fluid being supplied to and/or returned from the first actuator 502 via the first hydraulic module 506. The force sensor 818 includes an example seventh bias spring 858, an example eighth bias spring 860, and an example LVDT 862. The seventh bias spring 858 and the eighth bias spring 860 collectively bias the LVDT 862 to a central and/or balanced position. In response to the respective pressures of the pressurized hydraulic fluid being supplied to and returned from the first actuator 502 via the first hydraulic module, the position of the LVDT 862 may either move in a first direction away from the balanced position against the bias of the seventh bias spring 858, or move in a second direction (e.g., opposite the first direction) away from the balanced position against the bias of the eighth bias spring 860. The force sensor 818 is operatively coupled to (e.g., in electrical communication with) the first REU 512. The first REU 512 receives an electrical signal from the LVDT 862 of the force sensor 818.

FIG. 24 is an example logic table 2400 corresponding to the sixteen example operational modes of the first example hydraulic module 506 of FIGS. 5 and 8-23. More specifically, the logic table 2400 of FIG. 24 includes a first example row 2402 corresponding to the first operational mode 800 of the first hydraulic module 506 as shown in FIG. 8, a second example row 2404 corresponding to the second operational mode 900 of the first hydraulic module 506 as shown in FIG. 9, a third example row 2406 corresponding to the third operational mode 1000 of the first hydraulic module 506 as shown in FIG. 10, a fourth example row 2408 corresponding to the fourth operational mode 1100 of the first hydraulic module 506 as shown in FIG. 11, a fifth example row 2410 corresponding to the fifth operational mode 1200 of the first hydraulic module 506 as shown in FIG. 12, a sixth example row 2412 corresponding to the sixth operational mode 1300 of the first hydraulic module 506 as shown in FIG. 13, a seventh example row 2414 corresponding to the seventh operational mode 1400 of the first hydraulic module 506 as shown in FIG. 14, an eighth example row 2416 corresponding to the eighth operational mode 1500 of the first hydraulic module 506 as shown in FIG. 15, a ninth example row 2418 corresponding to the ninth operational mode 1600 of the first hydraulic module 506 as shown in FIG. 16, a tenth example row 2420 corresponding to the tenth operational mode 1700 of the first hydraulic module 506 as shown in FIG. 17, an eleventh example row 2422 corresponding to the eleventh operational mode 1800 of the first hydraulic module 506 as shown in FIG. 18, a twelfth example row 2424 corresponding to the twelfth operational mode 1900 of the first hydraulic module 506 as shown in FIG. 19, a thirteenth example row 2426 corresponding to the thirteenth operational mode 2000 of the first hydraulic module 506 as shown in FIG. 20, a fourteenth example row 2428 corresponding to the fourteenth operational mode 2100 of the first hydraulic module 506 as shown in FIG. 21, a fifteenth example row 2430 corresponding to the fifteenth operational mode 2200 of the first hydraulic module 506 as shown in FIG. 22, and a sixteenth example row 2432 corresponding to the sixteenth operational mode 2300 of the first hydraulic module 506 as shown in FIG. 23.

As shown in the first row 2402 of the logic table 2400 of FIG. 24, the first operational mode 800 of the first hydraulic module 506 of FIG. 8 corresponds to an active mode of the first hydraulic module 506 and/or the first actuator 502. When the first hydraulic module 506 is in the first operational mode 800 of FIG. 8, pressurized hydraulic fluid (e.g., pressurized hydraulic fluid generated by the hydraulic system 51) is supplied from the third hydraulic module 510 to the first hydraulic module 506 via the first supply line branch 538. The SOV1 804 of the first hydraulic module 506 is energized (e.g., ON), the first coil 842 of the SOV2 806 of the first hydraulic module 506 is energized (e.g., ON), and the second coil 844 of the SOV2 806 of the first hydraulic module 506 is energized (e.g., ON). The EHSV 802 is in the first control port position 820 of the EHSV 802, the SOV1 804 is in the first control port position 830 of the SOV1 804, the SOV2 806 is in the first control port position 836 of the SOV2 806, and the MSV 808 is in the first control port position 846 (e.g., the active flow position) of the MSV 808. In other examples, the EHSV 802 may be in the second control port position 822 of the EHSV 802 when the first hydraulic module 506 is in the first operational mode 800 of FIG. 8.

As shown in the second row 2404 of the logic table 2400 of FIG. 24, the second operational mode 900 of the first hydraulic module 506 of FIG. 9 corresponds to an active mode of the first hydraulic module 506 and/or the first actuator 502. When the first hydraulic module 506 is in the second operational mode 900 of FIG. 9, pressurized hydraulic fluid (e.g., pressurized hydraulic fluid generated by the hydraulic system 518) is supplied from the third hydraulic module 510 to the first hydraulic module 506 via the first supply line branch 538. The SOV1 804 of the first hydraulic module 506 is energized (e.g., ON), the first coil 842 of the SOV2 806 of the first hydraulic module 506 is deenergized (e.g., OFF), and the second coil 844 of the SOV2 806 of the first hydraulic module 506 is deenergized (e.g., OFF). The EHSV 802 is in the first control port position 820 of the EHSV 802, the SOV1 804 is in the first control port position 830 of the SOV1 804, the SOV2 806 is in the second control port position 838 of the SOV2 806, and the MSV 808 is in the first control port position 846 (e.g., the active flow position) of the MSV 808. In other examples, the EHSV 802 may be in the second control port position 822 of the EHSV 802 when the first hydraulic module 506 is in the second operational mode 900 of FIG. 9.

As shown in the third row 2406 of the logic table 2400 of FIG. 24, the third operational mode 1000 of the first hydraulic module 506 of FIG. 10 corresponds to an active mode of the first hydraulic module 506 and/or the first actuator 502. When the first hydraulic module 506 is in the third operational mode 1000 of FIG. 10, pressurized hydraulic fluid (e.g., pressurized hydraulic fluid generated by the hydraulic system 518) is supplied from the third hydraulic module 510 to the first hydraulic module 506 via the first supply line branch 538. The SOV1 804 of the first hydraulic module 506 is energized (e.g., ON), the first coil 842 of the SOV2 806 of the first hydraulic module 506 is energized (e.g., ON), and the second coil 844 of the SOV2 806 of the first hydraulic module 506 is deenergized (e.g., OFF). The EHSV 802 is in the first control port position 820 of the EHSV 802, the SOV1 804 is in the first control port position 830 of the SOV1 804, the SOV2 806 is in the second control port position 838 of the SOV2 806, and the MSV 808 is in the first control port position 846 (e.g., the active flow position) of the MSV 808. In other examples, the EHSV 802 may be in the second control port position 822 of the EHSV 802 when the first hydraulic module 506 is in the third operational mode 1000 of FIG. 10.

As shown in the fourth row 2408 of the logic table 2400 of FIG. 24, the fourth operational mode 1100 of the first hydraulic module 506 of FIG. 11 corresponds to an active mode of the first hydraulic module 506 and/or the first actuator 502. When the first hydraulic module 506 is in the fourth operational mode 1100 of FIG. 11, pressurized hydraulic fluid (e.g., pressurized hydraulic fluid generated by the hydraulic system 518) is supplied from the third hydraulic module 510 to the first hydraulic module 506 via the first supply line branch 538. The SOV1 804 of the first hydraulic module 506 is energized (e.g., ON), the first coil 842 of the SOV2 806 of the first hydraulic module 506 is deenergized (e.g., OFF), and the second coil 844 of the SOV2 806 of the first hydraulic module 506 is energized (e.g., ON). The EHSV 802 is in the first control port position 820 of the EHSV 802, the SOV1 804 is in the first control port position 830 of the SOV1 804, the SOV2 806 is in the second control port position 838 of the SOV2 806, and the MSV 808 is in the first control port position 846 (e.g., the active flow position) of the MSV 808. In other examples, the EHSV 802 may be in the second control port position 822 of the EHSV 802 when the first hydraulic module 506 is in the fourth operational mode 1100 of FIG. 11.

As shown in the fifth row 2410 of the logic table 2400 of FIG. 24, the fifth operational mode 1200 of the first hydraulic module 506 of FIG. 12 corresponds to a bypassed mode of the first hydraulic module 506 and/or the first actuator 502. When the first hydraulic module 506 is in the fifth operational mode 1200 of FIG. 12, pressurized hydraulic fluid (e.g., pressurized hydraulic fluid generated by the hydraulic system 518) is supplied from the third hydraulic module 510 to the first hydraulic module 506 via the first supply line branch 538. The SOV1 804 of the first hydraulic module 506 is deenergized (e.g., OFF), the first coil 842 of the SOV2 806 of the first hydraulic module 506 is energized (e.g., ON), and the second coil 844 of the SOV2 806 of the first hydraulic module 506 is energized (e.g., ON). The EHSV 802 is in the first control port position 820 of the EHSV 802, the SOV1 804 is in the second control port position 832 of the SOV1 804, the SOV2 806 is in the first control port position 836 of the SOV2 806, and the MSV 808 is in the second control port position 848 (e.g., the bypassed flow position) of the MSV 808. In other examples, the EHSV 802 may be in the second control port position 822 of the EHSV 802 when the first hydraulic module 506 is in the fifth operational mode 1200 of FIG. 12.

As shown in the sixth row 2412 of the logic table 2400 of FIG. 24, the sixth operational mode 1300 of the first hydraulic module 506 of FIG. 13 corresponds to a bypassed mode of the first hydraulic module 506 and/or the first actuator 502. When the first hydraulic module 506 is in the sixth operational mode 1300 of FIG. 13, pressurized hydraulic fluid (e.g., pressurized hydraulic fluid generated by the hydraulic system 518) is supplied from the third hydraulic module 510 to the first hydraulic module 506 via the first supply line branch 538. The SOV1 804 of the first hydraulic module 506 is deenergized (e.g., OFF), the first coil 842 of the SOV2 806 of the first hydraulic module 506 is energized (e.g., ON), and the second coil 844 of the SOV2 806 of the first hydraulic module 506 is deenergized (e.g., OFF). The EHSV 802 is in the first control port position 820 of the EHSV 802, the SOV1 804 is in the second control port position 832 of the SOV1 804, the SOV2 806 is in the first control port position 836 of the SOV2 806, and the MSV 808 is in the second control port position 848 (e.g., the bypassed flow position) of the MSV 808. In other examples, the EHSV 802 may be in the second control port position 822 of the EHSV 802 when the first hydraulic module 506 is in the sixth operational mode 1300 of FIG. 13.

As shown in the seventh row 2414 of the logic table 2400 of FIG. 24, the seventh operational mode 1400 of the first hydraulic module 506 of FIG. 14 corresponds to a bypassed mode of the first hydraulic module 506 and/or the first actuator 502. When the first hydraulic module 506 is in the seventh operational mode 1400 of FIG. 14, pressurized hydraulic fluid (e.g., pressurized hydraulic fluid generated by the hydraulic system 518) is supplied from the third hydraulic module 510 to the first hydraulic module 506 via the first supply line branch 538. The SOV1 804 of the first hydraulic module 506 is deenergized (e.g., OFF), the first coil 842 of the SOV2 806 of the first hydraulic module 506 is deenergized (e.g., OFF), and the second coil 844 of the SOV2 806 of the first hydraulic module 506 is energized (e.g., ON). The EHSV 802 is in the first control port position 820 of the EHSV 802, the SOV1 804 is in the second control port position 832 of the SOV1 804, the SOV2 806 is in the first control port position 836 of the SOV2 806, and the MSV 808 is in the second control port position 848 (e.g., the bypassed flow position) of the MSV 808. In other examples, the EHSV 802 may be in the second control port position 822 of the EHSV 802 when the first hydraulic module 506 is in the seventh operational mode 1400 of FIG. 14.

As shown in the eighth row 2416 of the logic table 2400 of FIG. 24, the eighth operational mode 1500 of the first hydraulic module 506 of FIG. 15 corresponds to a blocked mode of the first hydraulic module 506 and/or the first actuator 502. When the first hydraulic module 506 is in the eighth operational mode 1500 of FIG. 15, pressurized hydraulic fluid (e.g., pressurized hydraulic fluid generated by the hydraulic system 518) is supplied from the third hydraulic module 510 to the first hydraulic module 506 via the first supply line branch 538. The SOV1 804 of the first hydraulic module 506 is deenergized (e.g., OFF), the first coil 842 of the SOV2 806 of the first hydraulic module 506 is deenergized (e.g., OFF), and the second coil 844 of the SOV2 806 of the first hydraulic module 506 is deenergized (e.g., OFF). The EHSV 802 is in the first control port position 820 of the EHSV 802, the SOV1 804 is in the second control port position 832 of the SOV1 804, the SOV2 806 is in the second control port position 838 of the SOV2 806, and the MSV 808 is in the third control port position 850 (e.g., the blocked flow position) of the MSV 808. In other examples, the EHSV 802 may be in the second control port position 822 of the EHSV 802 when the first hydraulic module 506 is in the eighth operational mode 1500 of FIG. 15.

As shown in the ninth row 2418 of the logic table 2400 of FIG. 24, the ninth operational mode 1600 of the first hydraulic module 506 of FIG. 16 corresponds to a bypassed mode of the first hydraulic module 506 and/or the first actuator 502. When the first hydraulic module 506 is in the ninth operational mode 1600 of FIG. 16, pressurized hydraulic fluid (e.g., pressurized hydraulic fluid generated by the hydraulic system 518) is not available and/or not supplied from the third hydraulic module 510 to the first hydraulic module 506. The SOV1 804 of the first hydraulic module 506 is energized (e.g., ON), the first coil 842 of the SOV2 806 of the first hydraulic module 506 is energized (e.g., ON), and the second coil 844 of the SOV2 806 of the first hydraulic module 506 is energized (e.g., ON). The EHSV 802 is in the first control port position 820 of the EHSV 802, the SOV1 804 is in the first control port position 830 of the SOV1 804, the SOV2 806 is in the first control port position 836 of the SOV2 806, and the MSV 808 is in the second control port position 848 (e.g., the bypassed flow position) of the MSV 808. In other examples, the EHSV 802 may be in the second control port position 822 of the EHSV 802 when the first hydraulic module 506 is in the ninth operational mode 1600 of FIG. 16.

As shown in the tenth row 2420 of the logic table 2400 of FIG. 24, the tenth operational mode 1700 of the first hydraulic module 506 of FIG. 17 corresponds to a bypassed mode of the first hydraulic module 506 and/or the first actuator 502. When the first hydraulic module 506 is in the tenth operational mode 1700 of FIG. 17, pressurized hydraulic fluid (e.g., pressurized hydraulic fluid generated by the hydraulic system 518) is not available and/or not supplied from the third hydraulic module 510 to the first hydraulic module 506. The SOV1 804 of the first hydraulic module 506 is energized (e.g., ON), the first coil 842 of the SOV2 806 of the first hydraulic module 506 is energized (e.g., ON), and the second coil 844 of the SOV2 806 of the first hydraulic module 506 is deenergized (e.g., OFF). The EHSV 802 is in the first control port position 820 of the EHSV 802, the SOV1 804 is in the first control port position 830 of the SOV1 804, the SOV2 806 is in the first control port position 836 of the SOV2 806, and the MSV 808 is in the second control port position 848 (e.g., the bypassed flow position) of the MSV 808. In other examples, the EHSV 802 may be in the second control port position 822 of the EHSV 802 when the first hydraulic module 506 is in the tenth operational mode 1700 of FIG. 17.

As shown in the eleventh row 2422 of the logic table 2400 of FIG. 24, the eleventh operational mode 1800 of the first hydraulic module 506 of FIG. 18 corresponds to a bypassed mode of the first hydraulic module 506 and/or the first actuator 502. When the first hydraulic module 506 is in the eleventh operational mode 1800 of FIG. 18, pressurized hydraulic fluid (e.g., pressurized hydraulic fluid generated by the hydraulic system 518) is not available and/or not supplied from the third hydraulic module 510 to the first hydraulic module 506. The SOV1 804 of the first hydraulic module 506 is energized (e.g., ON), the first coil 842 of the SOV2 806 of the first hydraulic module 506 is deenergized (e.g., OFF), and the second coil 844 of the SOV2 806 of the first hydraulic module 506 is energized (e.g., ON). The EHSV 802 is in the first control port position 820 of the EHSV 802, the SOV1 804 is in the first control port position 830 of the SOV1 804, the SOV2 806 is in the first control port position 836 of the SOV2 806, and the MSV 808 is in the second control port position 848 (e.g., the bypassed flow position) of the MSV 808. In other examples, the EHSV 802 may be in the second control port position 822 of the EHSV 802 when the first hydraulic module 506 is in the eleventh operational mode 1800 of FIG. 18.

As shown in the twelfth row 2424 of the logic table 2400 of FIG. 24, the twelfth operational mode 1900 of the first hydraulic module 506 of FIG. 19 corresponds to a blocked mode of the first hydraulic module 506 and/or the first actuator 502. When the first hydraulic module 506 is in the twelfth operational mode 1900 of FIG. 19, pressurized hydraulic fluid (e.g., pressurized hydraulic fluid generated by the hydraulic system 518) is not available and/or not supplied from the third hydraulic module 510 to the first hydraulic module 506. The SOV1 804 of the first hydraulic module 506 is energized (e.g., ON), the first coil 842 of the SOV2 806 of the first hydraulic module 506 is deenergized (e.g., OFF), and the second coil 844 of the SOV2 806 of the first hydraulic module 506 is deenergized (e.g., OFF). The EHSV 802 is in the first control port position 820 of the EHSV 802, the SOV1 804 is in the first control port position 830 of the SOV1 804, the SOV2 806 is in the second control port position 838 of the SOV2 806, and the MSV 808 is in the third control port position 850 (e.g., the blocked flow position) of the MSV 808. In other examples, the EHSV 802 may be in the second control port position 822 of the EHSV 802 when the first hydraulic module 506 is in the twelfth operational mode 1900 of FIG. 19.

As shown in the thirteenth row 2426 of the logic table 2400 of FIG. 24, the thirteenth operational mode 2000 of the first hydraulic module 506 of FIG. 20 corresponds to a bypassed mode of the first hydraulic module 506 and/or the first actuator 502. When the first hydraulic module 506 is in the thirteenth operational mode 2000 of FIG. 20, pressurized hydraulic fluid (e.g., pressurized hydraulic fluid generated by the hydraulic system 518) is not available and/or not supplied from the third hydraulic module 510 to the first hydraulic module 506. The SOV1 804 of the first hydraulic module 506 is deenergized (e.g., OFF), the first coil 842 of the SOV2 806 of the first hydraulic module 506 is energized (e.g., ON), and the second coil 844 of the SOV2 806 of the first hydraulic module 506 is energized (e.g., ON). The EHSV 802 is in the first control port position 820 of the EHSV 802, the SOV1 804 is in the second control port position 832 of the SOV1 804, the SOV2 806 is in the first control port position 836 of the SOV2 806, and the MSV 808 is in the second control port position 848 (e.g., the bypassed flow position) of the MSV 808. In other examples, the EHSV 802 may be in the second control port position 822 of the EHSV 802 when the first hydraulic module 506 is in the thirteenth operational mode 2000 of FIG. 20.

As shown in the fourteenth row 2428 of the logic table 2400 of FIG. 24, the fourteenth operational mode 2100 of the first hydraulic module 506 of FIG. 21 corresponds to a bypassed mode of the first hydraulic module 506 and/or the first actuator 502. When the first hydraulic module 506 is in the fourteenth operational mode 2100 of FIG. 21, pressurized hydraulic fluid (e.g., pressurized hydraulic fluid generated by the hydraulic system 518) is not available and/or not supplied from the third hydraulic module 510 to the first hydraulic module 506. The SOV1 804 of the first hydraulic module 506 is deenergized (e.g., OFF), the first coil 842 of the SOV2 806 of the first hydraulic module 506 is energized (e.g., ON), and the second coil 844 of the SOV2 806 of the first hydraulic module 506 is deenergized (e.g., OFF). The EHSV 802 is in the first control port position 820 of the EHSV 802, the SOV1 804 is in the second control port position 832 of the SOV1 804, the SOV2 806 is in the first control port position 836 of the SOV2 806, and the MSV 808 is in the second control port position 848 (e.g., the bypassed flow position) of the MSV 808. In other examples, the EHSV 802 may be in the second control port position 822 of the EHSV 802 when the first hydraulic module 506 is in the fourteenth operational mode 2100 of FIG. 21.

As shown in the fifteenth row 2430 of the logic table 2400 of FIG. 24, the fifteenth operational mode 2200 of the first hydraulic module 506 of FIG. 22 corresponds to a bypassed mode of the first hydraulic module 506 and/or the first actuator 502. When the first hydraulic module 506 is in the fifteenth operational mode 2200 of FIG. 22, pressurized hydraulic fluid (e.g., pressurized hydraulic fluid generated by the hydraulic system 518) is not available and/or not supplied from the third hydraulic module 510 to the first hydraulic module 506. The SOV1 804 of the first hydraulic module 506 is deenergized (e.g., OFF), the first coil 842 of the SOV2 806 of the first hydraulic module 506 is deenergized (e.g., OFF), and the second coil 844 of the SOV2 806 of the first hydraulic module 506 is energized (e.g., ON). The EHSV 802 is in the first control port position 820 of the EHSV 802, the SOV1 804 is in the second control port position 832 of the SOV1 804, the SOV2 806 is in the first control port position 836 of the SOV2 806, and the MSV 808 is in the second control port position 848 (e.g., the bypassed flow position) of the MSV 808. In other examples, the EHSV 802 may be in the second control port position 822 of the EHSV 802 when the first hydraulic module 506 is in the fifteenth operational mode 2200 of FIG. 22.

As shown in the sixteenth row 2432 of the logic table 2400 of FIG. 24, the sixteenth operational mode 2300 of the first hydraulic module 506 of FIG. 23 corresponds to a blocked mode of the first hydraulic module 506 and/or the first actuator 502. When the first hydraulic module 506 is in the sixteenth operational mode 2300 of FIG. 23, pressurized hydraulic fluid (e.g., pressurized hydraulic fluid generated by the hydraulic system 518) is not available and/or not supplied from the third hydraulic module 510 to the first hydraulic module 506. The SOV1 804 of the first hydraulic module 506 is deenergized (e.g., OFF), the first coil 842 of the SOV2 806 of the first hydraulic module 506 is deener- gized (e.g., OFF), and the second coil 844 of the SOV2 806 of the first hydraulic module 506 is deenergized (e.g., OFF). The EHSV 802 is in the first control port position 820 of the EHSV 802, the SOV1 804 is in the second control port position 832 of the SOV1 804, the SOV2 806 is in the second control port position 838 of the SOV2 806, and the MSV 808 is in the third control port position 850 (e.g., the blocked flow position) of the MSV 808. In other examples, the EHSV 802 may be in the second control port position 822 of the EHSV 802 when the first hydraulic module 506 is in the sixteenth operational mode 2300 of FIG. 23.

Figure 25A:
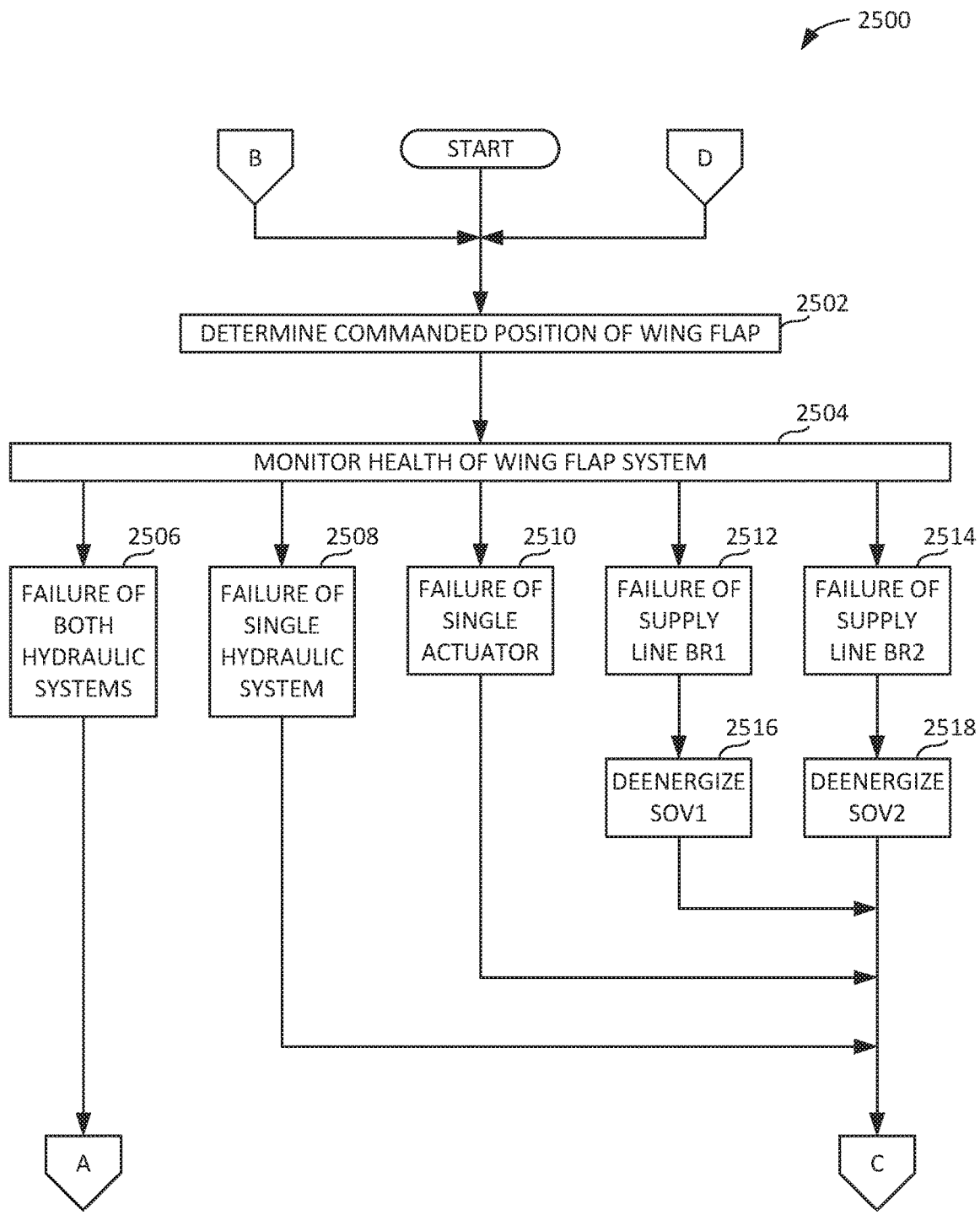
FIGS. 25A-25C are a flowchart representative of an example method for implementing the example distributed trailing edge wing flap system of FIGS. 3-23 to control the position of a wing flap.
Figure 25B:
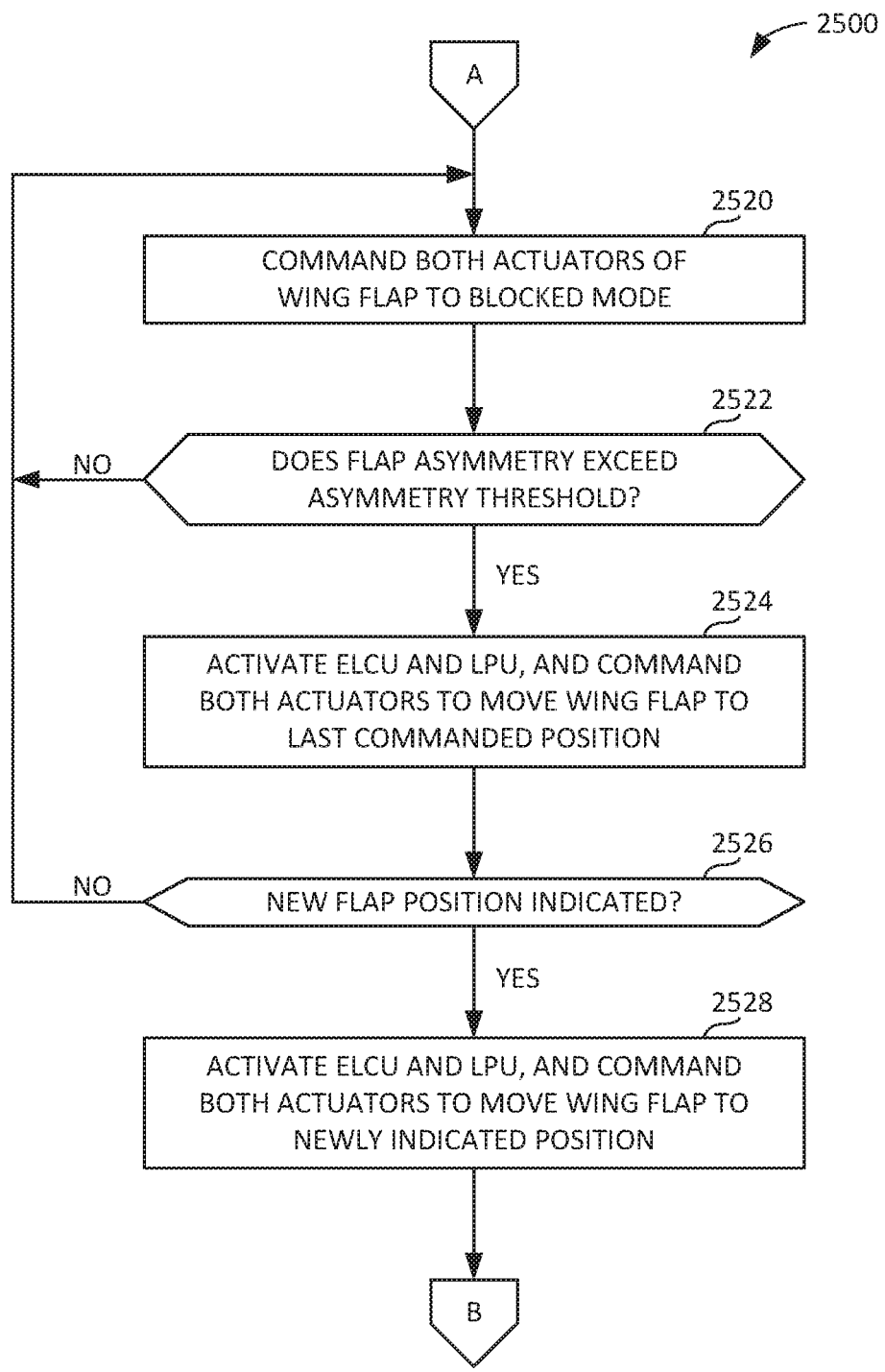
Figure 25C:
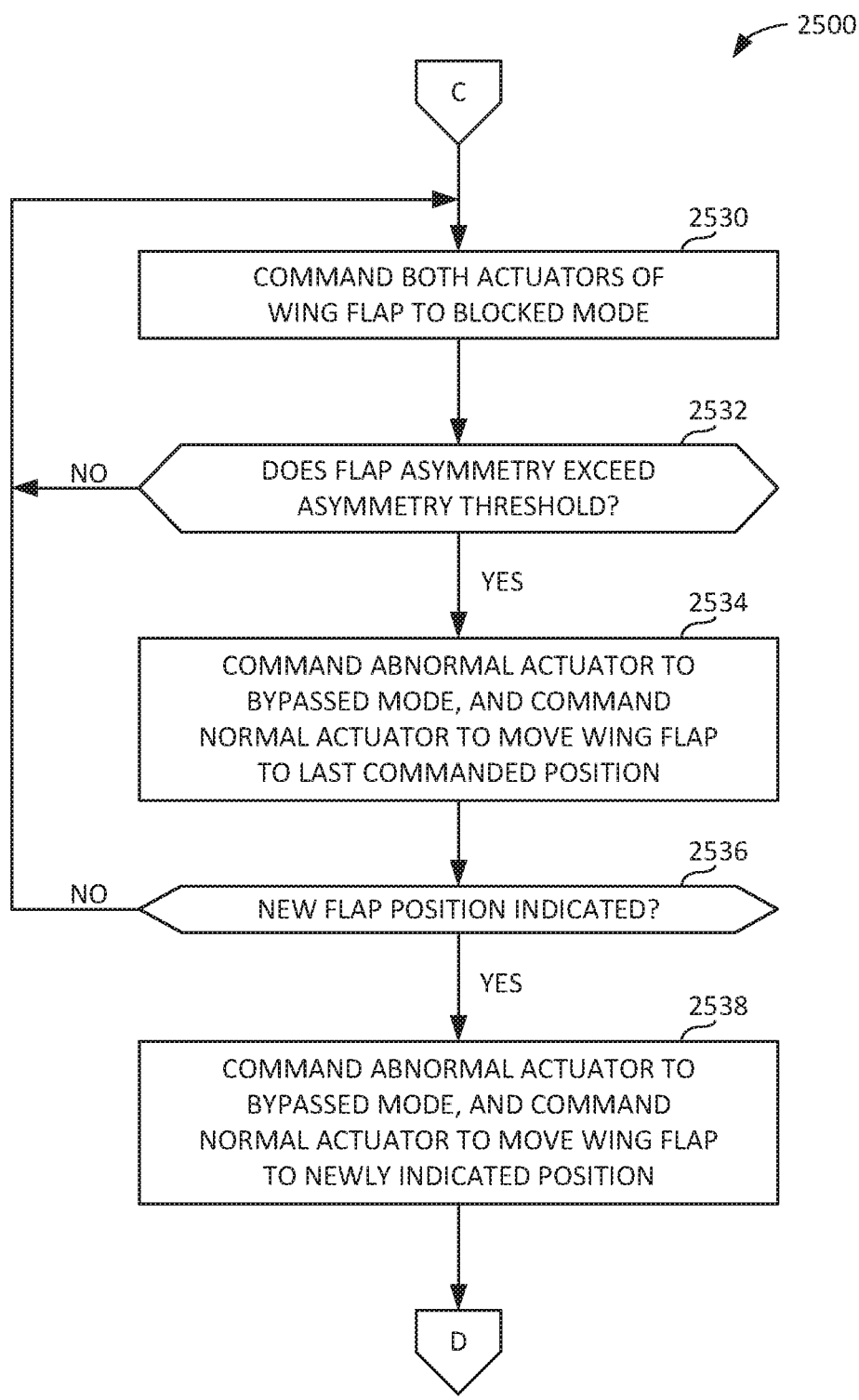

FIGS. 25A-25C are a flowchart representative of an example method 2500 for implementing the example distributed trailing edge wing flap system 300 of FIGS. 3-23 to control the position of a wing flap. The method 2500 of FIGS. 25A-25C begins with determining a commanded position of a wing flap of the distributed trailing edge wing flap system 300 (block 2502). For example, the FCEU 524 of FIG. 5 may determine a commanded position of a wing flap (e.g., the first inboard flap 112 of FIG. 3) coupled to the first actuator 502 and the second actuator 504 of FIG. 5. Following block 2502, the method 2500 of FIGS. 25A-25C proceeds to block 2504.

The method 2500 of FIGS. 25A-25C includes monitoring the health of the distributed trailing edge wing flap system 300 (block 2504). For example, the FCEU 524 of FIG. 5 may monitor the health of the first actuator 502, the second actuator 504, the hydraulic system 518 (e.g., a first hydraulic system), the first supply line branch 538, and/or the second supply line branch 542 of FIG. 5. The health of a second hydraulic system may also be monitored. In connection with monitoring the health of the distributed trailing edge wing flap system 300, the FCEU 524 of FIG. 5 may determine whether the first actuator 502, the second actuator 504, the hydraulic system 518, the second hydraulic system, the first supply line branch 538, and/or the second supply line branch 542 is/are functioning properly, or whether the first actuator 502, the second actuator 504, the hydraulic system 518, the second hydraulic system, the first supply line branch 538, and/or the second supply line branch 542 has/have failed.

If the FCEU 524 determines that both the first and second hydraulic systems have failed (block 2506) while monitoring the health of the distributed trailing edge wing flap system 300, the method 2500 of FIGS. 25A-25C proceeds to block 2520. If the FCEU 524 determines that one (but not both) of the first and second hydraulic systems has failed (block 2508) while monitoring the health of the distributed trailing edge wing flap system 300, the method 2500 of FIGS. 25A-25C proceeds to block 2530. If the FCEU 524 determines that one (but not both) of the first actuator 502 and the second actuator 504 has failed (block 2510) while monitoring the health of the distributed trailing edge wing flap system 300, the method 2500 of FIGS. 25A-25C proceeds to block 2530. If the FCEU 524 determines that the first supply line branch 538 has failed (block 2512) while monitoring the health of the distributed trailing edge wing flap system 300, the method 2500 of FIGS. 25A-25C proceeds to block 2516. If the FCEU 524 determines that the second supply line branch 542 has failed (block 2518) while monitoring the health of the distributed trailing edge wing flap system 300, the method 2500 of FIGS. 25A-25C proceeds to block 2518.

At block 2516, the FCEU 524 commands the third REU 516 of the third hydraulic module 510 to deenergize the SOV1 606 of the third hydraulic module 510 (block 2516). Following block 2516, the method 2500 of FIGS. 25A-25C proceeds to block 2530.

At block 2518, the FCEU 524 commands the third REU 516 of the third hydraulic module 510 to deenergize the SOV2 608 of the third hydraulic module 510 (block 2518). Following block 2518, the method 2500 of FIGS. 25A-25C proceeds to block 2530.

At block 2520, the FCEU 524 commands both the first actuator 502 and the second actuator 504 into a blocked mode (block 2520). For example, the FCEU 524 may send commands to the first REU 512 and the second REU 514 to cause control valves of corresponding ones of the first hydraulic module 506 and the second hydraulic module 508 to move to control port positions that place the first actuator 502 and the second actuator 504 in the blocked mode. Following block 2520, the method 2500 of FIGS. 25A-25C proceeds to block 2522.

At block 2522, the asymmetry monitor 640 of the FCEU 524 determines whether an asymmetry between the wing flap (e.g., the first inboard flap 112 of FIG. 3) and another wing flap (e.g., the second inboard flap 118 of FIG. 3) exceeds an asymmetry threshold (block 2522). If the asymmetry monitor 640 determines at block 2522 that the asymmetry between the two wing flaps does not exceed the asymmetry threshold, the method 2500 of FIGS. 25A-25C returns to block 2520. If the asymmetry monitor 640 instead determines at block 2522 that the asymmetry between the two wing flaps exceeds the asymmetry threshold, the method 2500 of FIGS. 25A-25C proceeds to block 2524.

At block 2524, the FCEU 524 activates the LPU 554 via the ELCU 528, and commands both the first actuator 502 and the second actuator 504 to move the wing flap to the last commanded position (block 2524). For example, the FCEU 524 may send commands to the first REU 512 and the second REU 514 to cause control valves of corresponding ones of the first hydraulic module 506 and the second hydraulic module 508 to move to control port positions that enable movement of the wing flap via the first actuator 502 and the second actuator 504 to the last commanded position. Following block 2524, the method 2500 of FIGS. 25A-25C proceeds to block 2526.

At block 2526, the FCEU 524 determines whether a new position for the wing flap has been indicated (block 2526). For example, the FCEU 524 of FIG. 5 may determine a newly commanded position of the wing flap (e.g., the first inboard flap 112 of FIG. 3) coupled to the first actuator 502 and the second actuator 504 of FIG. 5. If the FCEU 524 determines at block 2526 that a new position for the wing flap has not been indicated, the method 2500 of FIGS. 25A-25C returns to block 2520. If the FCEU 524 instead determines at block 2526 that a new position for the wing flap has been indicated, the method 2500 of FIGS. 25A-25C proceeds to block 2528.

At block 2528, the FCEU 524 activates the LPU 554 via the ELCU 528, and commands both the first actuator 502 and the second actuator 504 to move the wing flap to the newly indicated position (block 2528). For example, the FCEU 524 may send commands to the first REU 512 and the second REU 514 to cause control valves of corresponding ones of the first hydraulic module 506 and the second hydraulic module 508 to move to control port positions that enable movement of the wing flap via the first actuator 502 and the second actuator 504 to the newly indicated position. Following block 2528, the method 2500 of FIGS. 25A-25C returns to block 2502.

At block 2530, the FCEU 524 commands both the first actuator 502 and the second actuator 504 into a blocked mode (block 2530). For example, the FCEU 524 may send commands to the first REU 512 and the second REU 514 to cause control valves of corresponding ones of the first hydraulic module 506 and the second hydraulic module 508 to move to control port positions that place the first actuator 502 and the second actuator 504 in the blocked mode. Following block 2530, the method 2500 of FIGS. 25A-25C proceeds to block 2532.

At block 2532, the asymmetry monitor 640 of the FCEU 524 determines whether an asymmetry between the wing flap (e.g., the first inboard flap 112 of FIG. 3) and another wing flap (e.g., the second inboard flap 118 of FIG. 3) exceeds an asymmetry threshold (block 2532). If the asymmetry monitor 640 determines at block 2532 that the asymmetry between the two wing flaps does not exceed the asymmetry threshold, the method 2500 of FIGS. 25A-25C returns to block 2530. If the asymmetry monitor 640 instead determines at block 2532 that the asymmetry between the two wing flaps exceeds the asymmetry threshold, the method 2500 of FIGS. 25A-25C proceeds to block 2534.

At block 2534, the FCEU 524 commands the abnormal actuator into a bypassed mode, and further commands the normal actuator to move the wing flap to the last commanded position (block 2534). In instances of a failure of the first actuator 502 or a failure of the first supply line branch 538, the first actuator 502 is the abnormal actuator and the second actuator 504 is the normal actuator. In such examples, the FCEU 524 may send commands to the first REU 512 to cause control valves of the first hydraulic module 506 to move to control port positions that place the first actuator 502 in the bypassed mode, and may further send commands to the second REU 514 to cause control valves of the second hydraulic module 508 to move to control port positions that enable movement of the wing flap via the second actuator 504 to the last commanded position. In instances of a failure of the second actuator 504 or a failure of the second supply line branch 542, the second actuator 504 is the abnormal actuator and the first actuator 502 is the normal actuator. In such examples, the FCEU 524 may send commands to the second REU 514 to cause control valves of the second hydraulic module 508 to move to control port positions that place the second actuator 504 in the bypassed mode, and may further send commands to the first REU 512 to cause control valves of the first hydraulic module 506 to move to control port positions that enable movement of the wing flap via the first actuator 502 to the last commanded position. Following block 2534, the method 2500 of FIGS. 25A-25C proceeds to block 2536.

At block 2536, the FCEU 524 determines whether a new position for the wing flap has been indicated (block 2536). For example, the FCEU 524 of FIG. 5 may determine a newly commanded position of the wing flap (e.g., the first inboard flap 112 of FIG. 3) coupled to the first actuator 502 and the second actuator 504 of FIG. 5. If the FCEU 524 determines at block 2536 that a new position for the wing flap has not been indicated, the method 2500 of FIGS. 25A-25C returns to block 2530. If the FCEU 524 instead determines at block 2536 that a new position for the wing flap has been indicated, the method 2500 of FIGS. 25A-25C proceeds to block 2538.

At block 2538, the FCEU 524 commands the abnormal actuator into a bypassed mode, and further commands the normal actuator to move the wing flap to the newly indicated position (block 2534). For example, the FCEU 524 may send commands to the first REU 512 to cause control valves of the first hydraulic module 506 to move to control port positions that place the first actuator 502 in the bypassed mode, and may further send commands to the second REU 514 to cause control valves of the second hydraulic module

508 to move to control port positions that enable movement of the wing flap via the second actuator 504 to the newly indicated position. As another example, the FCEU 524 may send commands to the second REU 514 to cause control valves of the second hydraulic module 508 to move to control port positions that place the second actuator 504 in the bypassed mode, and may further send commands to the first REU 512 to cause control valves of the first hydraulic module 506 to move to control port positions that enable movement of the wing flap via the first actuator 502 to the newly indicated position. Following block 2538, the method 2500 of FIGS. 25A-25C returns to block 2502.

From the foregoing, it will be appreciated that the disclosed distributed trailing edge wing flap systems advantageously include at least one pair of actuators (e.g., one pair of actuators per wing flap) that may be hydraulically driven and/or powered by a hydraulic system of an aircraft, and may independently be hydraulically driven and/or powered by a local power unit (LPU) selectively connected to an electrical system of the aircraft. When connected to the electrical system of the aircraft, the LPU advantageously provides and/or supplies pressurized hydraulic fluid to the pair of actuators independent of any pressurized hydraulic fluid that may be supplied to the pair of actuators via the hydraulic system of the aircraft. The LPU may accordingly restore and/or maintain the ability of the aircraft to change and/or control a position of a wing flap with which the LPU is associated (e.g., restore and/or maintain the ability to actuate a wing flap to the last commanded position, or to a newly indicated position of the wing flap).

In some disclosed examples, each wing flap of a distributed trailing edge wing flap system includes at least two actuators that may be hydraulically driven and/or powered by a hydraulic system of an aircraft, and may independently be hydraulically driven and/or powered by a LPU selectively connected to an electrical system of the aircraft. In such examples, the LPUs advantageously restore and/or maintain the ability of the aircraft to change and/or control the respective positions of the respective wing flaps with which corresponding respective ones of the LPUs are associated (e.g., restore and/or maintain the ability to actuate respective ones of the wing flaps to corresponding respective last commanded positions of the wing flaps, or to newly indicated positions of the wing flaps). In such examples, the distributed trailing edge wing flap system advantageously implements respective ones of the LPUs to prevent and/or mediate the development of asymmetries among the respective positions of respective ones of the wing flaps.

In some examples, a wing flap system for an aircraft is disclosed. In some disclosed examples, the wing flap system comprises a flap, an actuator, a first hydraulic module, and a second hydraulic module. In some disclosed examples, the flap is movable between a deployed position and a retracted position relative to a fixed trailing edge of a wing of the aircraft. In some disclosed examples, the actuator is to move the flap relative to the fixed trailing edge. In some disclosed examples, the first hydraulic module is located at the actuator. In some disclosed examples, the second hydraulic module is located remotely from the first hydraulic module. In some disclosed examples, the second hydraulic module includes a local power unit. In some disclosed examples, the actuator is hydraulically drivable via first pressurized hydraulic fluid to be supplied from a hydraulic system of the aircraft to the actuator via the second hydraulic module and further via the first hydraulic module. In some disclosed examples, the actuator is also hydraulically drivable via second pressurized hydraulic fluid to be supplied from the local power unit to the actuator via the second hydraulic module and further via the first hydraulic module.

In some disclosed examples, the actuator is hydraulically drivable via the second pressurized hydraulic fluid independently of being hydraulically drivable via the first pressurized hydraulic fluid.

In some disclosed examples, the wing flap system further comprises a first remote electronics unit located at and in electrical communication with the first hydraulic module. In some disclosed examples, the first remote electronics unit is to control the first hydraulic module. In some disclosed examples, the wing flap system further comprises a second remote electronics unit located at and in electrical communication with the second hydraulic module. In some disclosed examples, the second remote electronics unit is to control the second hydraulic module. In some disclosed examples, the wing flap system further comprises a flight control electronics unit located remotely from the first remote electronics unit and remotely from the second remote electronics unit. In some disclosed examples, the flight control electronics unit is to control the first remote electronics unit and the second remote electronics unit.

In some disclosed examples, the actuator includes an actuator position feedback sensor. In some disclosed examples, the first remote electronics unit is to receive actuator position feedback data sensed by the actuator position feedback sensor. In some disclosed examples, the flap includes a flap position sensor. In some disclosed examples, the flight control electronics unit is to receive flap position data sensed by the flap position sensor.

In some disclosed examples, the local power unit is selectively connectable to an electrical system of the aircraft. In some disclosed examples, the electrical system is to power the local power unit to supply the second pressurized hydraulic fluid.

In some disclosed examples, the local power unit includes a compensator, a hydraulic pump in fluid communication with the compensator, and an electric motor operatively coupled to the hydraulic pump. In some disclosed examples, the second pressurized hydraulic fluid is to include a volume of hydraulic fluid contained within the compensator.

In some disclosed examples, the electric motor is to drive the hydraulic pump to supply the second pressurized hydraulic fluid to the actuator in response to the electric motor being connected to the electrical system.

In some disclosed examples, the wing flap system further comprises an electrical load control unit operatively positioned between the electric motor and the electrical system. In some disclosed examples, the electrical load control unit is to selectively connect the electrical system to the electric motor.

In some disclosed examples, the flap is a first flap of the aircraft. In some disclosed examples, the electrical load control unit is controlled via a flight control electronics unit of the aircraft. In some disclosed examples, the flight control electronics unit is to command the electrical load control unit to connect the electrical system to the electric motor in response to detecting an asymmetry between the first flap and a second flap of the aircraft that exceeds an asymmetry threshold.

In some disclosed examples, the actuator is a first actuator, and the wing flap system further comprises a second actuator and a third hydraulic module. In some disclosed examples, the second actuator is to move the flap relative to the fixed trailing edge. In some disclosed examples, the third hydraulic module is located at the second actuator and remotely from the second hydraulic module. In some disclosed examples, the second actuator is hydraulically drivable via the first pressurized hydraulic fluid. In some disclosed examples, the first pressurized hydraulic fluid is to be supplied from the hydraulic system of the aircraft to the second actuator via the second hydraulic module and further via the third hydraulic module. In some disclosed examples, the second actuator is also hydraulically drivable via the second pressurized hydraulic fluid. In some disclosed examples, the second pressurized hydraulic fluid is to be supplied from the local power unit to the second actuator via the second hydraulic module and further via the third hydraulic module.

In some disclosed examples, the aircraft includes a fly-by-wire flight control system and a power architecture having two independent hydraulic systems and two independent electrical systems.

In some examples, a wing flap system for an aircraft is disclosed. In some disclosed examples, the wing flap system comprises a flap movable between a deployed position and a retracted position relative to a fixed trailing edge of a wing of the aircraft. In some disclosed examples, the wing flap system further comprises first and second actuators to move the flap relative to the fixed trailing edge. In some disclosed examples, the wing flap system further comprises first and second hydraulic modules respectively located at corresponding ones of the first and second actuators. In some disclosed examples, the wing flap system further comprises a third hydraulic module located remotely from the first and second hydraulic modules. In some disclosed examples, the third hydraulic module includes a local power unit. In some disclosed examples, the first and second actuators are hydraulically drivable via first pressurized hydraulic fluid to be supplied from a hydraulic system of the aircraft to the first and second actuators via the third hydraulic module and further via corresponding ones of the first and second hydraulic modules. In some disclosed examples, the first and second actuators are also hydraulically drivable via second pressurized hydraulic fluid to be supplied from the local power unit to the first and second actuators via the third hydraulic module and further via corresponding ones of the first and second hydraulic modules.

In some disclosed examples, the first and second actuators are hydraulically drivable via the second pressurized hydraulic fluid independently of being hydraulically drivable via the first pressurized hydraulic fluid.

In some disclosed examples, the local power unit is selectively connectable to an electrical system of the aircraft. In some disclosed examples, the electrical system is to power the local power unit to supply the second pressurized hydraulic fluid.

In some disclosed examples, the local power unit includes a compensator, a hydraulic pump in fluid communication with the compensator, and an electric motor operatively coupled to the hydraulic pump. In some disclosed examples, the second pressurized hydraulic fluid is to include a volume of hydraulic fluid contained within the compensator. In some disclosed examples, the electric motor is to drive the hydraulic pump to supply the second pressurized hydraulic fluid to the first and second actuators in response to the electric motor being connected to the electrical system.

In some disclosed examples, the wing flap system further comprises an electrical load control unit operatively positioned between the electric motor and the electrical system. In some disclosed examples, the electrical load control unit is to selectively connect the electrical system to the electric motor.

In some disclosed examples, the flap is a first flap of the aircraft, and the electrical load control unit is controlled via a flight control electronics unit of the aircraft. In some disclosed examples, the flight control electronics unit is to command the electrical load control unit to connect the electrical system to the electric motor in response to detecting an asymmetry between the first flap and a second flap of the aircraft that exceeds an asymmetry threshold.

In some disclosed examples, the wing flap system further comprises first, second and third remote electronics units located at and in electrical communication with corresponding respective ones of the first, second and third hydraulic modules. In some disclosed examples, respective ones of the first, second and third remote electronics units are to control corresponding respective ones of the first, second and third hydraulic modules. In some disclosed examples, the wing flap system further comprises a flight control electronics unit located remotely from the first, second and third hydraulic modules and remotely from the first, second and third remote electronics units. In some disclosed examples, the flight control electronics unit is to control the respective ones of the first, second and third remote electronics units.

In some disclosed examples, the aircraft includes a fly-by-wire flight control system and a power architecture having two independent hydraulic systems and two independent electrical systems.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A wing flap system for an aircraft, the wing flap system comprising:
   a flap movable between a deployed position and a retracted position relative to a fixed trailing edge of a wing of the aircraft;
   an actuator to move the flap relative to the fixed trailing edge;
   a first hydraulic module located at the actuator; and
   a second hydraulic module located remotely from the first hydraulic module, the second hydraulic module including a local power unit, the actuator being hydraulically drivable via first pressurized hydraulic fluid to be supplied from a hydraulic system of the aircraft to the actuator via the second hydraulic module and further via the first hydraulic module, the actuator also being hydraulically drivable via second pressurized hydraulic fluid to be supplied from the local power unit to the actuator via the second hydraulic module and further via the first hydraulic module.

2. The wing flap system of claim 1, wherein the actuator is hydraulically drivable via the second pressurized hydraulic fluid independently of being hydraulically drivable via the first pressurized hydraulic fluid.

3. The wing flap system of claim 1, further comprising:
   a first remote electronics unit located at and in electrical communication with the first hydraulic module, the first remote electronics unit to control the first hydraulic module;
   a second remote electronics unit located at and in electrical communication with the second hydraulic module, the second remote electronics unit to control the second hydraulic module; and
   a flight control electronics unit located remotely from the first remote electronics unit and remotely from the second remote electronics unit, the flight control electronics unit to control the first remote electronics unit and the second remote electronics unit.

4. The wing flap system of claim 3, wherein the actuator includes an actuator position feedback sensor, the first remote electronics unit to receive actuator position feedback data sensed by the actuator position feedback sensor.

5. The wing flap system of claim 3, wherein the flap includes a flap position sensor, the flight control electronics unit to receive flap position data sensed by the flap position sensor.

6. The wing flap system of claim 1, wherein the local power unit is selectively connectable to an electrical system of the aircraft, the electrical system to power the local power unit to supply the second pressurized hydraulic fluid.

7. The wing flap system of claim 6, wherein the local power unit includes a compensator, a hydraulic pump in fluid communication with the compensator, and an electric motor operatively coupled to the hydraulic pump, the second pressurized hydraulic fluid to include a volume of hydraulic fluid contained within the compensator.

8. The wing flap system of claim 7, wherein the electric motor is to drive the hydraulic pump to supply the second pressurized hydraulic fluid to the actuator in response to the electric motor being connected to the electrical system.

9. The wing flap system of claim 7, further comprising an electrical load control unit operatively positioned between the electric motor and the electrical system, the electrical load control unit to selectively connect the electrical system to the electric motor.

10. The wing flap system of claim 9, wherein the flap is a first flap of the aircraft, and wherein the electrical load control unit is controlled via a flight control electronics unit of the aircraft, the flight control electronics unit to command the electrical load control unit to connect the electrical system to the electric motor in response to detecting an asymmetry between the first flap and a second flap of the aircraft that exceeds an asymmetry threshold.

11. The wing flap system of claim 1, wherein the actuator is a first actuator, the wing flap system further comprising a second actuator and a third hydraulic module, the second actuator to move the flap relative to the fixed trailing edge, the third hydraulic module being located at the second actuator, the third hydraulic module being located remotely from the second hydraulic module, the second actuator being hydraulically drivable via the first pressurized hydraulic fluid, the first pressurized hydraulic fluid to be supplied from the hydraulic system of the aircraft to the second actuator via the second hydraulic module and further via the third hydraulic module, the second actuator also being hydraulically drivable via the second pressurized hydraulic fluid, the second pressurized hydraulic fluid to be supplied from the local power unit to the second actuator via the second hydraulic module and further via the third hydraulic module.

12. The wing flap system of claim 1, wherein the aircraft includes a fly-by-wire flight control system and a power architecture having two independent hydraulic systems and two independent electrical systems.

13. A wing flap system for an aircraft, the wing flap system comprising:
a flap movable between a deployed position and a retracted position relative to a fixed trailing edge of a wing of the aircraft;
first and second actuators to move the flap relative to the fixed trailing edge;
first and second hydraulic modules respectively located at corresponding ones of the first and second actuators; and
a third hydraulic module located remotely from the first and second hydraulic modules, the third hydraulic module including a local power unit, the first and second actuators being hydraulically drivable via first pressurized hydraulic fluid to be supplied from a hydraulic system of the aircraft to the first and second actuators via the third hydraulic module and further via corresponding ones of the first and second hydraulic modules, the first and second actuators also being hydraulically drivable via second pressurized hydraulic fluid to be supplied from the local power unit to the first and second actuators via the third hydraulic module and further via corresponding ones of the first and second hydraulic modules.

14. The wing flap system of claim 13, wherein the first and second actuators are hydraulically drivable via the second pressurized hydraulic fluid independently of being hydraulically drivable via the first pressurized hydraulic fluid.

15. The wing flap system of claim 13, wherein the local power unit is selectively connectable to an electrical system of the aircraft, the electrical system to power the local power unit to supply the second pressurized hydraulic fluid.

16. The wing flap system of claim 15, wherein the local power unit includes a compensator, a hydraulic pump in fluid communication with the compensator, and an electric motor operatively coupled to the hydraulic pump, the second pressurized hydraulic fluid to include a volume of hydraulic fluid contained within the compensator, the electric motor to drive the hydraulic pump to supply the second pressurized hydraulic fluid to the first and second actuators in response to the electric motor being connected to the electrical system.

17. The wing flap system of claim 16, further comprising an electrical load control unit operatively positioned between the electric motor and the electrical system, the electrical load control unit to selectively connect the electrical system to the electric motor.

18. The wing flap system of claim 17, wherein the flap is a first flap of the aircraft, and wherein the electrical load control unit is controlled via a flight control electronics unit of the aircraft, the flight control electronics unit to command the electrical load control unit to connect the electrical system to the electric motor in response to detecting an asymmetry between the first flap and a second flap of the aircraft that exceeds an asymmetry threshold.

19. The wing flap system of claim 13, further comprising:
first, second and third remote electronics units located at and in electrical communication with corresponding respective ones of the first, second and third hydraulic modules, respective ones of the first, second and third remote electronics units to control corresponding respective ones of the first, second and third hydraulic modules; and
a flight control electronics unit located remotely from the first, second and third hydraulic modules and remotely from the first, second and third remote electronics units, the flight control electronics unit to control the respective ones of the first, second and third remote electronics units.

20. The wing flap system of claim 13, wherein the aircraft includes a fly-by-wire flight control system and a power architecture having two independent hydraulic systems and two independent electrical systems.

* * * * *